United States Patent [19]

Katayama et al.

[11] Patent Number: 5,748,777
[45] Date of Patent: May 5, 1998

[54] APPARATUS AND METHOD FOR EXTRACTING OUTLINE DATA AND ENCODING IMAGE DATA USING THE OUTLINE DATA

[75] Inventors: Akihiro Katayama; Yoshihiro Ishida; Junichi Yamakawa, all of Kawasaki, Japan

[73] Assignee: Canon Kabushiki Kaisha, Tokyo, Japan

[21] Appl. No.: 377,509

[22] Filed: Jan. 24, 1995

Related U.S. Application Data

[63] Continuation of Ser. No. 8,609, Jan. 22, 1993, abandoned.

[30] Foreign Application Priority Data

Jan. 24, 1992 [JP] Japan .................................. 4-010790
Apr. 30, 1992 [JP] Japan .................................. 4-111750

[51] Int. Cl.$^6$ .............................. G06K 9/48; G06K 9/52
[52] U.S. Cl. ........................ 382/199; 382/203; 382/206
[58] Field of Search ................................ 382/199, 203, 382/206, 201, 202, 204, 232

[56] References Cited

U.S. PATENT DOCUMENTS

| | | | |
|---|---|---|---|
| 4,712,248 | 12/1987 | Hongo | 382/22 |
| 4,773,098 | 9/1988 | Scott | 382/22 |
| 4,956,869 | 9/1990 | Miyatake et al. | 382/22 |
| 5,067,023 | 11/1991 | Kim | 358/261.1 |

FOREIGN PATENT DOCUMENTS 206214  12/1986  European Pat. Off. ......... G06F 15/40

OTHER PUBLICATIONS

Patent Abstracts of Japan, vol. 009, No. 186 (Kokai 60-055475) (Mar. 1985).

Patent Abstracts of Japan, vol. 011, No. 279 (Kokai 62-077691) (Apr. 1987).

Patent Abstracts of Japan, vol. 013, No. 580 (Kokai 01-243188) (Sep. 1989).

Patent Abstracts of Japan, vol. 013, No. 531 (Kokai 01-216674) (Aug. 1989).

Patent Abstracts of Japan, vol. 014, No. 050 (Kokai 01-277976) (Nov. 1989).

*Primary Examiner*—Andrew Johns
*Assistant Examiner*—Monica S. Davis
*Attorney, Agent, or Firm*—Fitzpatrick, Cella, Harper & Scinto

[57] ABSTRACT

An outline extraction method and apparatus which extracts a line of interest from image data in order of raster scanning and detects outline vectors of the pixels in the line of interest. The detected outline vectors are sequentially stored in a memory, a state of connection between the stored outline vectors and the other outline vectors in the line of interest is determined, and the outline of the image data is extracted based on the state. Accordingly, coordinates of an intersecting point of the outline of the image data with the coordinate axis of the outline vector is obtained and the image data is coded by generating coded data indicating a white run length and black run length for every line from the coordinates of the intersecting point.

40 Claims, 46 Drawing Sheets

→ : TRACING DIRECTION

○ : OUTER BOUNDARY ELEMENT

● : INNER BOUNDARY ELEMENT

FIG. 9

| x COORDINATE OF START POINT | y COORDINATE OF START POINT | x COORDINATE OF END POINT | y COORDINATE OF END POINT | INCOMING VECTOR NO. | OUTGOING VECTOR NO. |
|---|---|---|---|---|---|
| 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| ------ | ------ | ------ | ------ | ------ | ------ |

FIG. 10

| | x COORDINATE OF START POINT | y COORDINATE OF START POINT | x COORDINATE OF END POINT | y COORDINATE OF END POINT | INCOMING VECTOR NO. | OUTGOING VECTOR NO. |
|---|---|---|---|---|---|---|
| 0 | 7 | 3 | 9 | 3 | 3 | 1 |
| 1 | 9 | 3 | 9 | 5 | 0 | 2 |
| 2 | 9 | 5 | 7 | 5 | 1 | 3 |
| 3 | 7 | 5 | 7 | 3 | 2 | 0 |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| ... | ------- | ------- | ------- | ------- | ------- | ------- |

FIG. 11

| | x COORDINATE OF START POINT | y COORDINATE OF START POINT | x COORDINATE OF END POINT | y COORDINATE OF END POINT | INCOMING VECTOR NO. | OUTGOING VECTOR NO. |
|---|---|---|---|---|---|---|
| 0 | 7 | 3 | 9 | 3 | 3 | 1 |
| 1 | 9 | 3 | 9 | 5 | 0 | 5 |
| 2 | | | | | | |
| 3 | 7 | 5 | 7 | 3 | 4 | 0 |
| 4 | 5 | 5 | 7 | 5 | 12 | 3 |
| 5 | 9 | 5 | 11 | 5 | 1 | 6 |
| 6 | 11 | 5 | 13 | 5 | 5 | 7 |
| 7 | 13 | 5 | 13 | 7 | 6 | 8 |
| 8 | 13 | 7 | 11 | 7 | 7 | 9 |
| 9 | 11 | 7 | 9 | 7 | 8 | 10 |
| 10 | 9 | 7 | 7 | 7 | 9 | 11 |
| 11 | 7 | 7 | 5 | 7 | 10 | 12 |
| 12 | 5 | 7 | 5 | 5 | 11 | 4 |
| 13 | | | | | | |
| 14 | | | | | | |
| ------- | ------- | ------- | ------- | ------- | ------- | ------- |

FIG. 12

| | x COORDINATE OF START POINT | y COORDINATE OF START POINT | x COORDINATE OF END POINT | y COORDINATE OF END POINT | INCOMING VECTOR NO. | OUTGOING VECTOR NO. |
|---|---|---|---|---|---|---|
| 0 | 7 | 3 | 9 | 3 | 3 | 1 |
| 1 | 9 | 3 | 9 | 5 | 0 | 5 |
| 2 | | | | | | |
| 3 | 7 | 5 | 7 | 3 | 4 | 0 |
| 4 | 5 | 5 | 7 | 5 | 12 | 3 |
| 5 | 9 | 5 | 11 | 5 | 1 | 6 |
| 6 | 11 | 5 | 13 | 5 | 5 | 7 |
| 7 | 13 | 5 | 13 | 7 | 6 | 8 |
| 8 | 13 | 7 | 11 | 7 | 7 | 16 |
| 9 | | | | | | |
| 10 | 9 | 7 | 7 | 7 | 18 | 13 |
| 11 | | | | | | |
| 12 | 5 | 7 | 5 | 5 | 15 | 4 |
| 13 | 7 | 7 | 7 | 9 | 10 | 14 |
| 14 | 7 | 9 | 5 | 9 | 13 | 15 |
| 15 | 5 | 9 | 5 | 7 | 14 | 12 |
| 16 | 11 | 7 | 11 | 9 | 8 | 17 |
| 17 | 11 | 9 | 9 | 9 | 16 | 18 |
| 18 | 9 | 9 | 9 | 7 | 17 | 10 |
| 19 | ------- | ------- | ------- | ------- | ------- | ------- |

FIG. 13

| | x COORDINATE OF START POINT | y COORDINATE OF START POINT | x COORDINATE OF END POINT | y COORDINATE OF END POINT | INCOMING VECTOR NO. | OUTGOING VECTOR NO. |
|---|---|---|---|---|---|---|
| 0 | 7 | 3 | 9 | 3 | 3 | 1 |
| 1 | 9 | 3 | 9 | 5 | 0 | 5 |
| 2 | | | | | | |
| 3 | 7 | 5 | 7 | 3 | 4 | 0 |
| 4 | 5 | 5 | 7 | 5 | 15 | 3 |
| 5 | 9 | 5 | 13 | 5 | 1 | 7 |
| 6 | | | | | | |
| 7 | 13 | 5 | 13 | 7 | 5 | 8 |
| 8 | 13 | 7 | 11 | 7 | 7 | 16 |
| 9 | | | | | | |
| 10 | 9 | 7 | 7 | 7 | 18 | 13 |
| 11 | | | | | | |
| 12 | | | | | | |
| 13 | 7 | 7 | 7 | 9 | 10 | 14 |
| 14 | 7 | 9 | 5 | 9 | 13 | 15 |
| 15 | 5 | 9 | 5 | 5 | 14 | 4 |
| 16 | 11 | 7 | 11 | 9 | 8 | 17 |
| 17 | 11 | 9 | 9 | 9 | 16 | 18 |
| 18 | 9 | 9 | 9 | 7 | 17 | 10 |
| 19 | | | | | | |
| ------- | ------- | ------- | ------- | ------- | ------- | ------- |

FIG. 30

| CASE NO. | START POINT | STATE OF START POINT | DIRECTION OF PREVIOUS EDGE | DIRECTION OF CURRENT EDGE | DIRECTION OF NEXT EDGE | STATE OF END POINT | START POINT | CASE NO. |
|---|---|---|---|---|---|---|---|---|
| START 1 | SHIFTED FOR ONE SCANNING LINE | | UPWARD | UPWARD | UPWARD | | AS IT IS | END 1 |
| START 2 | SHIFTED FOR ONE SCANNING LINE | | DOWNWARD | | DOWNWARD | | AS IT IS | END 2 |
| START 3 | AS IT IS | | DOWNWARD | | DOWNWARD | | SHIFTED FOR ONE SCANNING LINE | END 3 |
| START 4 | AS IT IS | | LEFT | | LEFT | | SHIFTED FOR ONE SCANNING LINE | END 4 |
| START 5 | SHIFTED FOR ONE SCANNING LINE | | RIGHT | | RIGHT | | AS IT IS | END 5 |
| START 6 | AS IT IS | | UPWARD | DOWNWARD | UPWARD | | AS IT IS | END 6 |
| START 7 | SHIFTED FOR ONE SCANNING LINE | | UPWARD | | DOWNWARD | | SHIFTED FOR ONE SCANNING LINE | END 7 |
| START 8 | AS IT IS | | DOWNWARD | | DOWNWARD | | SHIFTED FOR ONE SCANNING LINE | END 8 |
| START 9 | SHIFTED FOR ONE SCANNING LINE | | LEFT | | LEFT | | AS IT IS | END 9 |
| START 10 | AS IT IS | | RIGHT | | RIGHT | | SHIFTED FOR ONE SCANNING LINE | END 10 |

F I G. 31

| y COORDINATE VALUE OF A POINT IN WHICH y COORDINATE IS LARGER THAN THE OTHER POINT BETWEEN A START POINT AND END POINT OF AN EDGE | x COORDINATE VALUE OF A POINT IN WHICH y COORDINATE IS SMALLER THAN THE OTHER POINT BETWEEN A START POINT AND END POINT OF AN EDGE | INVERSE OF SLOPE | POINTER |
|---|---|---|---|
| ymax | xmin | $\Delta x$ | |

F I G. 35
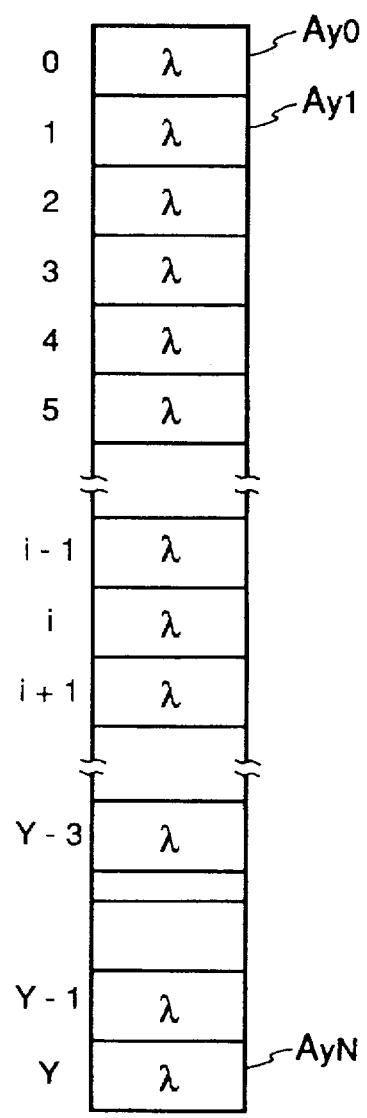

MODIFIED HUFFMAN CODE

TERMINATING CODE

| RUN LENGTH | WHITE RUN | BLACK RUN |
|---|---|---|
| 0 | 00110101 | 0000110111 |
| 1 | 000111 | 010 |
| 2 | 0111 | 11 |
| 3 | 1000 | 10 |
| 4 | 1011 | 011 |
| 5 | 1100 | 0011 |
| 6 | 1110 | 0010 |
| 7 | 1111 | 00011 |
| 8 | 10011 | 000101 |
| 9 | 10100 | 000100 |
| 10 | 00111 | 0000100 |
| 11 | 01000 | 0000101 |
| 12 | 001000 | 0000111 |
| 13 | 000011 | 00000100 |
| 14 | 110100 | 00000111 |
| 15 | 110101 | 000011000 |
| 16 | 101010 | 0000010111 |
| 17 | 101011 | 0000011000 |
| 18 | 0100111 | 0000001000 |
| 19 | 0001100 | 00001100111 |
| 20 | 0001000 | 00001101000 |
| 21 | 0010111 | 00001101100 |
| 22 | 0000011 | 00000110111 |
| 23 | 0000100 | 00000101000 |
| 24 | 0101000 | 00000010111 |
| 25 | 0101011 | 00000011000 |
| 26 | 0010011 | 000011001010 |
| 27 | 0100100 | 000011001011 |
| 28 | 0011000 | 000011001100 |
| 29 | 00000010 | 000011001101 |
| 30 | 00000011 | 000001101000 |
| 31 | 00011010 | 000001101001 |
| 32 | 00011011 | 000001101010 |
| 33 | 00010010 | 000001101011 |
| 34 | 00010011 | 000011010010 |
| 35 | 00010100 | 000011010011 |
| 36 | 00010101 | 000011010100 |
| 37 | 00010110 | 000011010101 |
| 38 | 00010111 | 000011010110 |
| 39 | 00101000 | 000011010111 |
| 40 | 00101001 | 000001101100 |
| 41 | 00101010 | 000001101101 |
| 42 | 00101011 | 000011011010 |
| 43 | 00101100 | 000011011011 |
| 44 | 00101101 | 000001010100 |
| 45 | 00000100 | 000001010101 |
| 46 | 00000101 | 000001010110 |
| 47 | 00001010 | 000001010111 |
| 48 | 00001011 | 000001100100 |
| 49 | 01010010 | 000001100101 |
| 50 | 01010011 | 000001010010 |
| 51 | 01010100 | 000001010011 |
| 52 | 01010101 | 000000100100 |
| 53 | 00100100 | 000000110111 |
| 54 | 00100101 | 000000111000 |
| 55 | 01011000 | 000000100111 |
| 56 | 01011001 | 000000101000 |
| 57 | 01011010 | 000001011000 |
| 58 | 01011011 | 000001011001 |
| 59 | 01001010 | 000000101011 |
| 60 | 01001011 | 000000101100 |

MAKE-UP CODE

| RUN LENGTH | WHITE RUN | BLACK RUN |
|---|---|---|
| 61 | 00110010 | 000001011010 |
| 62 | 00110011 | 000001100110 |
| 63 | 00110100 | 000001100111 |
| 64 | 11011 | 0000001111 |
| 128 | 10010 | 000011001000 |
| 192 | 010111 | 000011001001 |
| 256 | 0110111 | 000001011011 |
| 320 | 00110110 | 000000110011 |
| 384 | 00110111 | 000000110100 |
| 448 | 01100100 | 000000110101 |
| 512 | 01100101 | 0000001101100 |
| 576 | 01101000 | 0000001101101 |
| 640 | 01100111 | 0000001001010 |
| 704 | 011001100 | 0000001001011 |
| 768 | 011001101 | 0000001001100 |
| 832 | 011010010 | 0000001001101 |
| 896 | 011010011 | 0000001110010 |
| 960 | 011010100 | 0000001110011 |
| 1024 | 011010101 | 0000001110100 |
| 1088 | 011010110 | 0000001110101 |
| 1152 | 011010111 | 0000001110110 |
| 1216 | 011011000 | 0000001110111 |
| 1280 | 011011001 | 0000001010010 |
| 1344 | 011011010 | 0000001010011 |
| 1408 | 011011011 | 0000001010100 |
| 1472 | 010011000 | 0000001010101 |
| 1536 | 010011001 | 0000001011010 |
| 1600 | 010011010 | 0000001011011 |
| 1664 | 011000 | 0000001100100 |
| 1728 | 010011011 | 0000001100101 |
| EOL | 000000000001 | 000000000001 |

| | |
|---|---|
| 1792 | 00000001000 |
| 1856 | 00000001100 |
| 1920 | 00000001101 |
| 1984 | 000000010010 |
| 2048 | 000000010011 |
| 2112 | 000000010100 |
| 2176 | 000000010101 |
| 2240 | 000000010110 |
| 2304 | 000000010111 |
| 2368 | 000000011100 |
| 2432 | 000000011101 |
| 2496 | 000000011110 |
| 2560 | 000000011111 |

COMMON IN BLACK AND WHITE

F I G. 38

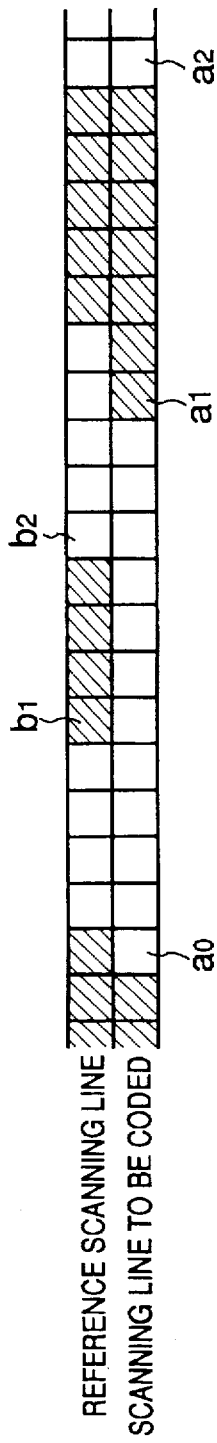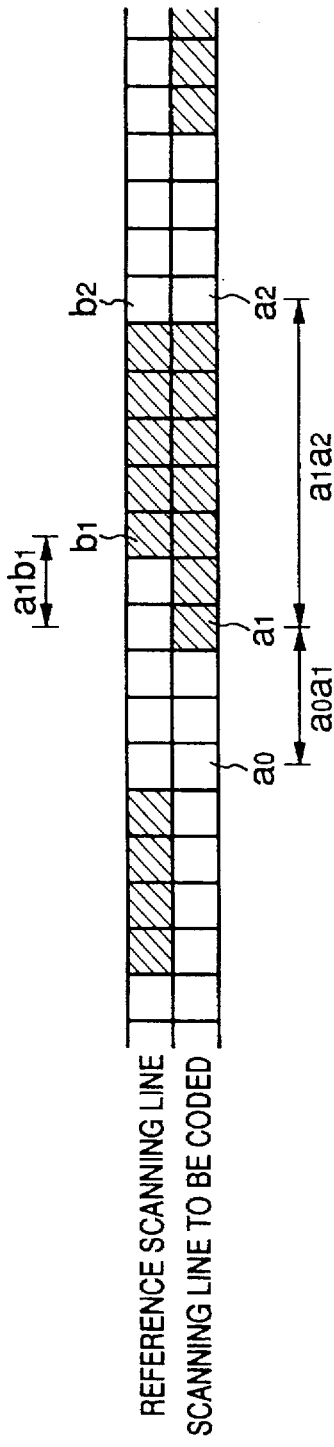

FIG. 42

| CODING MODE | PIXEL TO BE CODED | | | NOTATION | CODED |
|---|---|---|---|---|---|
| PASS MODE | ($b_1b_2$) | | | P | 0001 |
| HORIZONTAL MODE | $a_0a_1, a_1a_2$ | | | H | 001 + M ($a_0a_1$) + M ($a_1a_2$) |
| VERTICAL MODE | $\Delta = 0$ | | $a_1b_1 = 0$ | V(0) | 1 |
| | $\Delta > 0$ | | $a_1b_1 = 1$ | $V_R(1)$ | 011 |
| | | | $a_1b_1 = 2$ | $V_R(2)$ | 000011 |
| | | | $a_1b_1 = 3$ | $V_R(3)$ | 0000011 |
| | $\Delta < 0$ | | $a_1b_1 = 1$ | $V_L(1)$ | 010 |
| | | | $a_1b_1 = 2$ | $V_L(2)$ | 000010 |
| | | | $a_1b_1 = 3$ | $V_L(3)$ | 0000010 |
| EOL (END - OF - LINE) | | | | | 000000000001T |

FIG. 46

| CASE NO. | START POINT | STATE OF START POINT | DIRECTION OF PREVIOUS EDGE | DIRECTION OF CURRENT EDGE | DIRECTION OF NEXT EDGE | STATE OF END POINT | START POINT | CASE NO. |
|---|---|---|---|---|---|---|---|---|
| START 11 | AS IT IS | | UPWARD | UPWARD | UPWARD | | SHIFTED FOR ONE SCANNING LINE | END 11 |
| START 12 | AS IT IS | | DOWNWARD | | DOWNWARD | | SHIFTED FOR ONE SCANNING LINE | END 12 |
| START 13 | SHIFTED FOR ONE SCANNING LINE | | LEFT | | LEFT | | AS IT IS | END 13 |
| START 14 | SHIFTED FOR ONE SCANNING LINE | | RIGHT | | RIGHT | | AS IT IS | END 14 |
| START 15 | AS IT IS | | UPWARD | | UPWARD | | SHIFTED FOR ONE SCANNING LINE | END 15 |
| START 16 | SHIFTED FOR ONE SCANNING LINE | | DOWNWARD | DOWNWARD | UPWARD | | SHIFTED FOR ONE SCANNING LINE | END 16 |
| START 17 | AS IT IS | | LEFT | | DOWNWARD | | AS IT IS | END 17 |
| START 18 | AS IT IS | | RIGHT | | DOWNWARD | | AS IT IS | END 18 |
| START 19 | AS IT IS | | LEFT | | LEFT | | SHIFTED FOR ONE SCANNING LINE | END 19 |
| START 20 | SHIFTED FOR ONE SCANNING LINE | | RIGHT | | RIGHT | | AS IT IS | END 20 |

APPARATUS AND METHOD FOR EXTRACTING OUTLINE DATA AND ENCODING IMAGE DATA USING THE OUTLINE DATA

This application is a continuation of application Ser. No. 08/008,609, filed Jan. 22, 1993, now abandoned.

BACKGROUND OF THE INVENTION

The present invention relates to an apparatus and method for extracting outline data of image data or coded image data and encoding the image data by using the outline data.

Conventionally, in a case where an outline font is formed from image data which is expressed by a binary image pattern, an outline of the binary image pattern is extracted and expressed by vectors. Extraction of the outline of the binary image pattern starts with searching a start point for tracing.

When the start point is searched, an outline of the binary image pattern is traced while marking on traced dots of the outline. When all "outline dots" forming the outline are traced, a string of outline dots (an outline) is obtained. By repeating the above-described procedure, all outlines in the binary image pattern can be extracted.

An example of a conventional procedure for tracing an outline dot to eight directions is shown in FIG. 2. Numeral 201 is a binary image pattern having a closed area 202 inside. Extraction of outlines from this pattern is described below. It should be noted that, in FIG. 2, each piece of lattice represents a dot (pixel) and shaded pixel represents a black pixel.

(1) A black pixel is detected by searching the binary image pattern 201 from a reference point (0, 0) by raster scan.

(2) When a black pixel (pixel 203) which has already been traced as a pixel of interest is detected, tracing the outline of the image pattern is started with the pixel 203 as a start point P0 (outline dot). If the start point $P_0$ is not formed by searching the whole binary pattern, the process ends.

(3) Neighboring pixels in eight directions of the start point $P_0$ are sequentially searched in the order shown in FIG. 3. The point where a pixel is first detected from the start point $P_0$ (the pixel 204 in the case of FIG. 2) is determined as an outline dot $P_1$. In the case where there is no black pixel in the all directions shown in FIG. 3, the start point $P_0$ is determined as an isolated point and the process returns to step (2).

(4) As shown in FIG. 4, an outline dot $P_i$ is marked and the next outline dot $P_{i+1}$ is extracted out of the neighboring pixels of the outline dot $P_i$. In FIG. 4, a pixel 401 has been traced and marked. When the next outline dot $P_i$ (the pixel 402) is detected, a further next outline dot $P_{i+1}$ is searched in the counterclockwise direction from the pixel 401 and a first detected pixel is determined as an outline dot $P_{i+1}$.

(5) Step (4) is repeated and the outline dots are sequentially obtained. However, if $P_{n+1}=P_1$, $P_n=P_0$, dots $P_0$, $P_1, \ldots, P_{n-1}$ are regarded as a string of outline dots which form the outline of the image pattern and the process proceeds to step (6).

(6) In order to obtain another string of outline dots of the image pattern, the process returns to step (2).

In FIGS. 3 and 4, a dot represented by ⊗ is a dot of interest, and a dot represented by ⊙ (pixel 401) is a dot of the outline traced immediately before the dot ⊗. Numbers in the figures represent the order of searching pixels.

In the prior art, once a start point is determined, tracing is performed along with the outline. Therefore, extraction process of the outline must be performed after all image data has been once stored in a memory. Accordingly, the capacity of the memory to store the image data becomes quite large, thus resulting in an increase in cost of the apparatus and extending a processing time.

In the prior art, since another start point is detected by next whole raster scan after a string of outline dots has been extracted, pixels which have been already searched are detected again. Accordingly, the amount of calculation on the image data is increased and processing speed is decreased.

Furthermore, in the prior art, the outline is traced in a unit of pixel, instead of outline of pixel. Therefore, if a part of the image pattern having one-dot width is traced, the drawback is that the width is regarded as "0" and the outline of the one-dot is not appeared.

Furthermore, as in a facsimile apparatus, in the case where the image data is received as an MH code, the received coded data needs to be once developed to an image pattern in order to obtain the outline of the image data. Accordingly, the processing amount is increased, a memory to develop the pattern is required, and a size of the hardware is enlarged.

Still further, in the case where image data represented by outlines is coded, an image pattern is obtained by filling dots in a closed area formed by the outlines and then coded data is obtained by scanning this image pattern, thus resulting in a complication in the process.

SUMMARY OF THE INVENTION

Accordingly, in the light of the drawbacks in the prior art, it is an object of the present invention to provide an outline extraction apparatus and method capable of efficiently obtaining outlines of image data.

It is another object of the present invention to provide an outline extraction apparatus and method for reducing capacity of a memory by extracting outlines without storing a whole image data.

It is another object of the present invention to provide an outline extraction apparatus and method for reducing storage capacity by extracting outlines without retaining the whole data of a received image.

It is another object of the present invention to provide an outline extraction apparatus and method capable of performing an outline extraction process at high speed by reducing an operation for developing whole coded data to dot data.

Furthermore, it is another object of the present invention to provide an outline extraction apparatus and method capable of extracting outlines at high speed by efficiently searching outlines of the image data.

Furthermore, it is another object of the present invention to provide a coding method and apparatus capable of obtaining coded data directly from outline data.

Still further, it is another object of the present invention to provide a coding method and apparatus capable of performing a coding process at high speed and simplifying the process by generating the outline data with respect to the main scanning line based on a relation in connection between a line element of interest and previous and next line elements in a continuing line elements and generating a code to be transmitted from the outline data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 9 shows an example of an outline vector table;

FIGS. 10-13 show changes of the content of the outline vector table in the outline vector extraction process;

FIG. 30 is a diagram illustrating a regulation for packet data generation of the clockwise outline in the third embodiment;

FIG. 31 is a diagram illustrating the construction of the edge packet data;

FIG. 35 is a diagram illustrating an initialized address pointer area;

FIG. 38 is a diagram to explain Modified Huffman codes (MH codes);

FIGS. 41A and 41B are diagrams to explain a definition of a transition pixel in the MR method;

FIG. 42 is a diagram to explain the MR coding;

FIG. 46 is a diagram illustrating a regulation for generating the packet data for the counterclockwise outline in another embodiment;

DESCRIPTION OF THE PREFERRED EMBODIMENTS

Preferred embodiments of the present invention will now be described in detail in accordance with the accompanying drawings.

[The First Embodiment]

Figure 1:
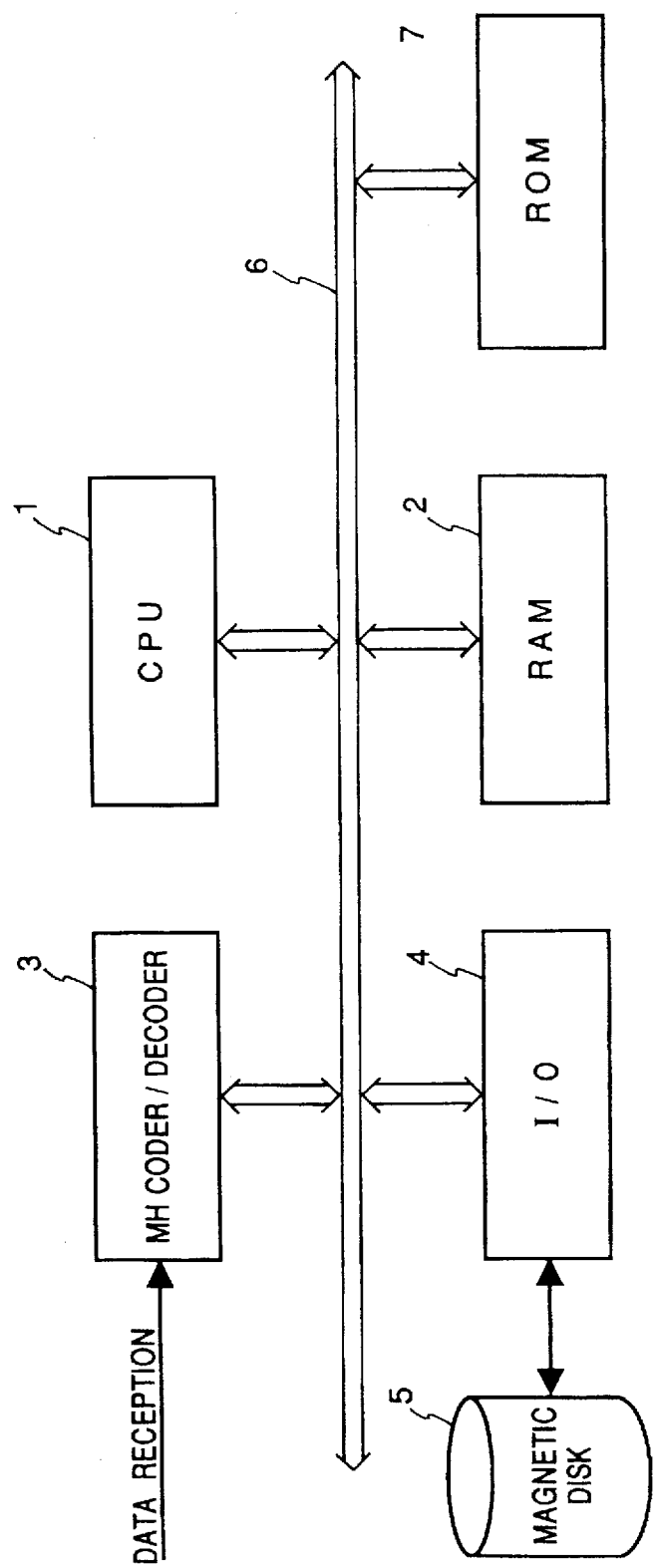
FIG. 1 is a block diagram illustrating the construction of an outline extraction apparatus of the first embodiment according to the present invention.
Figure 2:
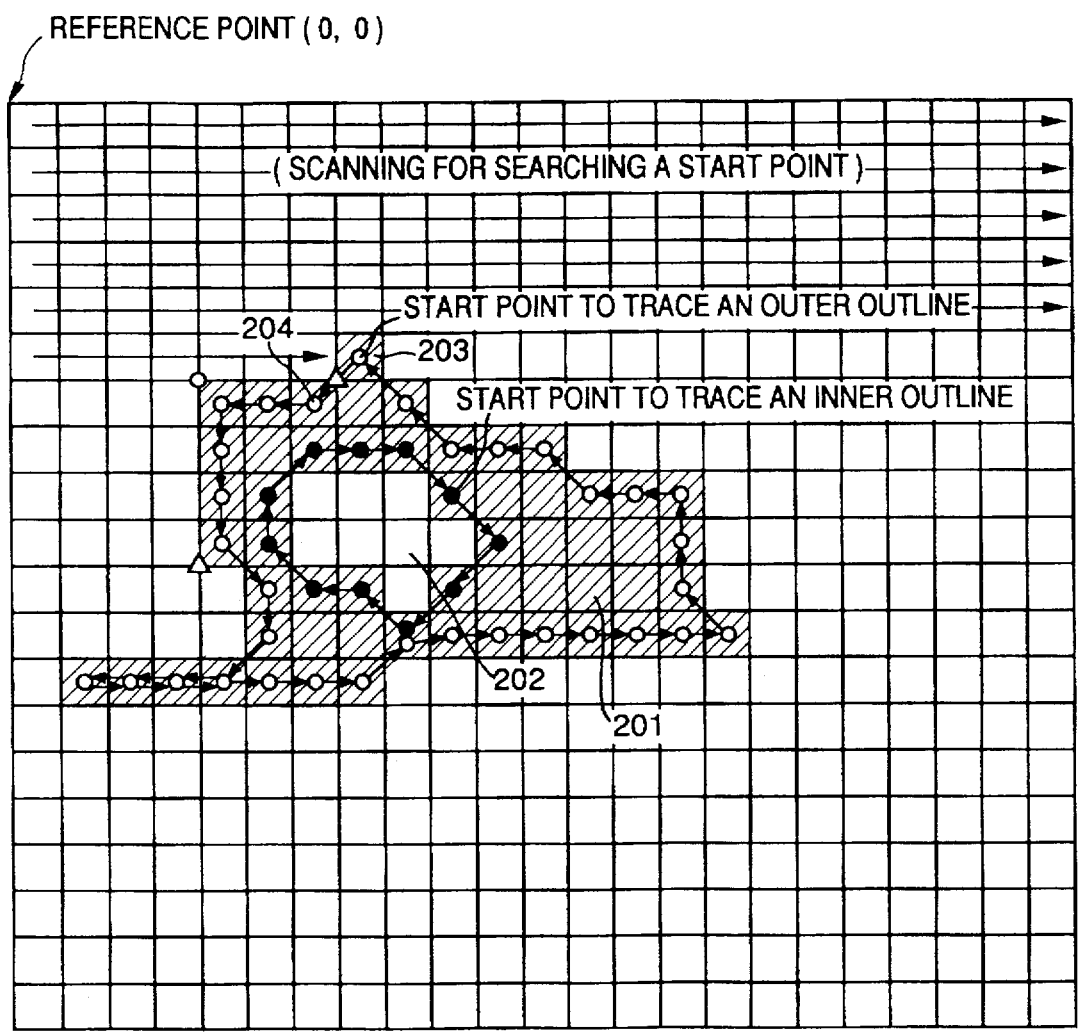
FIG. 2 is diagram to explain a conventional outline tracing method.
Figure 3:
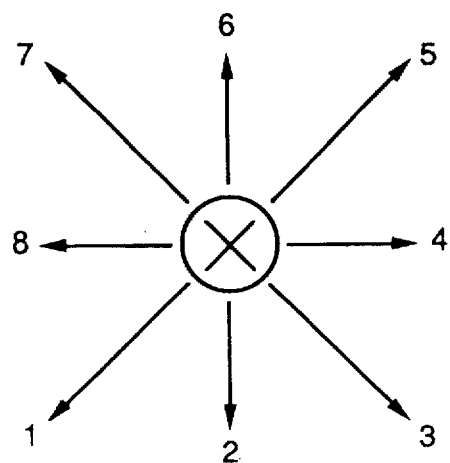
FIG. 3 is a diagram showing directions for tracing an outline dot in the prior art.
Figure 4:
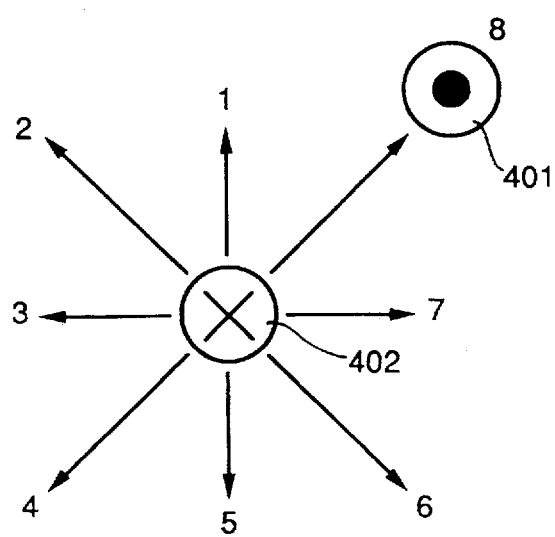
FIG. 4 is another diagram showing directions for tracing an outline dot in the prior art.

FIG. 1 is a block diagram illustrating the construction of an outline extraction apparatus of the first embodiment according to the present invention. This apparatus obtains vectors forming an outline from coded image data received as MH code data and outputs vector data to a magnetic disk in a form of coordinate data (coordinates of start point and end point).

In the diagram, a microprocessor (CPU) 1 connects to RAM 2, MH coder/decoder 3, I/O port 4, and ROM 7 through a bus 6. A control procedure of the CPU 1 is stored in the ROM 7 in a form of program. The bus 6 connects to a magnetic disk 5 through the I/O port 4. In this embodiment, it is arranged so as to obtain coordinates of an outline dot from the received coded image data. However, it can be arranged so as to obtain the coordinates from the coded image data which is stored in the magnetic disk 5 in advance. Furthermore, the obtained coordinate data is stored in the magnetic disk 5 in this embodiment. However, this does not impose a limitation upon the invention. For example, another process such as enlargement/reduction process can be performed by using the outline dot coordinates.

Figure 5:
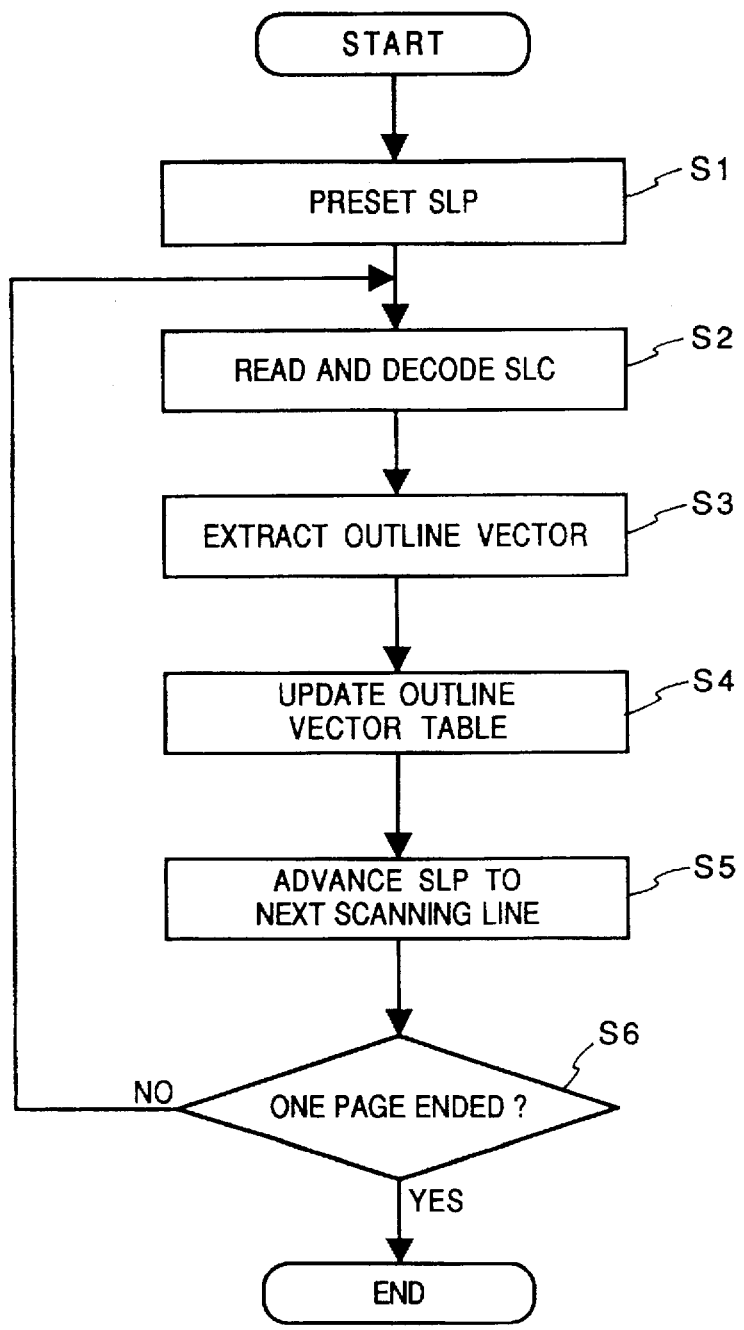
FIG. 5 is a flowchart illustrating an outline vector extraction process in the first embodiment.

Referring to a flowchart of FIG. 5, the operation of the apparatus of the present embodiment is explained below. This flowchart illustrates a procedure for control program process stored in the ROM 7 and this process is executed by the CPU 1. The procedure starts when the coded image data is read for one page into the RAM 2. The abbreviations used in FIG. 5 are:

SLC: coded data corresponding to a scanning line of interest; and

SLP: a pointer indicating a scanning line of interest.

SLC and SLP are stored in a work area provided in the RAM 2.

In FIG. 5, at step S1, a value of the SLP is preset so as to instruct a leading scanning line of the coded data of that page. At step 2, the coded data (SLC) of the scanning line instructed by the pointer SLP is read out from the RAM 2 and decoded. Since the coded data is an MH code, decoded data represent a run length of white/black pixel.

At step S3, outline vectors are extracted from data which has been decoded at step S2. The detail of this process will be described later. At step S4, referring to the outline vector table (FIG. 9), if there is a pair of vectors, in the vector table, in which directions are opposite to each other and a start/end point of one vector is an end/start point of the other vector, the outline vector obtained at step S3 is removed from the vector table and eliminated. The rest of vectors are registered with the vector table and the process proceeds to step S5. At step S5, the pointer (SLP) is advanced to the next scanning line position. At step S6, it is judged whether a process for one page has ended. If the result is "NO", the process returns to step S2, while if the result is "YES", the process ends.

Figure 6A:
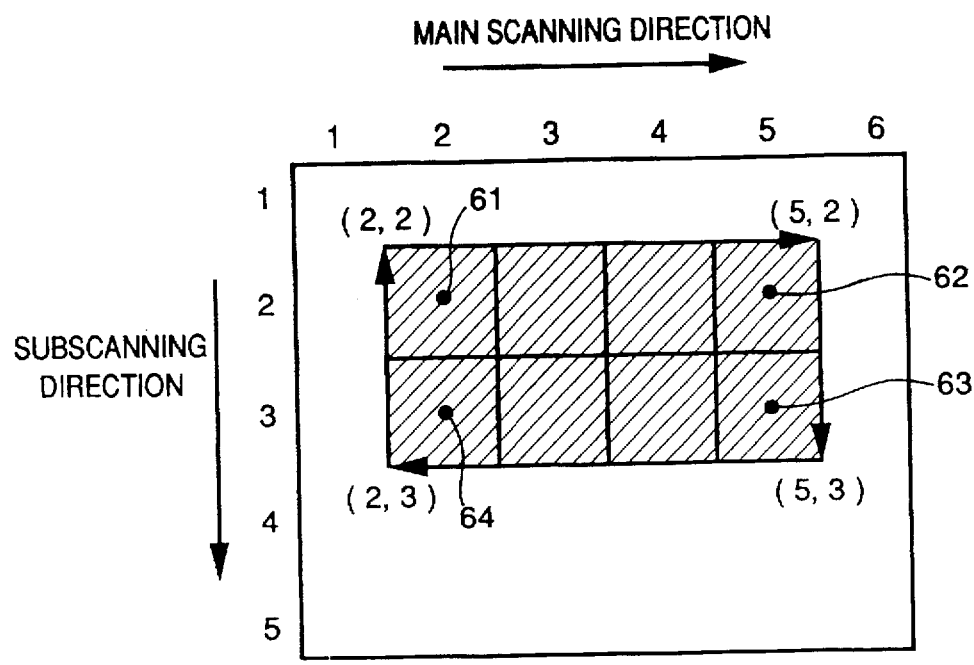
FIGS. 6A and 6B are diagrams to explain the outline vectors.

FIG. 6A is a diagram to explain the outline vectors. The shaded area is an area corresponding to black pixels and points (61, 62, 63, 64) at the four corners of the pattern respectively indicate a center of the black pixel. It is assumed that the coordinates of the four points are (2, 2), (5, 2), (5, 3), (2, 3) and arrows along with the outline of this pattern are outline vectors. An outline vector always keeps a black pixel on the right side and outline vectors are arranged in the clockwise direction. However, this arrangement can be inverted so as to keep the black pixel on the left side, in the counterclockwise direction.

It is further assumed that a start point/end point of the outline vector is located on an intersecting point of the main scanning line and sub-scanning line. A location of a pixel is represented by a positive integer and two dimensional coordinates. For example, four connecting vectors (arrows) in FIG. 6A have four points of the coordinate system such as (1.5, 1.5), (5.5, 1.5), (5.5, 3.5), and (1.5, 3.5). Each of which is a start point of one vector and end point of the other vector. Each of the four vectors is expressed as follows:

[(1.5, 1.5), (5.5, 1.5)]

[(5.5, 1.5), (5.5, 3.5)]

[(5.5, 3.5), (1.5, 3.5)]

[(1.5, 3.5), (1.5, 1.5)]

Figure 6B:
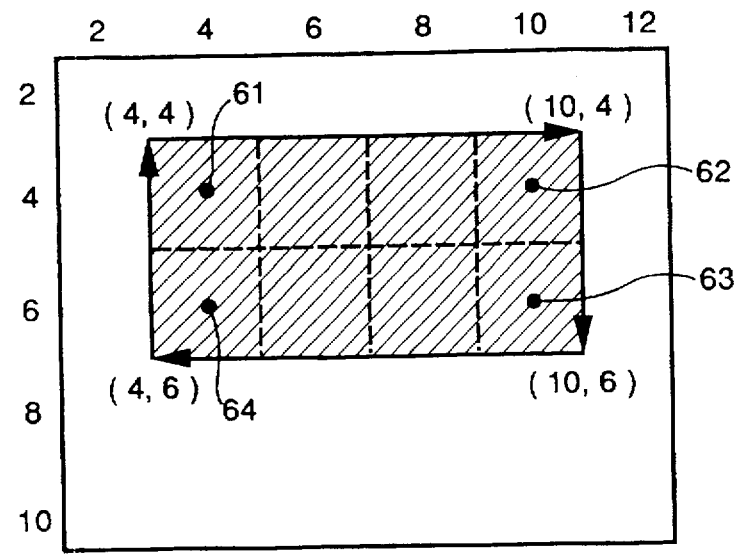

In order to simplify the explanation, a decimal number is avoided and a position of pixel (a center of each pixel) are expressed by even numbers as shown in FIG. 6B, and the coordinates of start/end point of a vector are expressed by odd numbers. That is, an image of m×n pixels is expressed by 2m×2n in the coordinates of positive even integers. Accordingly, the image pattern having the points 61–64 in FIG. 6A can be expressed by the coordinates (4, 4), (10, 4), (10, 6), (4, 6). The start/end points of each vector are (3, 3), (11, 3), (11, 7), (3, 7). Accordingly, the four vectors in FIG. 6B are expressed as:

[(3, 3), (11, 3)], [(11, 3), (11, 7)]

[(11, 7), (3,7)], [(3,7), (3,3)]

It is assumed that a binary image is comprised of m (pixels)×n (rasters) (wherein m, n are positive integers) and the i-th pixel position of the j-th raster is expressed by (2i, 2j) (i<m, j<n, wherein i, j are positive integers).

<Outline Vector Extraction Process>

Figure 7:
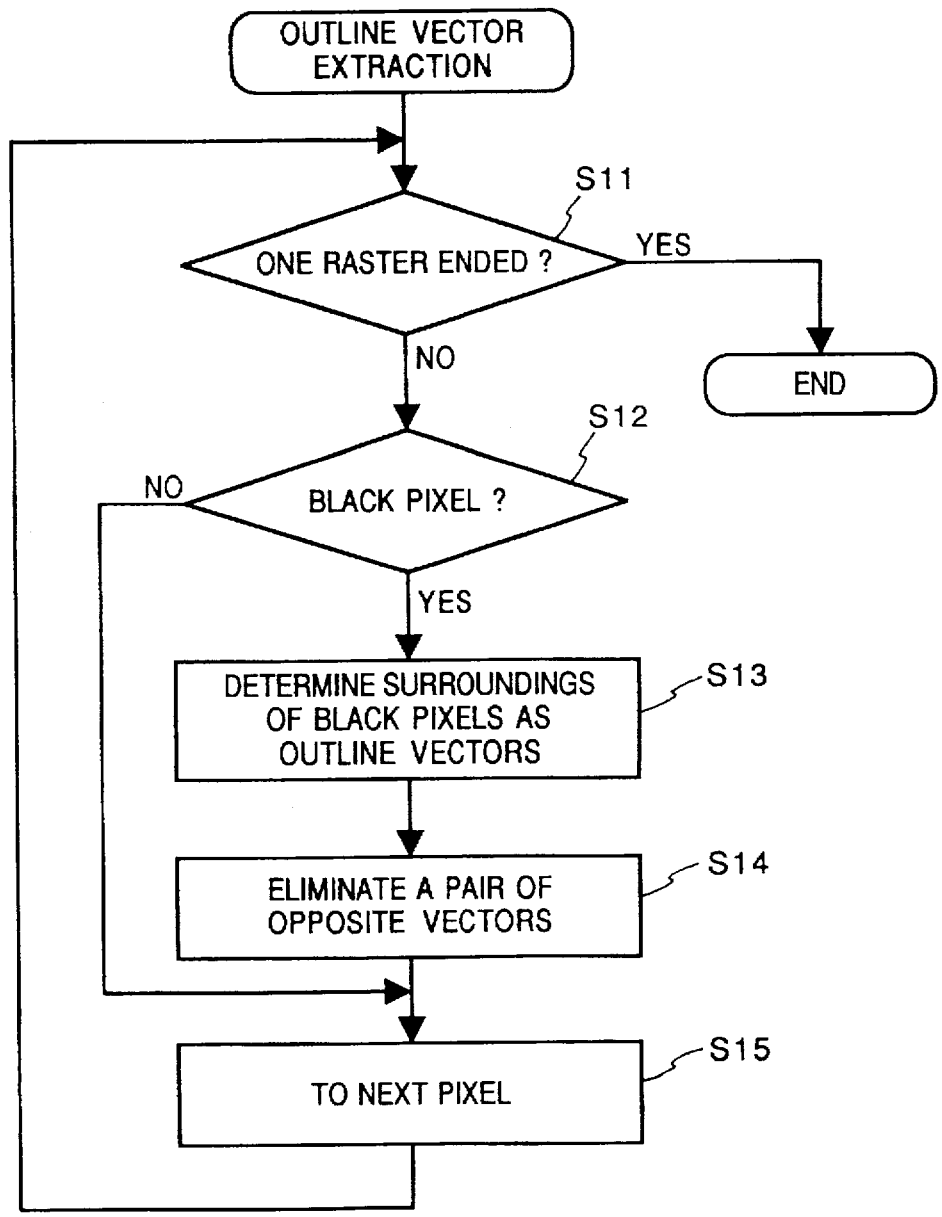
FIG. 7 is a flowchart illustrating an outline vector extraction process of the first embodiment.

An outline vector extraction process at step S3 is described with reference to the flowchart of FIG. 7.

At step S11, it is tested whether or not the process for all pixels of a scanning line of interest has ended. If the process has ended, the process of step S3 ends. If the process has not ended, the process proceeds to step S12 where whether or not a pixel of interest is a black pixel. If the pixel is not black, a pixel of interest is advanced to the next pixel of the line and the process returns to step S11. On the other hand, if it is a black pixel, the process proceeds to step S13 where a perimeter of the pixel is determined as outline vectors. That is, if the pixel of interest is located at (m, n), the outline vector is expressed by:

[(m−1, n−1), (m+1, n−1)], [(m+1, n−1), (m+1, n+1)],

[(m+1, n+1), (m−1, n+1)], [(m−1, n+1), (m−1, n−1)].

When the outline vectors of the pixel of interest are obtained in this way, the process proceeds to step S14 where it is examined if there is a vector in which the vector direction is opposite to the obtained outline vector. If there is any, that pair of vectors is eliminated. This indicates that a partial process of updating the outline vector table at step S4 is performed with respect to the subscanning direction. If there is a pair of vectors in which the direction is opposite to each other (the start and end points of one vector are the same as the end and start points of the other vector), this pair of vectors is eliminated because the pixels on both sides of the pair of vectors are continuing. The process proceeds to step S15 where a pixel of interest is advanced to the next pixel.

The above procedure is described with reference to an image pattern of FIG. 8A.

Figure 8A:
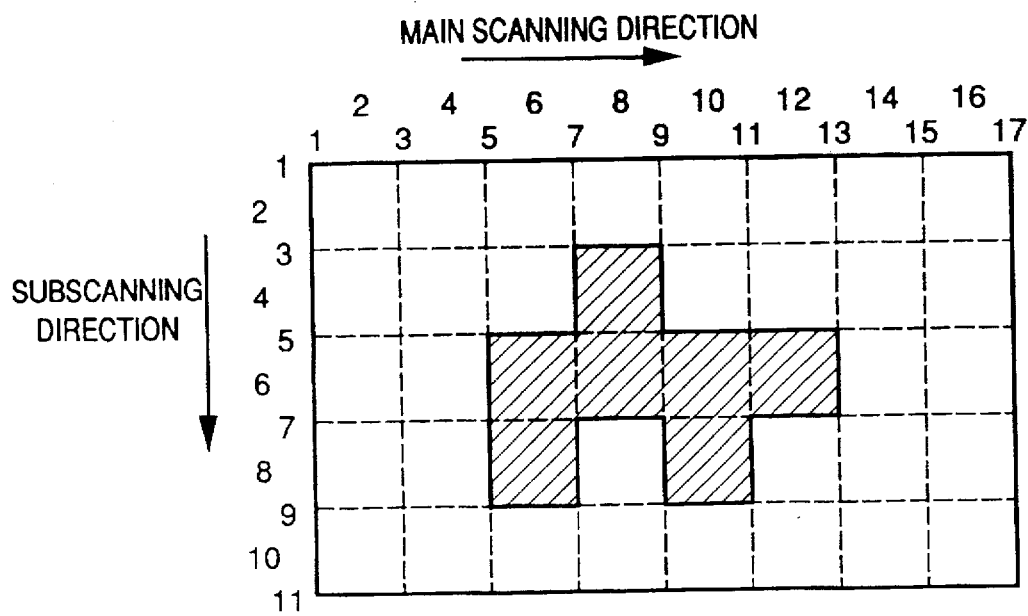
FIGS. 8A-8C are diagrams to explain the outline vector extraction process in the first embodiment.

In the case of the image data which is obtained by receiving and decoding an MH code shown in FIG. 8A, a raster of interest (8 pixels) becomes all white pixels at step S2 since a scanning line of interest (SLP) is preset to a leading scanning line of the image data. In this case, there is no outline, no process is performed at step S3 and S4. At step S5, the scanning line of interest is advanced to the next line and the process returns to step S2 based upon the judgment of step S6. At step S2, again the MH code is decoded and it is examined if a black pixel is included in the image data.

In the second scanning line, it is known from FIG. 8A that the scanning line of interest is comprised of 3 white pixels, 1 black pixel, and 4 white pixels. Accordingly, since it is recognized that there is a black pixel at the fourth pixel on the scanning line of interest from the information obtained at step S3, the outline vectors of the black pixel are extracted. As apparent from FIG. 8B, the outline vectors are expressed by the aforementioned method as follows:

[(7, 3), (9, 3)], [(9, 3), (9, 5)]

[(9, 5), (7, 5)], [(7, 5), (7, 3)]

The process proceeds to step S4 where registered data of the outline vector table as shown in FIG. 9 is referred and it is examined if there is a vector in which the start point is the end point of the vector obtained at step S3. At this point, there is no entry in this table, however, the outline vector data obtained in step S3 are registered in this table.

Figure 8B:
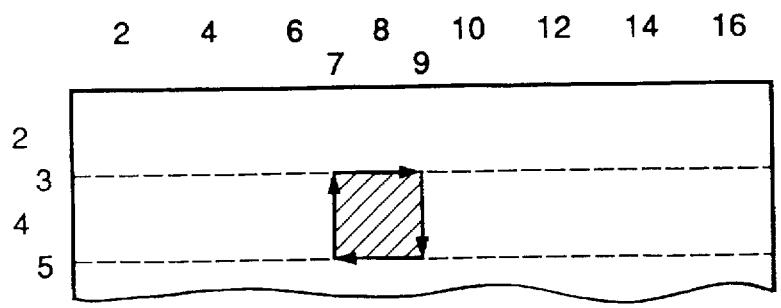

FIG. 10 is an outline vector table showing the data obtained by registering the outline vector data of FIG. 8B.

In FIG. 10, vertically arranged numbers on the left end represent vector numbers and the coordinates of a start point and end point of each vector are registered. In the case where there are two connecting vectors, if a start point of a first vector is an end point of a second vector, the second vector is called as an "incoming vector" to the first vector. If an end point of the first vector is an start point of a third vector, the third vector is called as an "outgoing vector" to the first vector. For example, in FIG. 10, an incoming vector of the vector No. 0 is the vector No. 3 and an outgoing vector is the vector No. 1.

Figure 8C:
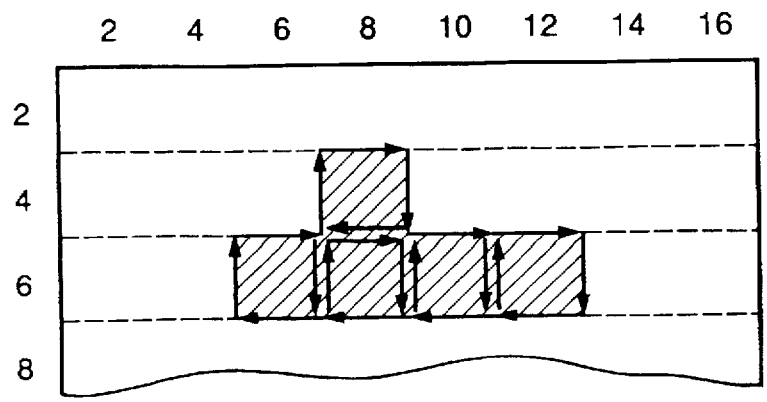

When the outline vectors are registered in this way, the scanning line of interest is advanced to the next line and the process proceeds to step S2. As aforementioned above, since the information of pixel arrangement (2 white, 4 black, 2 white pixels in the main scanning direction) can be obtained by reading and decoding the coded data of the scanning line of interest, the outline vectors of the four black pixels are extracted at step S3. Each outline vector can be obtained in a unit of pixel as shown in FIG. 8C. In this case, a pair of vectors in which the direction is opposite to each other is eliminated. In the example of FIG. 8C, the following pairs are eliminated:

[(7, 5), (7, 7)] and [(7, 7), (7, 5)]
[(9, 5), (9, 7)] and [(9, 7), (9, 5)]
[(11, 5), (11, 7)] and [(11, 7), (11, 5)]

Accordingly, a group of vectors (hereinafter referred to as "group B") which can be obtained from FIG. 8C is as follows:

[(5, 5), (7, 5)], [(7, 5), (9, 5)]
[(9, 5), (11, 5)], [(11, 5), (13, 5)]
[(13, 5), (13, 7)], [(13, 7), (11, 7)]
[(11, 7), (9, 7)], [(9, 7), (7, 7)]
[(7, 7), (5, 7)], [(5, 7), (5, 5)]

Accordingly, if the outline vectors are obtained in a unit of pixel, vectors to be eliminated at step S4 can be easily obtained. At step S4, each of vectors in which the start point value and end point value are replaced by each other and it is compared with the vector data registered with the outline vector table (FIG. 10). If there is any pair, it is removed. In the embodiment, [(7, 5), (9, 5)] in the vector group B is matched with the vector No. 2 in the outline vector table, both vectors [(7, 5), (9, 5)] and [(9, 5), (7, 5)] are eliminated and the data of the vector table becomes as FIG. 11. Along with the elimination of vector No. 2, the outgoing vector of the vector No. 1 is changed from the vector No. 2 to the vector No. 5 in which the start point is at (9, 5) where is the end point of the vector No. 1. At the same time, the incoming vector of the vector No. 3 is changed from the vector No. 2 to the vector No. 4 in which the end point is (7, 5) where is the start point of the vector No. 3.

After that, the scanning line of interest is advanced to the next line (scanning line 8 of FIG. 8A) and, if the outline vector extraction process has not ended for one page, the process returns to step S2 where the MH code is read and decoded and the information of pixel arrangement (2 white, 1 black, 1 white, 1 black, and 3 black pixels) can be obtained. If a group of vectors (hereinafter referred to as a "group C") is formed in the same manner as that of the group B from the information, the following vectors are obtained:

[(5, 7), (7, 7)], [(7, 7), (7, 9)]
[(7, 9), (5, 9)], [(5, 9), (5,7)]
[(9, 7), (11, 7)], [(11, 7), (11, 9)]
[(11, 9), (9, 9)], [(9, 9), (9, 7)]

The process proceeds to step S4 where the outline vector data (FIG. 11) which has already registered with the outline vector table and the vectors of the group C in which the start point and end point are replaced by each other are compared, and, if there is any matched vectors, it is eliminated. In this case, since the vector Nos. 9 and 11 in the outline vector table are matched with the data such as [(5, 7), (7, 7)] and [(9, 7), (11, 7)], these vectors are eliminated and the table is updated as shown in FIG. 12. Subsequently, the scanning line of interest is advanced to the next line (scanning line 10 in FIG. 8A) and process at step S2 is performed again since the outline vector extraction for one page has not ended yet.

When the MH code of this scanning line is decoded, all pixels in this line are white pixels as apparent from FIG. 8A. Therefore, no process is performed at steps S3 and S4 and the process proceeds to step S5. At step S6, it is judged that the outline vector extraction for one page has ended and the process ends.

When the above-described processes end, each of vector data in the outline vector table is examined to determine if there are at least two continuously arranged vectors either in vertical direction or horizontal direction. If there are any, they are combined into one vector. If the y coordinate of the start point is the same as that of the end point, it is judged that these vectors are horizontal vectors. On the other hand, if the x coordinate of the start point is the same as that of the end point, it is judged that these vectors are vertical vectors.

In FIG. 12, the vectors No. 5 and No. 6 are continually arranged in the horizontal direction, they are combined into one vector. The vectors No. 12 and No. 15 are continuously arranged in the vertical direction, they are combined into one vector. The updated data is shown in FIG. 13.

In the embodiment, the vector No. 6 is incorporated into the vector No. 5 and the x coordinate of the end point and outgoing vector number of the vector No. 5 are changed to the x coordinate of the end point and the outgoing number of the vector No. 6. Furthermore, if there is any vector in which the incoming vector number is "6", it is changed to "5" (vector No. 7). Similarly, the vector No. 12 is incorporated into the vector No. 15. The y coordinate of the end point and outgoing vector number of the vector No. 15 are changed to the y coordinate of the end point and outgoing number of the vector No. 12. Furthermore, if there is any vector in which the incoming vector number is "12", it is changed to "15" (vector No. 4). In this embodiment, the incorporated vector is represented by the vector in the start point side, however, this does not impose a limitation upon the invention. It can be arranged that the vector number in the end point side can be used or these settings can be combined.

Figure 14:
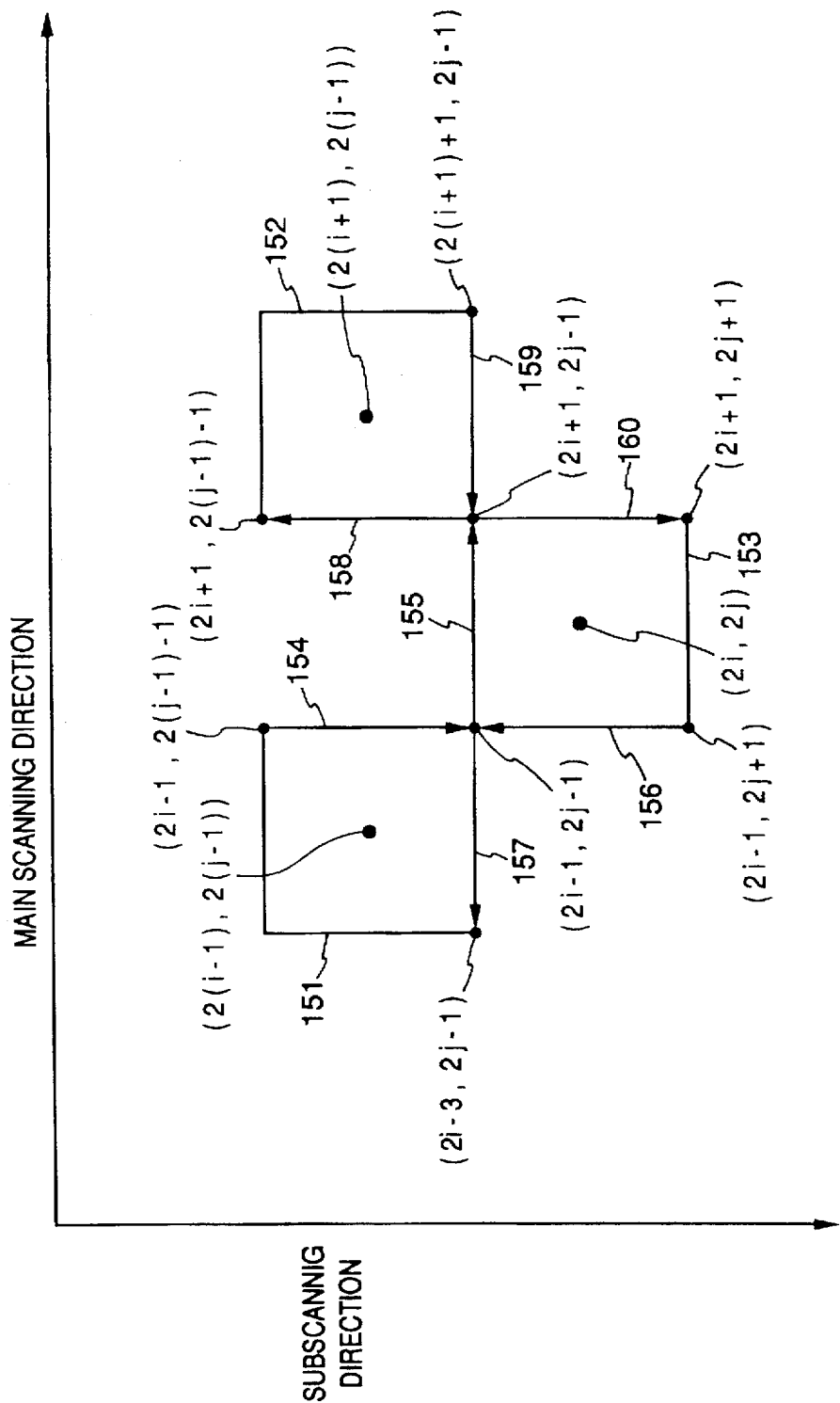
FIGS. 14 and 15 are diagrams to explain an example of arrangement of incoming/outgoing vectors.

Though the example of FIGS. 8A–8C do not show, there is the case where each of the pixels 151, 152, 153 forms a loop of outline vectors as shown in FIG. 14. In order to avoid this case and form a single continuous loop from the three pixels, the following process needs to be performed in addition to the above-described process when the outline vector table is updated at step S4. The detail is described below.

It is assumed that the pixel 153 is on the scanning line of interest and the center of the pixel 153 is located at $(2i, 2j)$. The centers of the pixels 151 and 152 are respectively located at $(2(i-1), 2(j-1))$, $(2(i+1), 2(j-1))$.

The vector 154 of the pixel 151 registered with the outline vector table is $[(2i-1, 2(j-1)-1), (2i-1, 2j-1)]$, the outgoing vector number of the vector 154 is changed to the vector 155, that is, $[(2i-1, 2j-1), (2i+1, 2j-1)]$. The outline vector 156 of the pixel 153 in which the end point is $(2i-1, 2j-1)$ is connected to the vectors 157. The incoming vector number of the outline vector 155 is changed to the number of the outline vector 154.

Furthermore, the incoming vector number of the outline vector 157 [(2i–1, 2j–1), (2i–3, 2j–1)] is changed to the vector number of the outline vector 156 [(2i–1, 2j+1), (2i–1, 2j–1)] and the outgoing vector number of the outline vector 156 is changed to the vector number of the outline vector number 157.

Similarly, the incoming vector number of the outline vector 158 [(2i+1, 2j–1), (2i+1, 2(j–1)–1)] of the pixel 152 registered with the outline vector table is changed to the vector number of the outline vector 155 of the pixel 153 and the outgoing vector number of the outline vector 155 is changed to the vector number of the outline vector 158.

Furthermore, the outgoing vector number of the outline vector 159 [(2(i+1)+1, 2j–1), (2i+1, 2j–1)] of the pixel 152 is changed to the vector number of the outline vector number 160 [(2i+1, 2j–1), (2i+1, 2j+1)] of the pixel 153 and the incoming vector of the outline vector 160 is changed to the vector number of the outline vector 159.

Figure 15:
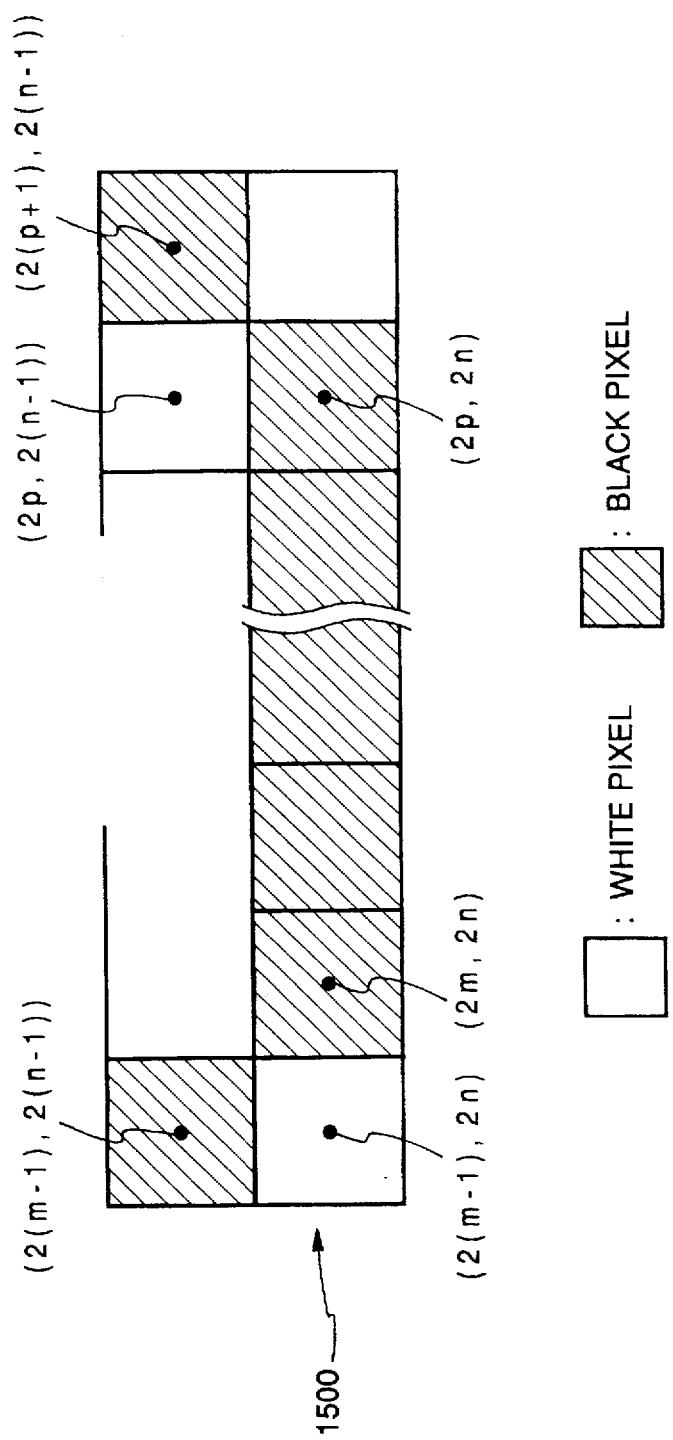

As shown in FIG. 15, in the case where the coordinate of the start point of the black run of the scanning line 1500 of interest is (2m, 2n) and the coordinate of the end point is (2p, 2n), when the pixel at (2(m–1), 2(n–1)) is a black pixel and the pixel at (2(m–1), 2n) is a white pixel or when the pixel at (2(p+1), 2(n–1)) is a black pixel and the pixel at (2p, 2(n–1)) is a white pixel, the above process is performed. The above-described processes can be performed en bloc when the vector data for one page have been searched.

Figure 16:
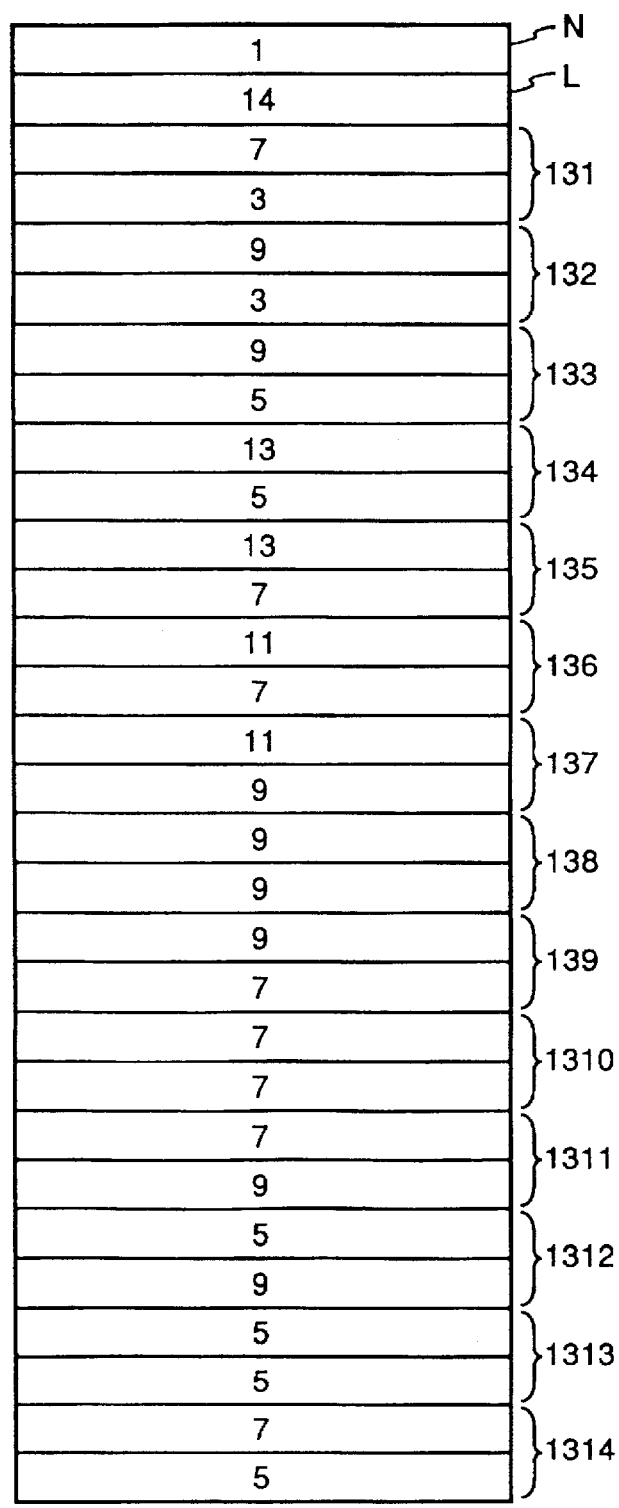
FIG. 16 shows an example of a final outline table which can be obtained from the outline vector table.

Accordingly, when the above process has ended on each vector, the data of the outline vector table is examined again. As shown in FIG. 16, the total number (N) of loop of the image data and the number (L) of vertices of each loop are stored. In this embodiment, since the only one loop exists, the total number (N) is "1". The table of vertex coordinates (131~1314) is formed and the outline vector extraction processing ends.

Figure 17:
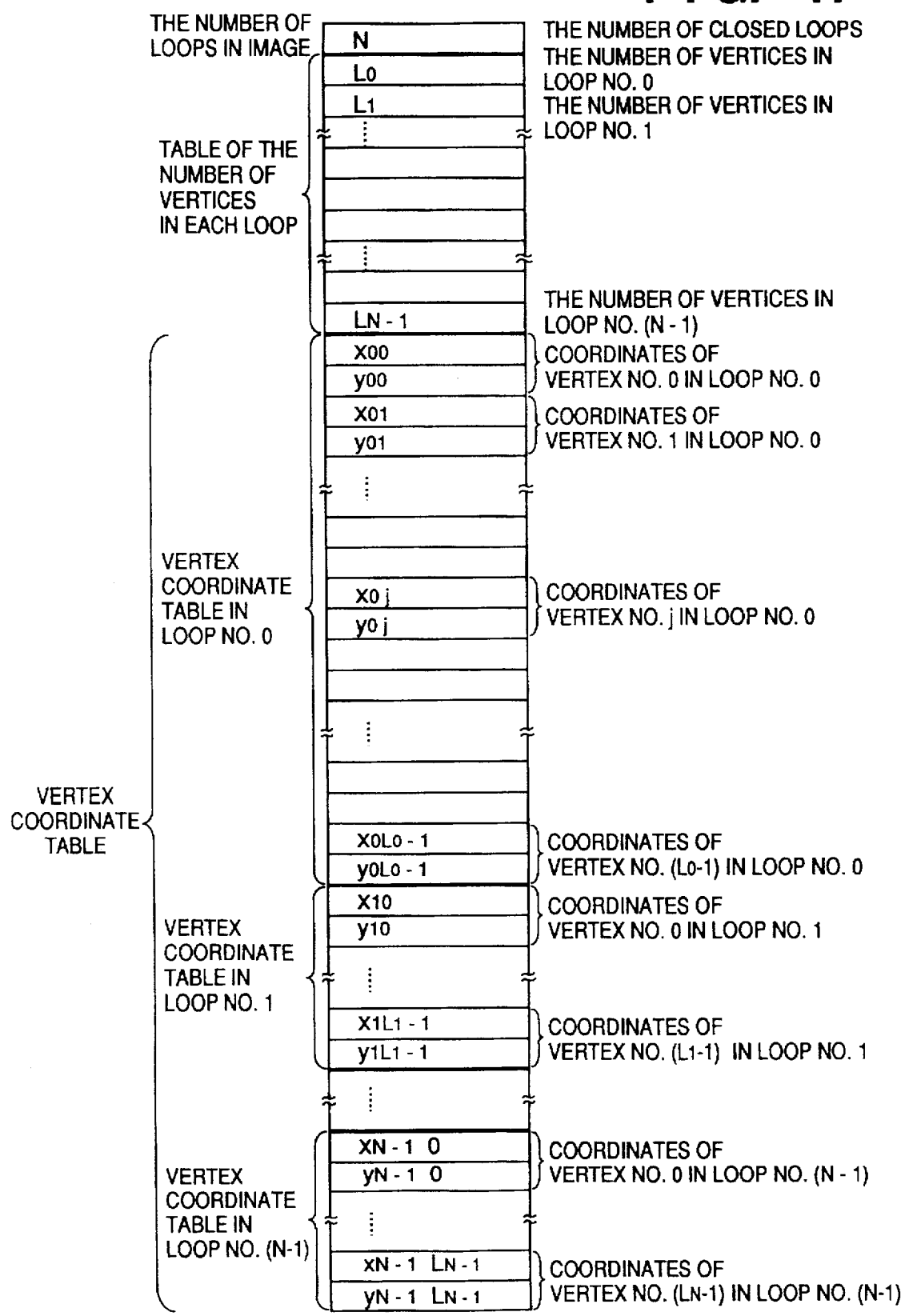
FIG. 17 illustrates a general data format of the outline table.

FIG. 17 shows a data format of a general outline table. That is, at the beginning of the table, the number of loop (N) in the image is stored, then the number of vertices of each loop ($L_o$~$L_{N-1}$) and the coordinates of the vertices in each loop are sequentially stored.

Figure 18:
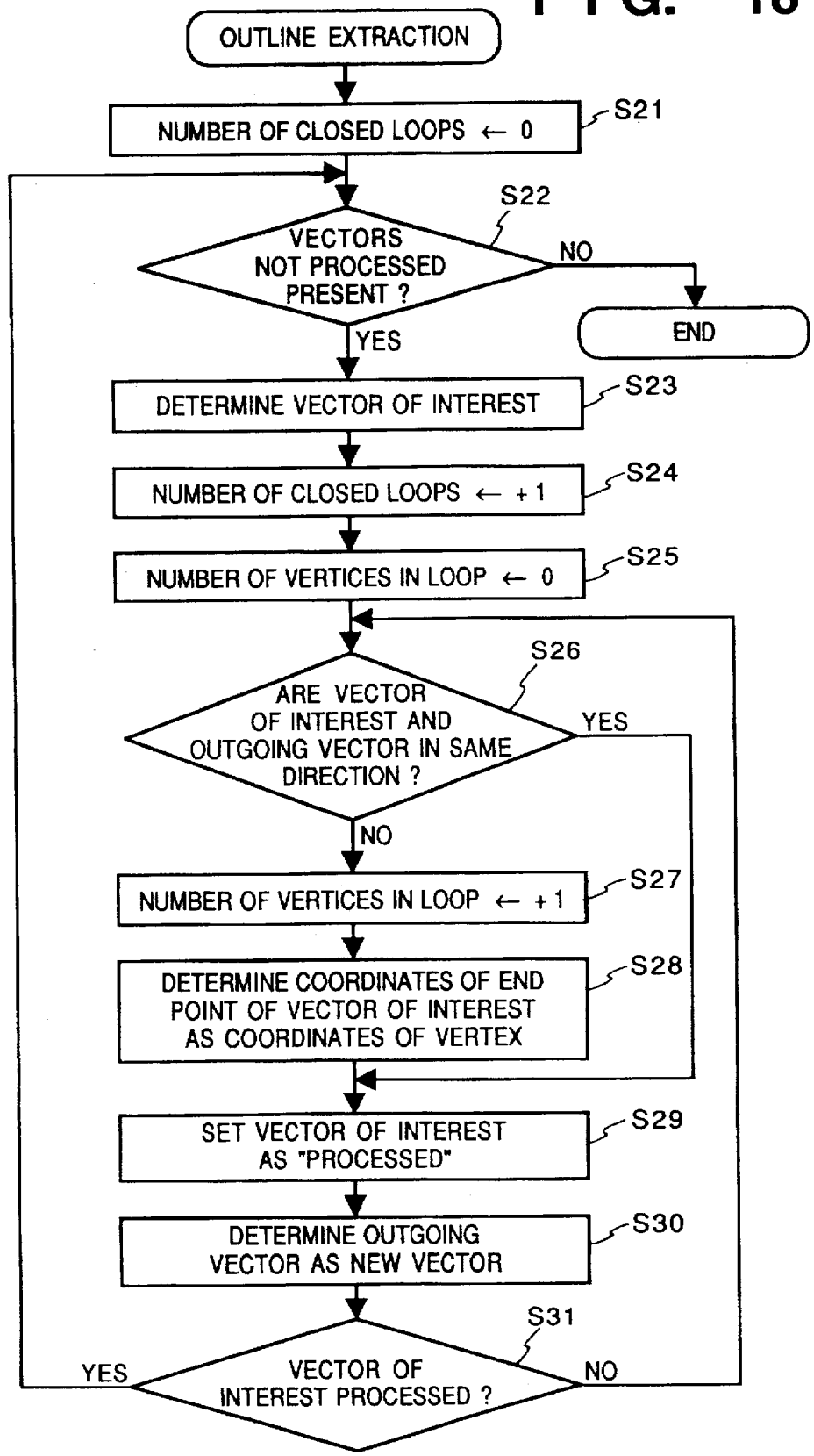
FIG. 18 is a flowchart illustrating a procedure to obtain the outline table from the outline vector table.

From the outline vector table shown in FIGS. 9~13, the procedure for forming the outline table of FIG. 17 is shown in the flowchart of FIG. 18. The control program which executes this process can be realized when the CPU 1 executes the program stored in the ROM 7.

At step S21, the number of closed loops in a page is initialized to 0. The process proceeds to step S22 where the outline vector table is examined from the beginning and vector on which the process has not performed is present. If it is not present, it means that the page is blank, thus the process ends. If there is any vector on which the process has not performed, the process proceeds to step S23 where that vector is determined as a vector of interest. In this case, since it is known that there is at least one closed loop, the number of closed loop is added by "1" (S24). At step S25, the number of vertices in the loop is preset to "0".

After this, the outline vectors are connected and the loop is traced. At step S26, it is examined if the vector of interest and the outgoing vector of the vector of interest are in the same direction. In order to examine the directions, the coordinate of the start point of the vector of interest and the coordinate of the end point of the outgoing vector are compared. If x elements or y elements of the coordinates of two points are identical, it is judged that both vectors are in the same direction. If it is judged that both vectors are in the same direction, the process proceeds to step S29 where the vector of interest is marked as a vector on which the process has performed.

On the other hand, at step S26, if it is judged that the direction are opposite to each other, the process proceeds to step S27 where the number of vertices in the loop is added by "1"because it can be judged that the end point of the vector of interest is a vertex. At step S28, the coordinate of the end point of the vector of interest is set to the coordinate of the vertex of the loop.

Accordingly, the process on the vector of interest end. The process proceeds to step S29 where a mark indicating that the process has ended is filled with a blank for the vector of interest in the outline vector table. After this, the process proceeds to step S30 where an outgoing vector of the current vector of interest is determined as an updated vector of interest. Then the process proceeds to step S31 where whether or not the process has already performed on that vector. If the process has performed, it means that the closed loop has gone around and the process returns to step S22 where another vector to which the process has not performed is searched in the outline vector table. If the process has performed, the process returns to step S26 where vertices in the next loop is examined.

The number of loop (N), the number of vertex ($L_i$), and the coordinates of vertices are stored in the outline table shown in FIG. 17.

Since the outline vectors can be directly extracted from the coded data by the above-described method, a capacity of memory can be reduced in comparison with the conventional method that the coded data are decoded and the pattern image is stored in the memory, thus resulting in the high-speed outline vector extraction processing.

In the case where the received data is MR codes, MMR codes, arithmetic codes, the coded data are sequentially decoded and the black run length (the number of pixel) and a start point and end point of this black run are calculated. In this way, the outline data can be extracted in the same manner as that of the case where the MH codes are decoded in the first embodiment.

In the case where the received data is raw data (the data which has not coded), the outline vectors can be extracted in the same manner as that of the first embodiment by calculating black run length (the number of pixel) and coordinates of a start point and end point of this black run.

In the first embodiment, in the process for comparing the registered outline vectors and newly obtained outline vectors and judging which vectors are eliminated (step S4 of FIG. 5), if the data registered with the outline vector table are all searched, an amount of processing is increased. Therefore, out of the newly obtained outline vectors, the horizontal vector in which y-coordinate is (2j–1) (It is assumed that y-coordinate of a currently processing line is 2j) and the horizontal vector in which y-coordinate is (2j–1) registered with the outline vector table are compared and it is judged whether or not they are eliminated. Accordingly, the amount of processing is considerably reduced and a high-speed processing is enabled.

Furthermore, instead of the MH coder/decoder 3 in the first embodiment, it is capable of receiving coded data or raw data from the magnetic disk 5 and extracting an outline vector from the data.

[Second Embodiment]

The outline extraction process of image data of the second embodiment according to the present invention is now described.

Figure 19:
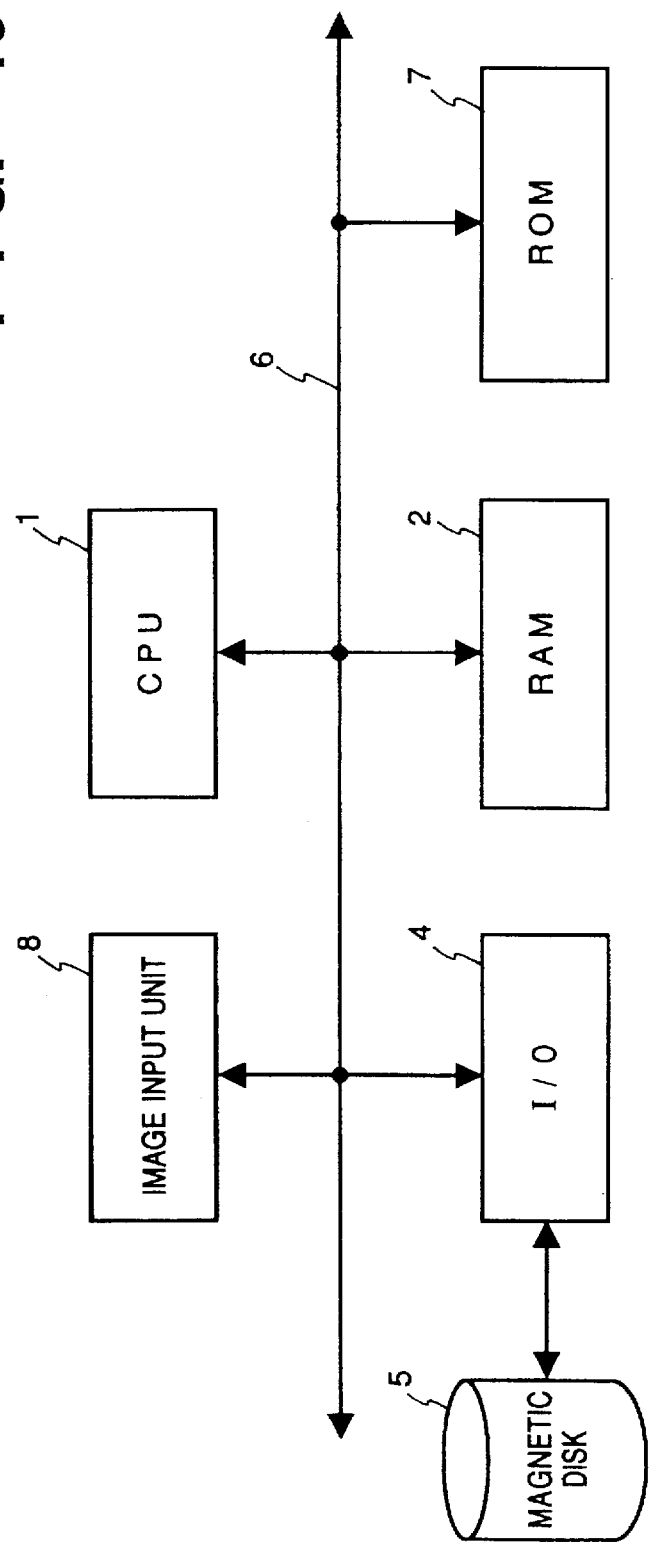
FIG. 19 is a block diagram illustrating the construction of the outline extraction apparatus of the second embodiment.

FIG. 19 is a block diagram illustrating the construction of the outline extraction apparatus of the second embodiment. In this embodiment, outline vectors are extracted from the image data and outputted to the magnetic disk 5. The construction of the circuit is almost same as that of the first embodiment, however, the present embodiment differs from the first embodiment in that image data is inputted from the image input unit 8.

The operation of the apparatus of the second embodiment is described with reference to the flowchart of FIG. 20. The control program which executes the control indicated by this flowchart is stored in the ROM 7 and executed by the CPU 1.

At step S41, variables i and j are respectively set to "1". The variable i performs a function as a counter which counts pixels in the main scanning direction. The variable j also performs a function as a counter which counts pixels in the subscanning direction. Both variables are set in work areas reserved in the RAM 2. The coordinate (i, j) represents a real coordinate of a pixel of interest. However, to avoid decimal fractions, it is assumed that the coordinate of the pixel of interest is (2i, 2j) (wherein i=1, . . . , m, j=1, . . . , n) in the process described below. It is further assumed that the number of pixel of the image data in the main scanning direction is m pixels and that in the subscanning direction is n pixels.

At step S42, it is judged whether the pixel of interest (2i, 2j) is a black pixel or white pixel. If the pixel is white, the process proceeds to step S46, while black, to step S43. At step S43, the following four outline vectors surrounding the pixel of interest (2i, 2j) are extracted (FIG. 22):

$$a=[(2i-1, 2j-1), (2i+1, 2j-1)]$$

$$b=[(2i+1, 2j-1), (2i+1, 2i+1)]$$

$$c=[(2i+1, 2j+1), (2i-1, 2j+1)]$$

$$d=[(2i-1, 2j+1), (2i-1, 2j-1)]$$

These vectors are registered with the outline vector table shown in FIG. 9.

The process proceeds to step S44 where the outline vector table is searched. If there is a vector which overlaps with the vector a, the vector a and overlapping vector are eliminated from the table. If there is a vector which overlaps with the vector d, the vector d and overlapping vector are eliminated from the table. Overlappying the vector x with vector y means that a start/end point of one vector is an end/start point of the other vector. It is assumed that vectors respectively overlappying with vectors b, c do not exist at this point. Furthermore, if the outline vector table is searched from the latest data to the oldest data, a time required for searching is reduced. In this embodiment, when the vectors a, b, c, d are registered with the outline vector table at step S43, overlapping vectors are eliminated from the table at step S44. However, there is a method that only the vectors b, c are registered with the outline vector table at step S43 and, if there is no vector overlapping with the vector a, the vector a is registered and, if there is no vector overlapping with the vector d, the vector d is registered.

Figure 21:
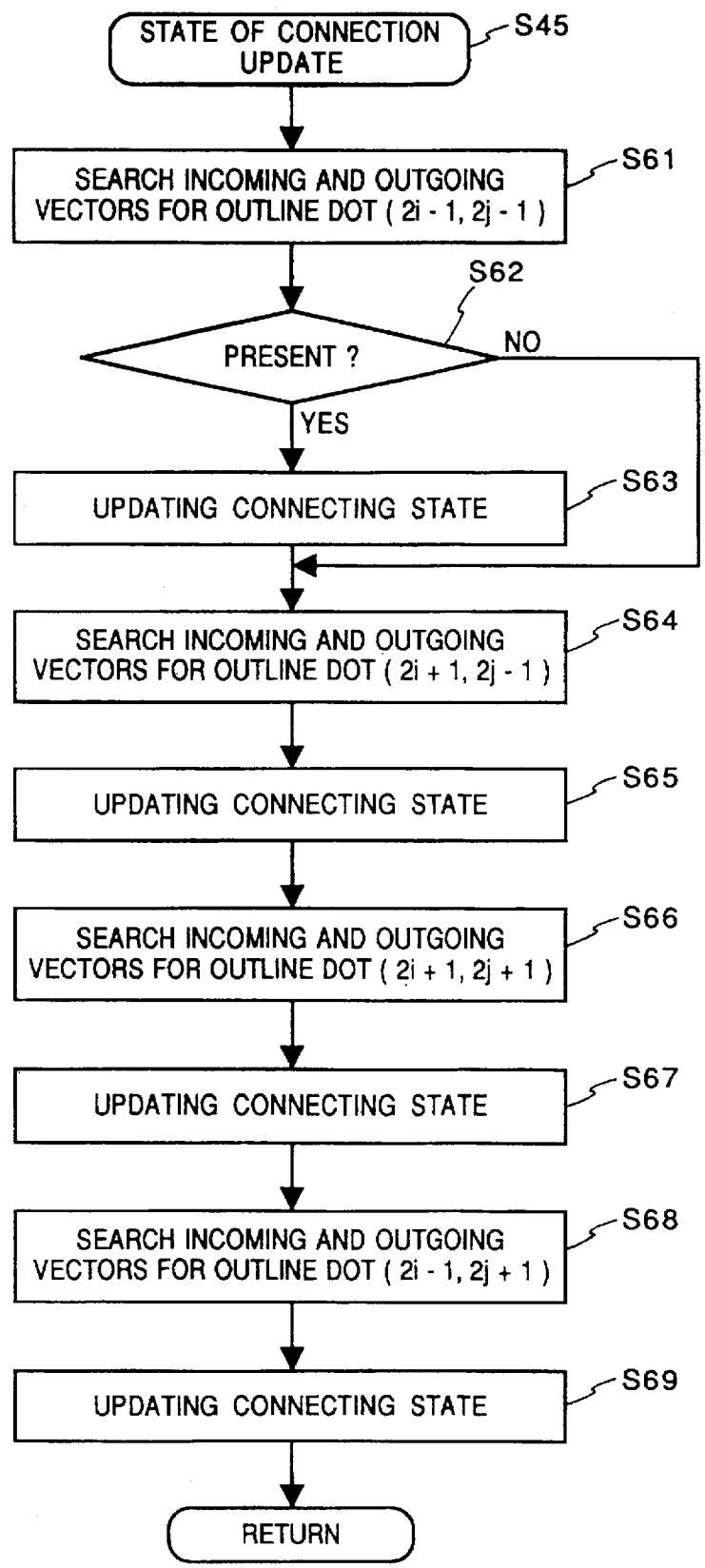
FIG. 21 is a flowchart illustrating a process to update a connecting state (arrangement) of the outline vector at step S45 of FIG. 20.

At step S45, a vector number indicating a direction and positions of the vectors connecting to the vector of interest (an incoming vector number/outgoing vector number) which are registered with the outline vector table are updated. The detail of this process is illustrated by the flowchart of FIG. 21.

As shown in FIG. 9, the outline vector table is comprised of coordinates of start and end point of a vector, vector number of a vector in which an end point is a start point of the vector of interest (referred to as an "incoming vector"), and a vector in which a start point is an end point of the vector of interest (referred to as an "outgoing vector"). To simplify the description, vector directions of "incoming vectors" or "outgoing vectors" for four outline dots (2i-1, 2j-1), (2i+1, 2j-1), (2i-1, 2j+1), (2i+1, 2j+1) of the pixel of interest (2i, 2j) are defined as follows:

1) Vector which comes into an outline dot (incoming vector): a vector in which the end point is the outline dot;

2) Vector which goes out from an outline dot (outgoing vector): a vector in which the start point is the outline dot;

3) Positive horizontal incoming vector: an incoming vector in which a y-coordinate of the start point and that of the end point are equal and an x-value of the end point is greater than that of the start point;

4) Negative horizontal outgoing vector: an outgoing vector in which a y-coordinate of the start point and that of the end point are equal and an x-coordinate of the start point is greater than that of the end point;

5) Positive vertical incoming vector: an incoming vector in which an x-coordinate of the start point and that of the end point are equal and a y-coordinate of the end point is greater than that of the start point;

6) Negative vertical incoming vector: an outgoing vector in which an x-coordinate of the start point and that of the end point are equal and a y-coordinate of the start point is greater than that of the end point;

7) Positive horizontal outgoing vector: an outgoing vector in which a y-coordinate of the start point and that of the end point are equal and an x-coordinate of the end point is greater than that of the start point;

8) Negative horizontal outgoing vector: an outgoing vector in which a y-coordinate of the start point and that of the end point are equal and an x-value of the start point is greater than that of the end point;

9) Positive vertical outgoing vector: an outgoing vector in which an x-coordinate of the start point and that of the end point are equal and a y-coordinate of the end point is greater than that of the start point;

10) Negative vertical outgoing vector: an outgoing vector in which an x-coordinate of the start point and that of the end point are equal and a y-coordinate of the start point is greater than that of the end point.

Figure 22:
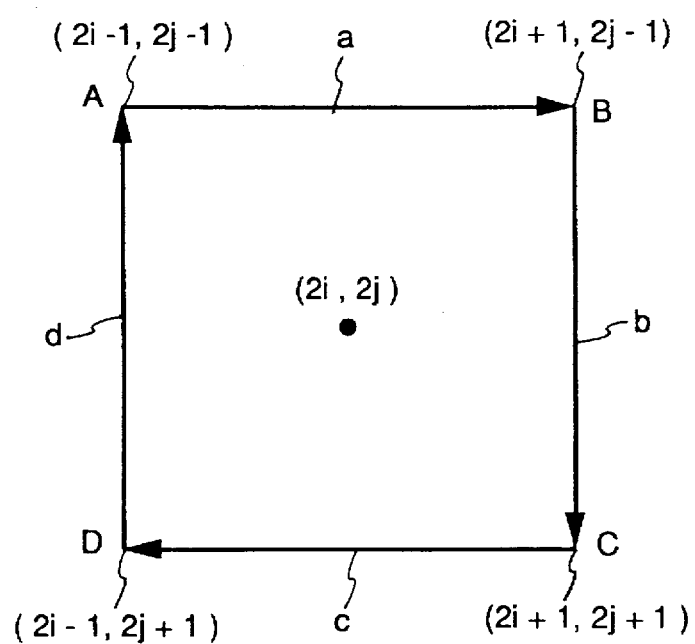
FIG. 22 is a diagram illustrating an example of the outline vector in the second embodiment.

Referring to the above-defined vectors and flowcharts in FIGS. 21, 22, incoming and outgoing vector numbers which are registered with the outline vector table are updated.

At step S61, the outline vector table is searched and an incoming vector or outgoing vector for the outline dot A (2i-1, 2j-1) in FIG. 22 is obtained.

The outline vector table is searched in order from the latest to the oldest data. The process proceeds to step S62. If there is an incoming vector or outgoing vector for the outline dot A is present, the process proceeds to step S63, while if there is not, the process proceeds to step S64.

Figure 23A:
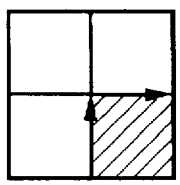
FIGS. 23A-23O are diagrams illustrating examples of connecting states of outline vectors in the second embodiment.
Figure 23B:
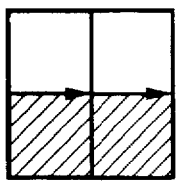
Figure 23C:
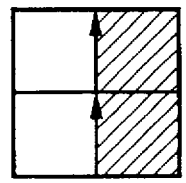
Figure 23D:
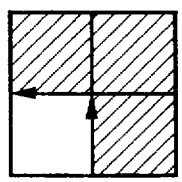
Figure 23E:
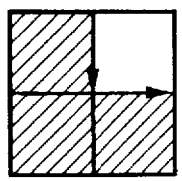
Figure 23F:
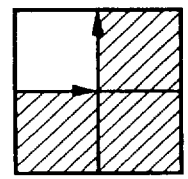
Figure 23G:
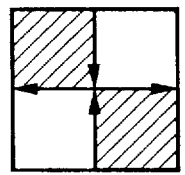
Figure 23H:
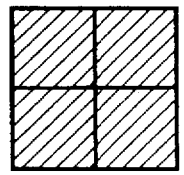
Figure 23I:
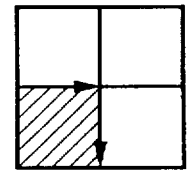
Figure 23J:
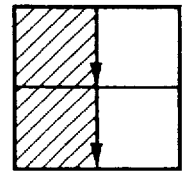
Figure 23K:
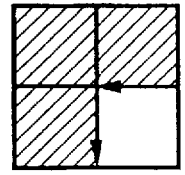
Figure 23L:
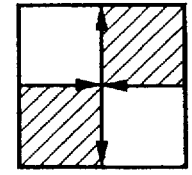
Figure 23M:
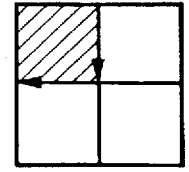
Figure 23N:
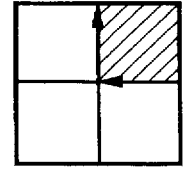
Figure 23O:
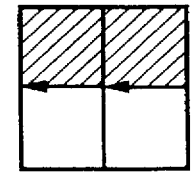

FIGS. 23A-23O illustrate possible arrangements of the four pixels (the arrangement where the four pixels are all in white is omitted). If the coordinates of the middle point of the four pixels is (2i-1, 2j-1), the pixel of interest in FIG. 22 will be located at the right bottom of the figure and the pixel should be black. The arrangements where the pixel at the right bottom is black are those of FIG. 23A, 23B, 23C, 23D, 23E, 23F, 23G, 23H, eight arrangements. However, the arrangement of FIG. 23H indicates the case where neither an incoming vector nor outgoing vector is present at step S62.

At step S63, in the case where one incoming vector and one outgoing vector are present, that is, in the case of six arrangements (except the arrangements of FIGS. 23G and 23H) from the eight arrangements, the outgoing vector number of the incoming vector is changed to the vector number of the outgoing vector and the incoming vector number of the outgoing vector is changed to the vector number of the incoming vector. When two of incoming and outgoing vectors are respectively present, that is the case of FIG. 23G, the outgoing vector number of a positive vertical incoming vector is changed to the vector number of a positive horizontal outgoing vector.

In the case of FIG. 23G, a vector g3 which was the outgoing vector of a vector g1 is changed to a vector g2. At the same time, a vector g4 which was the incoming vector of the vector g2 is changed to the vector g1.

Furthermore, an outgoing vector number of a negative vertical incoming vector is changed to a negative horizontal outgoing vector and an incoming vector number of a negative horizontal outgoing vector is changed to the vector number of a negative vertical incoming vector. In the case of FIG. 23G, the outgoing vector of the vector g4 is changed from the vector g2 to the vector g3. At the same time, the incoming vector of the vector g3 is changed from the vector g1 to the vector g4.

At step S64, the outline vector table is searched and an incoming vector or outgoing vector for the outline dot B (2i+1, 2j-1) in FIG. 22 is obtained. In FIGS. 23A-23O, it is assumed that the coordinates of the middle point of the four pixels is (2i+1, 2j-1). Since the pixel at the left bottom corresponds to the pixel of interest in FIG. 22, this pixel is black, and the pixel at the right bottom should be next processed. This case is represented by the arrangements of FIGS. 23I, 23J, 23K, 23L. In this case, since the pixel at the right bottom of the outline dot B (2i+1, 2j-1) has not processed yet, there should be incoming and outgoing vectors.

The process then proceeds to step S65. If there are one incoming vector and outgoing vector, that is the cases of FIGS. 23I, 23J, 23K, the outgoing vector number of an incoming vector is changed to the vector number of an outgoing vector and an incoming vector number of an outgoing vector is changed to that of the incoming vector. If there are two of incoming vectors and outgoing vectors, that is the case of FIG. 23L, the outgoing vector number of the positive horizontal incoming vector is changed to the vector number of a negative outgoing vector. At the same time, the incoming vector number of the negative vertical outgoing vector is changed to the vector number of the positive horizontal incoming vector number. Furthermore, the outgoing vector number of the negative horizontal incoming vector is changed to the vector number of the positive vertical outgoing vector. At the same time, the incoming vector number of the positive outgoing vector is changed to the vector number of the negative horizontal incoming vector.

The process proceeds to step S66 where the outline vector table is searched and an incoming vector or outgoing vector of the outline dot C (2i+1, 2j+1) in FIG. 22 is obtained. Only the arrangement of FIG. 23M 25 satisfies the condition. In the case of FIG. 23M, since there is a vector which comes into the outline dot C and goes out from the outline dot C, at step S67, the outgoing vector number of the incoming vector is changed to the vector number of the outgoing vector, while the incoming vector number of the outgoing vector is changed to the vector number of the incoming vector.

At step S68, the outline vector table is searched and a vector which comes into the outline dot D (2i-1, 2j+1) in FIG. 22 or goes out from the outline dot D is searched. The arrangements of FIGS. 23N and 23O are the cases. Since each of the above vectors is present, at step S69, the outgoing vector number of the incoming vector is changed to the vector number of the outgoing vector and the incoming vector number of the outgoing vector is changed to the vector number of the incoming vector.

Figure 20:
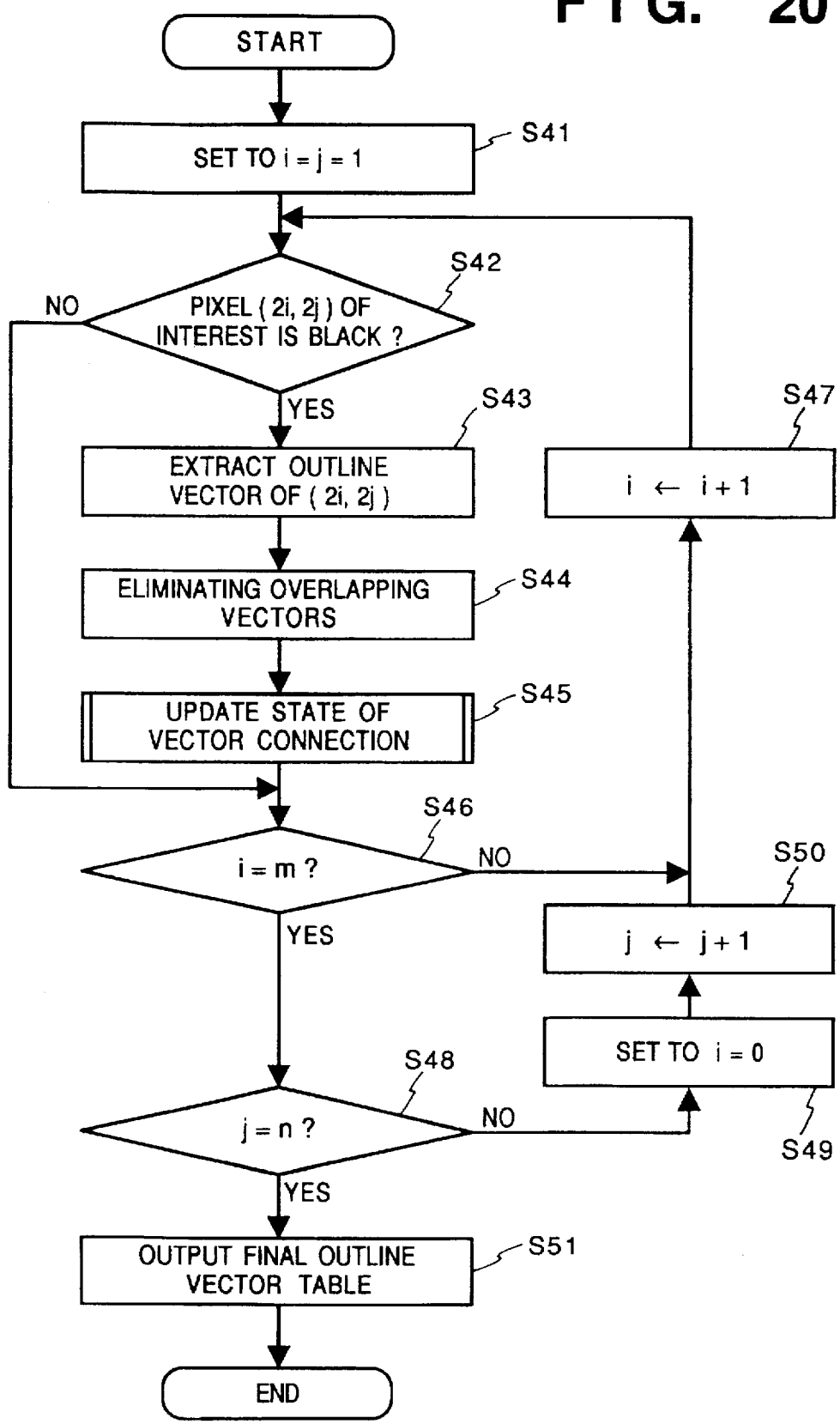
FIG. 20 is a flowchart illustrating a process in the apparatus of the second embodiment.

When the above processes end, the process returns to step S46 of FIG. 20 where it is judged whether or not the pixel of interest is the last pixel on the scanning line of interest (i=m). If it is not the last pixel, the process proceeds to step S47 where the variable i is added by "1" in order to advance the pixel of interest to the next pixel and the process returns to step S42. On the other hand, if the pixel is the last pixel, the process proceeds to step S48 where it is judged whether or not the processing has performed on all scanning lines of the image data. If there is a still line on which the processing has not performed, the process proceeds to step S49 where the variable i is reset to "0", the variable j is added by "1" in order to advance the scanning line of interest at step S50 and the process returns to step S47.

If the processing has performed on all scanning lines at step S48, the process proceeds to step S51 where the outline vector table is scanned. If there are at least two continuously arranged horizontal or vertical vectors, they are incorporated into one vector. Accordingly, the outline vector table including the total number of loop (N) of the image, the number of vertex in each loop (L), coordinates of vertices in each loop is generated as shown in FIG. 17 and the outline vector extraction process ends. The procedure for generating the outline table of FIG. 17 from the outline vector table of FIG. 9 can be performed in a same manner that of the first embodiment.

Accordingly, since the outline vectors can be extracted by reading the image in a unit of one pixel (dot), the whole image is not necessary to be stored in a page memory, thus resulting in reduction of the amount of memory.

However, at step S44 of FIG. 20 of the second embodiment (overlapping vectors are eliminated by comparing the outline vectors registered with the table and the outline vectors newly obtained), if the all data in the outline vector table is searched, the amount of processing is increased. In the case where the coordinates of the pixel of interest is (2i, 2j) and a vector which overlaps with the newly obtained outline vector a=[(2i-1, 2j-1), (2i+1, 2j+1)], a time required for searching can be reduced by searching only the vectors in which the y-coordinate of the start/end point is (2j-1).

Similarly, in the case where a vector which overlaps with the vector d=[(2i-1, 2j+1), (2i-1, 2j-1)], only the vectors in which the x-coordinate of the start/end point is (2i-1) are searched, a time required for searching is reduced. In this case also, it is better that the outline vector table is searched from the latest data to the oldest one.

As described above, in the case of searching the outline vector table, a time required for search is reduced by considering the order of search or searching area.

[Third Embodiment]

A general operation in the third embodiment is described.

Figure 24:
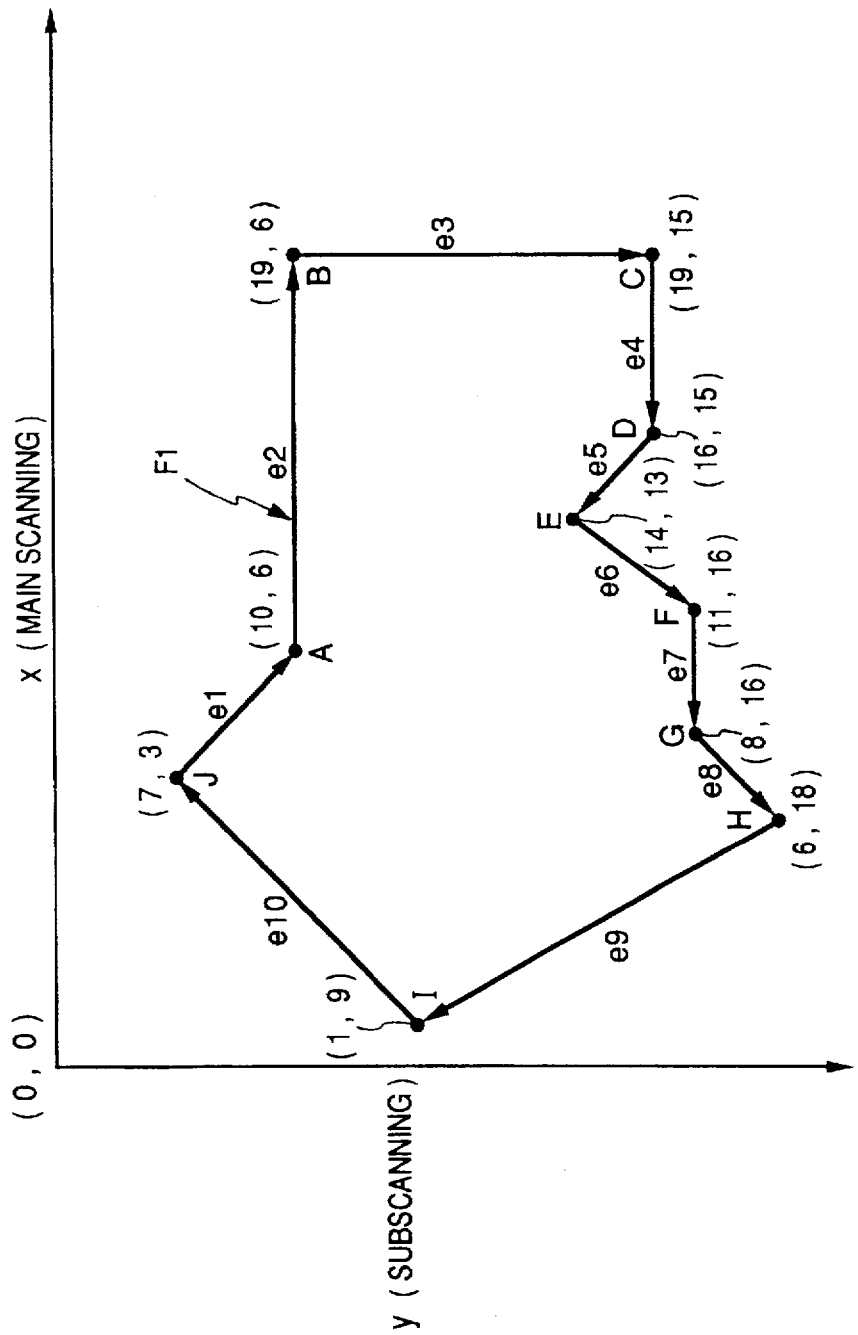
FIG. 24 is a diagram illustrating an example of a clockwise outline data used in the third embodiment.
Figure 25:
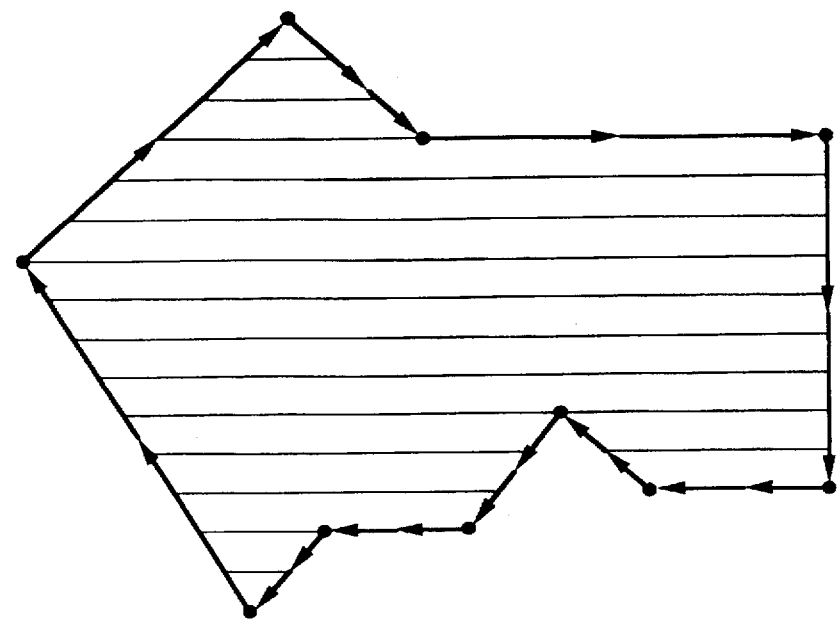
FIG. 25 is a diagram explaining an interior of the area enclosed with clockwise outlines.
Figure 26:
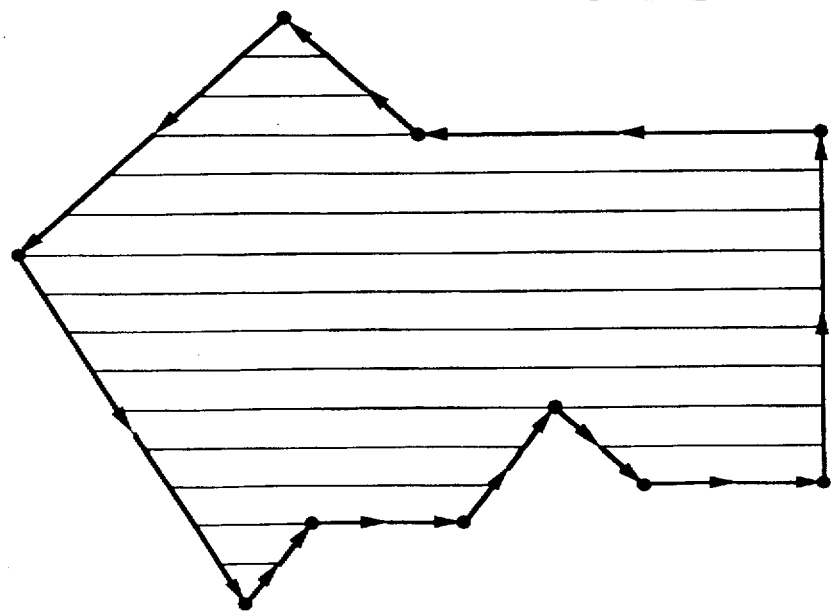
FIG. 26 is a diagram explaining an interior of the area enclosed with counterclockwise outlines.

In the third embodiment, an outline which is directed to a predetermined direction is used as an outline of an image pattern. That is, it is expressed by a group of outline vectors (line elements) connecting in the clockwise direction or counterclockwise direction as shown in FIG. 24. When an area of the right side of the outline vectors connecting in the clockwise direction is shaded, a figure of interest is obtained (FIG. 25). On the other hand, an area of the left side of the outline vectors connecting in the counterclockwise direction is shaded, a figure of interest is obtained (FIG. 26).

In the third embodiment, a direction and slope of each outline vector is determined. Based upon the determination, both edge points or points rather than the edge points of the vector of interest are determined to form a boundary of the closed area. Subsequently, a length between an even-numbered edge point of a boundary and the odd-numbered edge point of the boundary in a horizontal direction is calculated as a black run length. A length from the even-numbered edge point to the odd-numbered edge point is calculated as a white run. The coded data is then outputted.

<Description of the Construction of the Apparatus>

Figure 27:
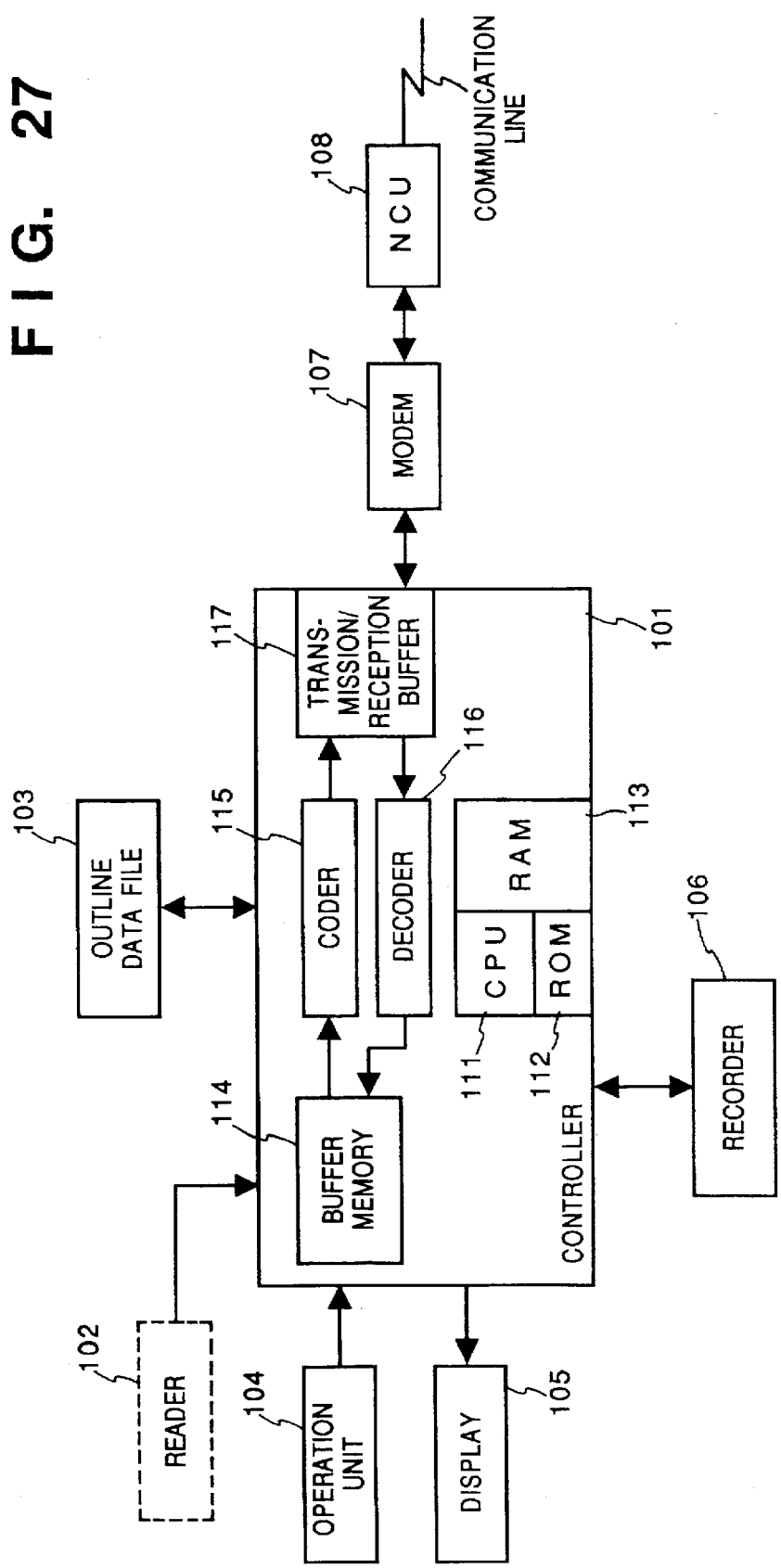
FIG. 27 is a block diagram illustrating a general construction in the case where a coding apparatus of the third embodiment is applied to a facsimile apparatus.

FIG. 27 is a block diagram indicating an example that the coding apparatus of the third embodiment is applied to a facsimile apparatus. In FIG. 27, numeral 101 is a controller which controls the whole apparatus, numeral 102 is a reader which reads photoelectrically and inputs an original image, and numeral 103 is an outline data file which stores document data or image data in a form of outline vector data. Numeral 104 is an operation unit which is operated by an operator and inputs an instruction for transmission/reception of the original image. Numeral 105 is a display which displays various message to an operator and a state of each unit. Numeral 106 is a recorder which records a received image or an original image read by the reader 102 by a heat sensitive method or electronic photographing method. Numeral 107 is a modem which performs modulation or demodulation of the image data and numeral 108 is a network control unit (NCU).

The construction of the controller 101 is described below. Numeral 111 is a CPU such as a microprocessor which controls all over the apparatus in accordance with the control program stored in a ROM 112. Numeral 112 is ROM which stores the control program of the CPU 111 and various data. Numeral 113 is a RAM which is used as a work area of the CPU 111 and stores various data. Numeral 114 is a buffer memory which stores the image data read by the reader 102 or the outline vector data read out from the data file 103. Numeral 115 is a coder which encodes the original image data read by the reader 102 and forms coded data from the outline vector data which is a characteristic of this embodiment. Numeral 116 is a decoder which decodes the received coded data and forms the image data. Numeral 117 is a transmission/reception buffer which stores the coded image data to be transmitted or the received coded image data. Since the process for coding and transmitting the image data read by the reader is well known, the process for coding the image data based on the outline data is described below.

As shown in FIG. 17, the outline data stored in the outline data file 103 is comprised of data (N) indicating the number of closed loop included in the image which is a subject, a group of data (L) indicating the number of vertices comprising each loop, and coordinates of each vertex (x, y). However, vertices in a closed loop is expressed as a group of data retaining the relationship of the vertices positioned next to each other in accordance with the predetermined direction and order on the closed loop.

Figure 28:
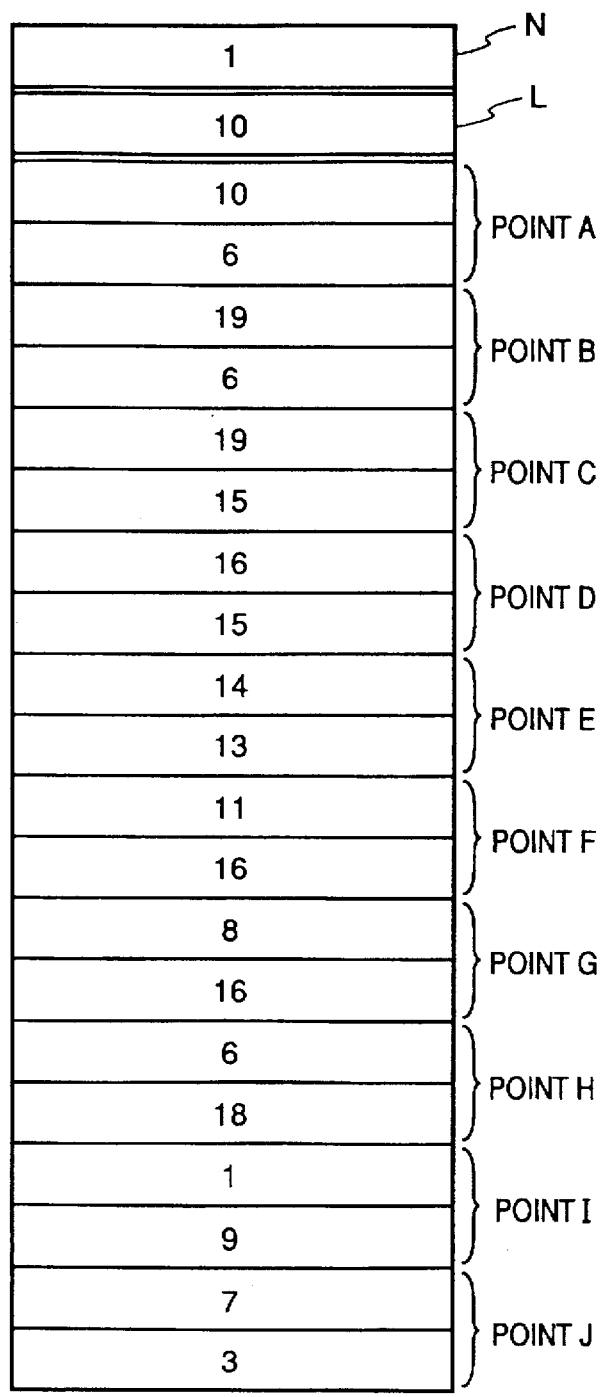
FIG. 28 is a diagram explaining the outline data in a form of a string of coordinates of the outline data of FIG. 24.

As described above, in the present embodiment, the outline data is regarded as a group of data which are arranged in the predetermined direction. FIG. 24 is an example of the outline data arranged in the clockwise direction and the data on the pattern obtained by that outline data is shown in FIG. 28. In FIG. 28, the outline of the image pattern F1 of FIG. 24 is expressed by a string of points with the point A as a start point in the clockwise direction, such as A→B→C→D→E→F→G→H→I→J→A. In FIG. 28, the number of closed loop (N) is "1", the number (L) of vertices is "10", and coordinates of each vertex are sequentially arranged.

In the third embodiment, it is assumed that the origin (0, 0) is located at the left corner, the main scanning direction (to the right) is an x axis and the subscanning direction (to the vertical direction) is a y axis as shown in FIG. 24. It is further assumed that the outline is arranged in the clockwise direction. A start point in each closed loop can be an arbitrary point in the loop.

<Description of the Main Process>

Figure 29:
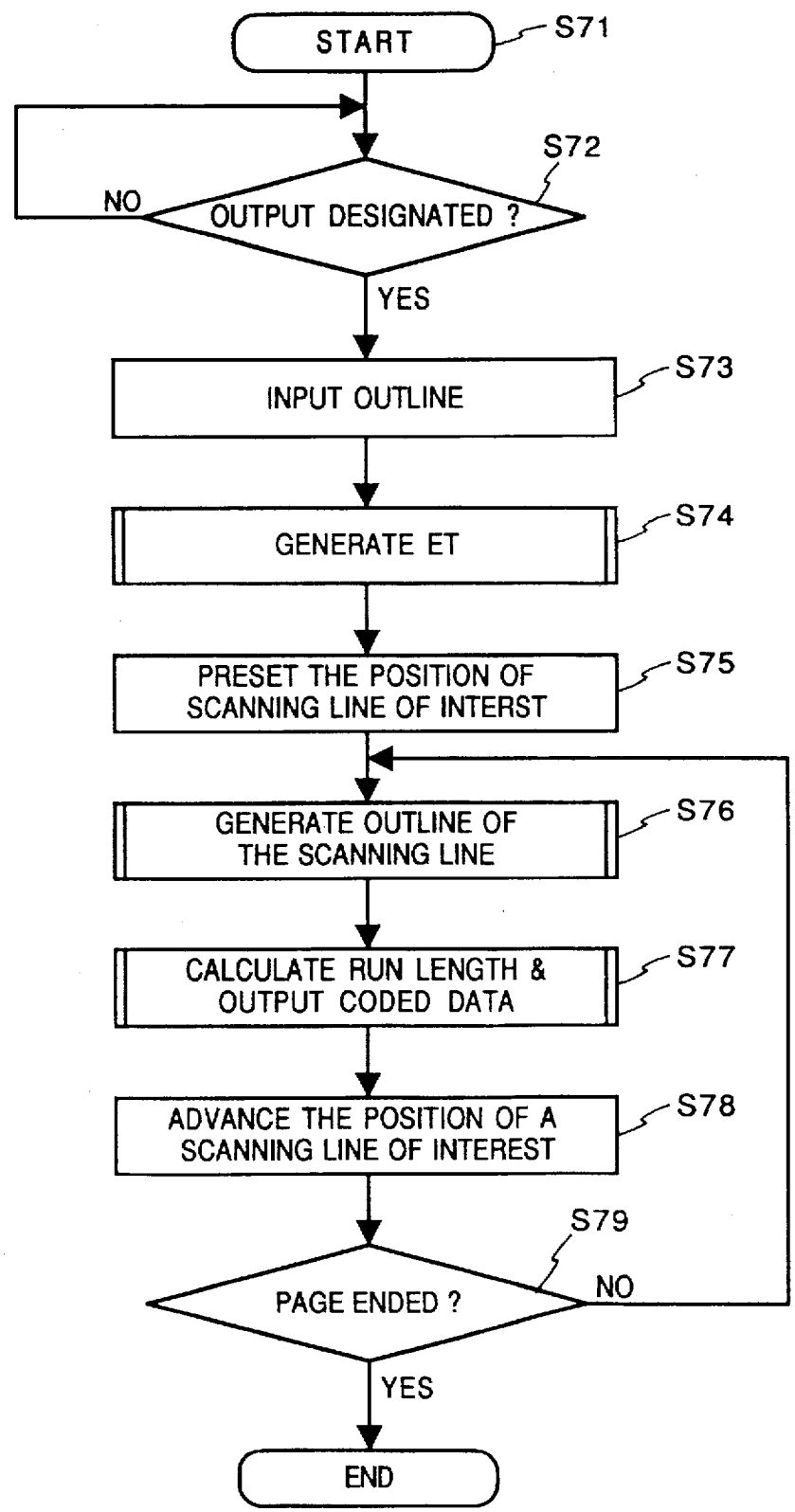
FIG. 29 is a flowchart illustrating a coding operation of the facsimile apparatus in the third embodiment.

FIG. 29 is a flowchart indicating the procedure of the operation process by the CPU 111 in the facsimile apparatus according to the third embodiment.

Figure 32:
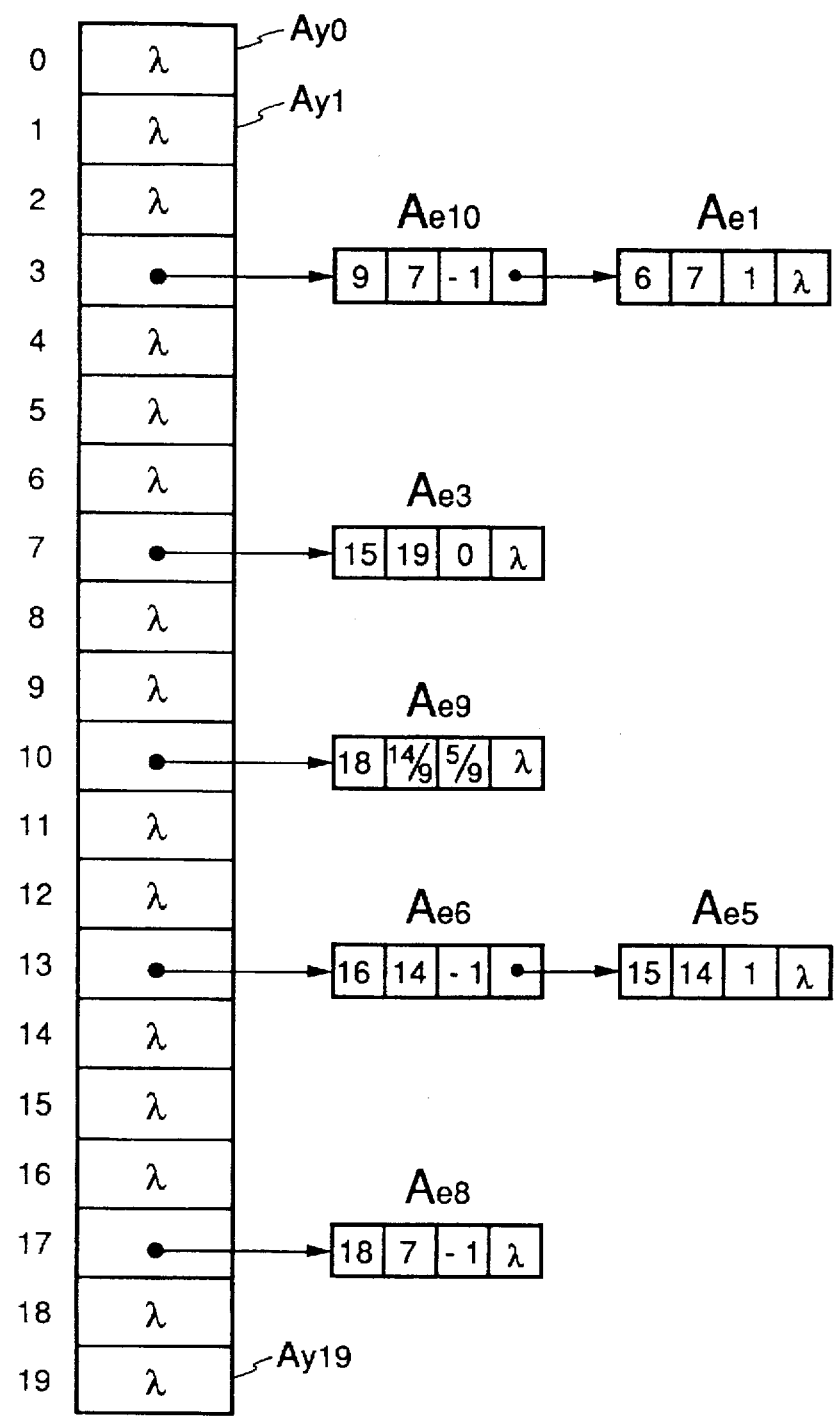
FIG. 32 is a diagram explaining an edge table (ET) of the outline data of FIG. 24.

When the operation process starts at step S71, the process proceeds to step S72 where it is judged whether or not the instruction to transmit the outline data is inputted from the operation unit 104 through the facsimile apparatus. If the instruction is inputted, the process proceeds to step S73 where the outline data is inputted from the outline data file 103 and stored in the buffer memory 114. The outline data means a group of outline vector data expressed in a form shown in FIGS. 17 and 28. The process proceeds to step S74 where data corresponding to each of edges e1~10 of FIG. 24 in a form of packet data shown in FIG. 31 are formed, an edge table (ET) shown in FIG. 32 is formed, and the process proceeds to step S75. It should be noted that the packet data is formed only for an edge which is not parallel to the x axis. Each edge is represented by one pixel per horizontal line, but a start point of each edge is not registered. The detail of the edge table generation process is described later.

Figure 33:
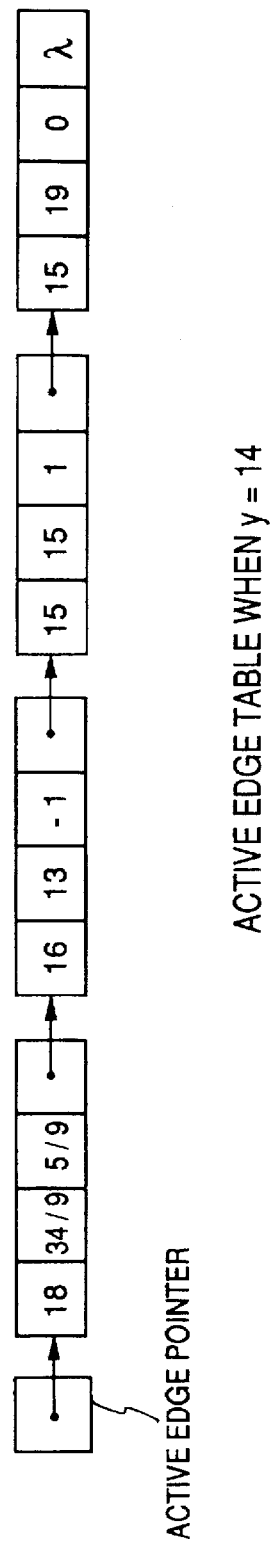
FIG. 33 is an explanatory diagram of an active edge table (AET) of the outline data of FIG. 24.

At step S75, a position of the scanning line of interest is set to the position of the beginning of the scanning line in a page. That is, the position of the scanning line is y=0 and an active edge pointer area shown in FIG. 33 is reserved. The process proceeds to step S76 where an active edge table (AET) as FIG. 33 is generated at the position of the scanning line of interest. At step S77, run lengths of white run and black run are calculated and Huffman code corresponding to each run length is outputted based on the AET. The process of step S77 will be also described later.

The process then proceeds to step S78 where the position of the scanning line of interest is advanced to the next line. If the position of the scanning line of y=i has been a scanning line of interest, the next position is y=i+1. The process proceeds to step S79 where it is judged wether or not the process to the position of the last scanning line in the page has ended. In the case where the process has ended, the process proceeds to step S80 and a series of processes end. In the case where the process has not ended, the process returns to step S76 where the process for the next line is continued. Judgement if the process has ended is performed by storing the number of the scanning lines included in the page in advance and comparing the number of scanning lines and the current position of the scanning line of interest.

<Description of the Edge Table Generation Process>

The detail of the edge table (ET) generation process at step S74 of FIG. 29 is described with reference to the flowchart of FIG. 34. This edge table is generated in the RAM 113.

When started, the process proceeds to step S81 where the ET is initialized. As shown in FIG. 35, address pointer areas $A_{y0}$~$A_{yN}$ (which may be referred to as "pointer packet" areas) for the number of the scanning line included in the page to be generated are reserved on the RAM 113 and a maker value "λ" indicating that no reference data is present in the area is stored (refer to FIG. 35). At step S82, the number of closed loops (N) of the outline data given in FIG. 17 is referred and the process proceeds to step S83. At step S83, it is examined if the number of the closed loops (N) is larger than "0". If it is not larger than "0", that is, the case where no closed loop is present, the process proceeds to step S98 where a series of the processes ends and the process returns to the main processing. On the other hand, if there is a closed loop, the process proceeds to step S84.

At step S84, the pointer is preset to the position where the number of vertices in the loop No. 0 is stored in the table and the process proceeds to step S85. At step S85, the vertex data of the loop at the position designated by the pointer is referred and the process proceeds to step S86. If the number of vertices in the loop is rather than "2", the process proceeds to step S87. On the other hand, if it is not, the process proceeds to step S98.

At step S87, when the edge (e1) in which the start point is the last vertex (J) of the loop of interest and the end point is the first vertex (A) of the same loop is regarded as a current edge (an edge of interest) and a direction of this edge and an inverse of slope of the edge are calculated. That is, when the coordinates of the start point of the edge is ($x_{start}$, $y_{start}$) and the coordinates of the end point is ($x_{end}$, $y_{end}$), if $y_{start}=y_{end}$, an inverse of slope of the edge will not be calculated since the direction of the edge is parallel to the x axis. If $y_{start}=y_{end}$ and $x_{start}>x_{end}$, the edge lies toward to the left, while if $x_{start}<x_{end}$, the edge lies toward to the right. Furthermore, if $y_{start}=y_{end}$ and $x_{start}=x_{end}$, it is expressed to be a point in which a start and an end point of the edge are coincident. This point is either a part of a previous edge or next edge or an isolated point. This point can be eliminated from a string of vertices of the edge comprising the outline in the case where the data shown in FIG. 17 is generated.

When $y_{start}>y_{end}$, it is judged that a direction of the edge is upward and an inverse of slope of the edge is calculated by ($x_{start}-x_{end}$)/($y_{start}-y_{end}$).

When $y_{start}<y_{end}$, it is judged that a direction of the edge is downward and an inverse of slope of the edge is calculated by ($x_{end}-x_{start}$)/($y_{end}-y_{start}$).

When the edge data generation process of the current edge at step S87 ends, the process proceeds to step S88. At step S88, it is determined that edge data of next edge (e2) in which the first vertex of the loop (the vertex No. 0 (A)) is a start point and the second vertex of the loop (the vertex (B)) is an end point, a direction and inverse of slope of the edge are obtained in the same manner as that of step S87. The process proceeds to step S89 where the pointer of the vertex of interest is set to the address value storing the data on the vertex No. 0 shown in FIG. 17 (the vertex A in FIG. 28) and the process further proceeds to step S90.

At step S90, the current edge data (the direction of the current edge and inverse of slope of the edge) is determined as a previous edge data (the previous edge of an edge on interest). At step S91, current edge data is obtained from the next edge data. A next edge data (the direction of the next edge and inverse of slope of the edge) is obtained in the same manner as that of step S87. In this case, a start point of the next edge is the end point of the current edge. The end point of the next edge is the next vertex on the loop with respect to the end point of the current edge. The above-described process data can be performed by referring to the data of the next vertex of the vertex of interest and the further next vertex. If the vertex of interest is at the last vertex of the loop, then the start point of the next edge is the vertex No. 0 (A) and the end point of the next edge is the vertex No. 1 (B). When the vertex of interest is the vertex immediately before the last vertex of the loop, the start point of the next edge is the vertex No. N (J) and the end point of the next edge is the vertex No. 0 (A).

When the processing of step S92 ends, the process proceeds to step S93, the packet data as shown in FIG. 31 is generated based on the previous edge data, current edge data, and next edge data (refer to FIG. 32). This packet data is added to the edge table in order to update the table. The detail of this processing will be described later with reference to FIGS. 36 and 37. When the updating process ends, the process proceeds to step S94 where a value of pointer of the vertex of interest is updated and determined as a position of the next vertex on the loop. At step S95, it is judged whether the process for all edges in the loop has ended. If it has ended, the process proceeds to step S96, while if it has not ended, the process returns to step S90 where a series of processing to the next edge is continued. Whether or not the process for the all edges has ended is judged by counting the number of times the process of step S95 has be gone through by each loop and if the counted number is over the number of vertex included in the loop is determined.

At step S96, the pointer is advanced to the position holding data of the next loop and the process proceeds to step S97. At step S97, it is judged whether or not a series of processes for the all loops included in the outline data has ended. If it has ended, the process proceeds to step S98, while if it has not ended, the process returns to step S85 where a series of processes for the next loop is continued. Whether or not the process for the all edges has ended is judged by counting the number of times the process of step S97 has be gone through by each loop and if the counted number is over the number of vertex included in the loop is determined. At step S98, the edge table (ET) generation process ends and the process returns to the main routine.

<Description of the Edge Table Updating Process>

Figure 34:
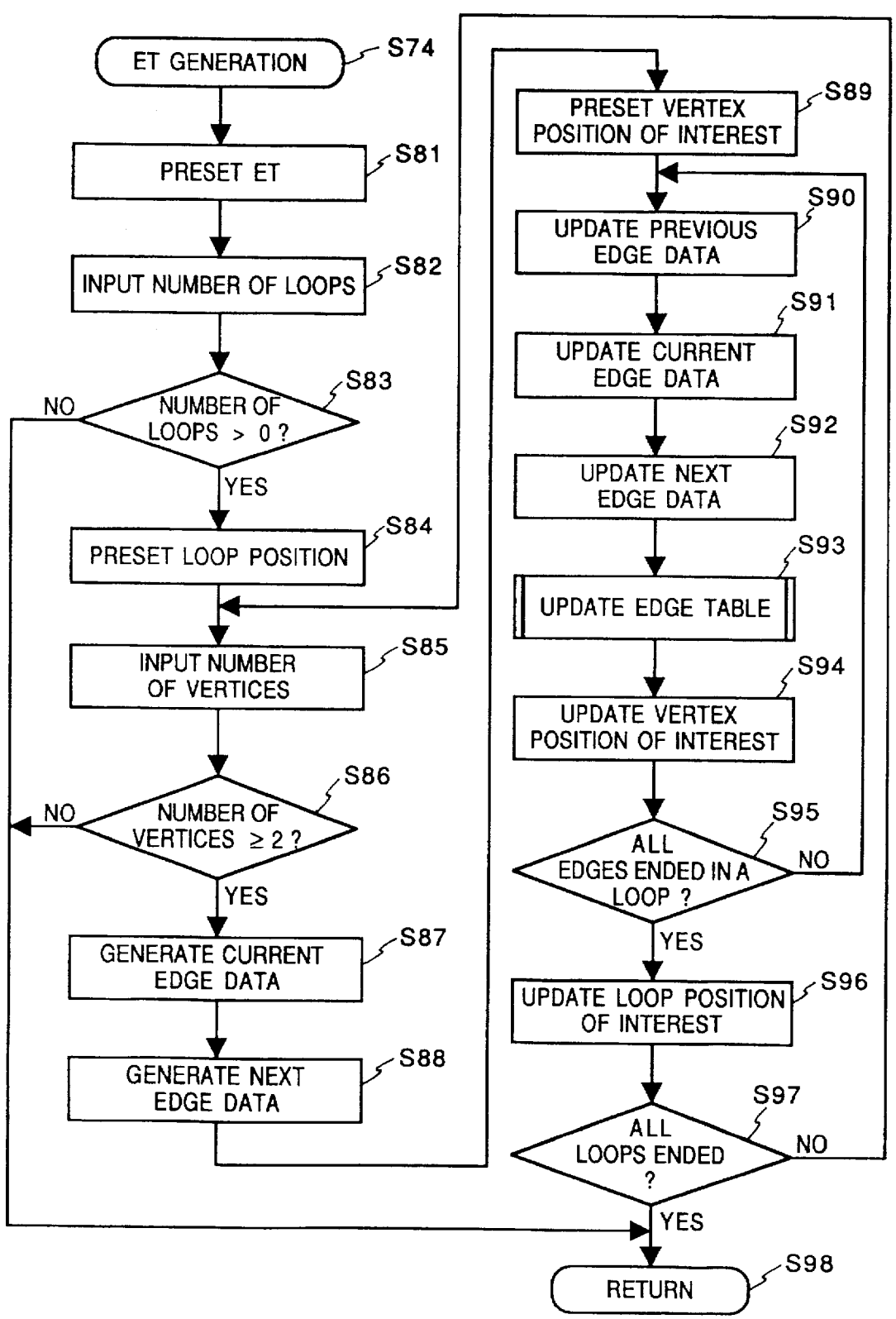
FIG. 34 is a flowchart illustrating a procedure for generating an edge table (ET) in the third embodiment.
Figure 36:
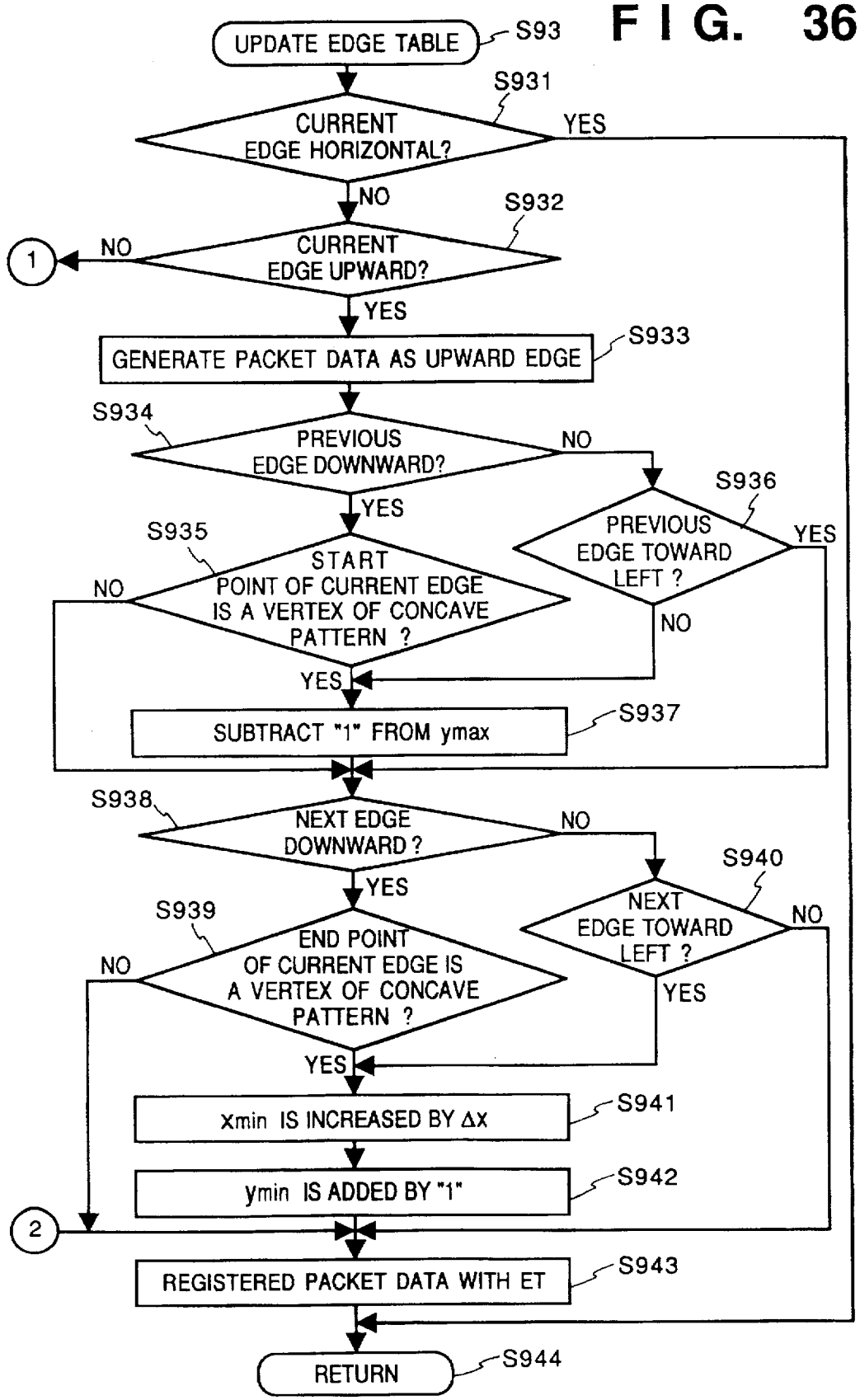
FIGS. 36 and 37 are flowcharts respectively illustrating a procedure for generating the packet data and updating the edge table (ET)
Figure 37:
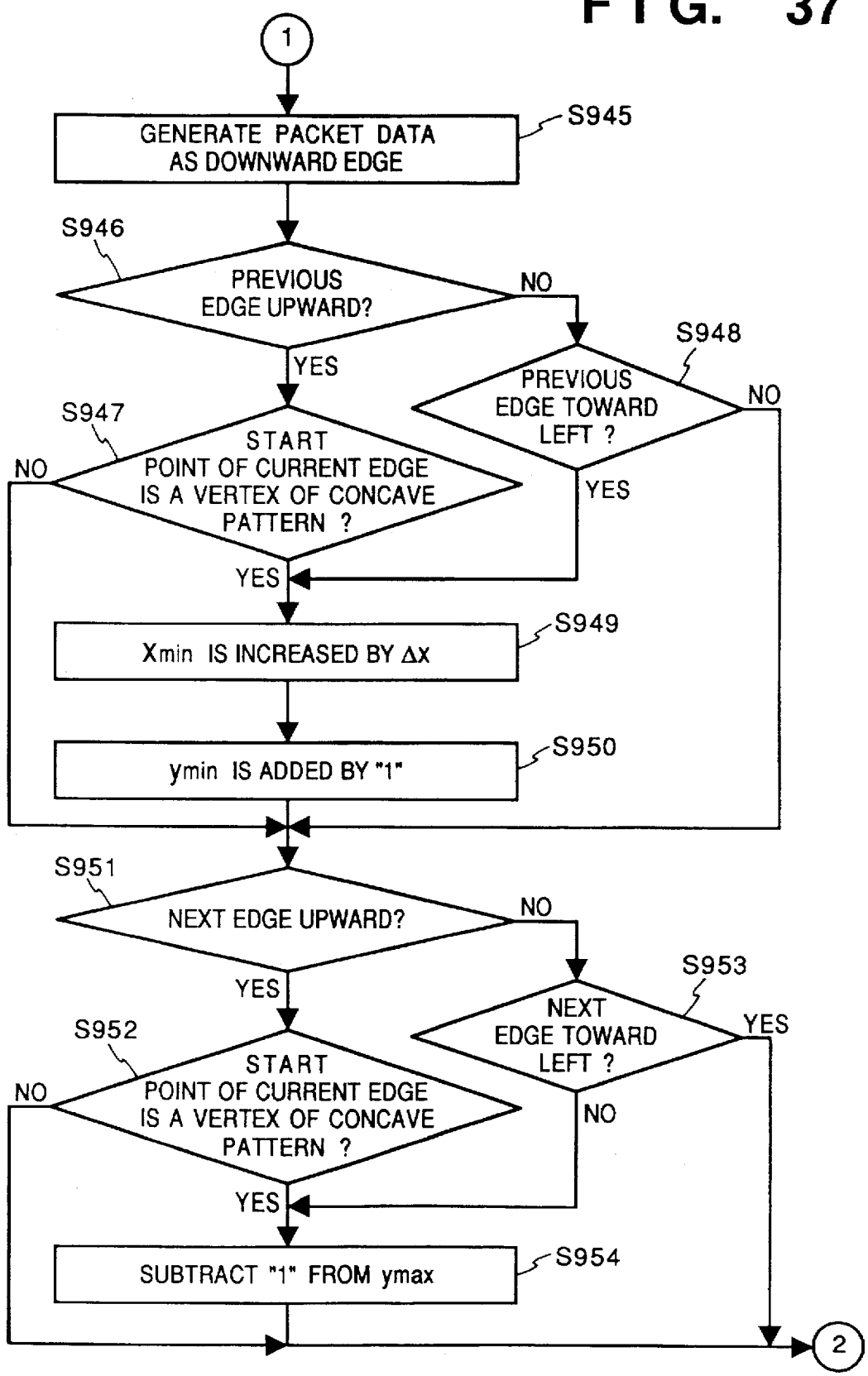

The edge table updating process at step S93 of FIG. 34 is illustrated by the flowcharts of FIGS. 36 and 37. prior to describe these flowcharts, the updating process is described with reference to FIG. 30. At step S93, the process is proceeded by using directions of the current edge, previous edge, and next edge and a ratio of increment of x and y. The rules for generating packet data of FIG. 31 is shown in FIG. 30.

In the case where the current edge is a horizontal edge, that is, the current edge lies toward to the right or left, no packet data is generated for this edge and the edge table is not updated. Therefore, there is no indication for change on the table of FIG. 30. In the case where the current edge is upward or downward, the cases of start 1~start 10 and end 1~end 10 are considered in accordance with a content of the previous edge data. In FIG. 30, in a column for a state of a start point, a current edge is indicated by a solid arrow, a previous edge is indicated by a dot line, a direction of edge is indicated by a direction of arrow, and a black area is indicated by shade. In a column for a state of an end point, a current edge is indicated by a solid arrow, the next edge is indicated by a dot arrow, and a direction of edge is indicated by a direction of arrow. An area indicated by slant line of each edge is an black data area.

The case where the current edge is upward (start 1~start 5) is described in a view of dealing with the start point of the current edge. In the case where a previous edge is also upward (case start 1), it is determined that the start point of the current edge is located at a point shifted for one scanning line from the actual point to the end point along with the edge and packet data is generated based on this determination. In the case where the previous edge is downward and, if the end point of the previous edge, that is, the start point of the current edge is a vertex of the concave pattern (case start 2), it is also determined that the start point of the current edge is located at a point shifted for one scanning line from the actual point to the end point along with the edge and the packet data is generated based on this determination. If the start point is a vertex of the convex pattern (case start 3), it is determined that the start point is an actual point and the packet data is generated based on this determination. Determination of "case start 2" or "case start 3" can be performed by comparing an inverse slope of x of the current edge and that of the previous edge. It is assumed that the inverse slope of the previous edge is $\Delta X_{pre}$ and that of the current edge is $\Delta X_{cur}$. When $\Delta X_{pre} > \Delta X_{cur}$, it is the case start 2, while when $\Delta X_{pre} < \Delta X_{cur}$, it is the case start 3. However, when $\Delta X_{pre} = \Delta X_{cur}$, it is judged as the case 3. In the case where the previous edge lies toward to the left (case start 4), it is determined that the start point of the current edge is an actual point and the packet data is generated based on this determination. On the other hand, in the case where the edge lies toward to the right (case start 5), it is determined that the start point of the current edge is located at a point shifted for one scanning line from the actual point to the end point along with the current edge.

Next, the case where the current edge is downward (start 6~start 10) in a view of the start point is described. In the case where the previous edge is upward, if the end point of the previous edge, that is, the start point of the current edge is a vertex of the convex pattern (case start 6), it is determined that the start point is an actual point and the packet data is generated based on this determination. On the other hand, if the start point of the current edge is a vertex of the concave pattern (case start 7), it is determined that the start point is located a point shifted for one scanning line from the actual point to the end point along with the current edge and packet data is generated based on this determination. In the case where the edge is downward (case start 8) and it lies toward to the right (case start 10), it is determined that the start point is an actual point and packet data is generated based on this determination. If the previous edge lies toward to the left (case start 9), it is determined that the start point is located at a point shifted for one scanning line to the end point from the actual point and packet data is generated based on this determination. Determination of "case start 6" or "case start 7" can be performed by comparing an inverse slope $\Delta X_{cur}$ of the current edge and that $\Delta X_{pre}$ of the previous edge. That is, when $\Delta X_{pre} < \Delta X_{cur}$, it is "case start 6", while when $\Delta X_{pre} < \Delta X_{cur}$, it is "case start 7". However, when $\Delta X_{pre} = \Delta X_{cur}$, it is determined as "case start 6".

The case where the current edge is upward (end 1~end 5) is described in a view of dealing with the end point of the current edge. In the case where the next edge is also upward (case end 1), it is determined that the end point of the current edge is located at an actual point and packet edge data is generated based on this determination. In the case where the next edge is downward, if the start point of the next edge, that is, the end point of the current edge is a vertex of the concave pattern (case end 3), it is determined that the end point of the current edge is located at a point shifted for one scanning line to the start point from the actual point along with the current edge and packet data is generated based on this determination. On the other hand, if the end point of the current edge is a vertex of the convex pattern (case end 2), packet data is generated by determining that the end point of the current edge is at the actual point. If the next edge lies toward the left (case end 4), it is determined that the end point of the current edge is located at a point shifted for one scanning line to the start point from the actual point along with the current edge, and packet data is generated based on the determination. If the next edge lies toward the right (case end 5), it is determined that the end of the current edge is located at an actual point and packet data is generated based on this determination. Determination of "case end 2" or "case end 3" can be performed by comparing an inverse slope $\Delta X_{cur}$ of the current edge and that $\Delta X_{next}$ of the next edge. That is, when $\Delta X_{cur} < \Delta X_{next}$ it is "case end 2", while when $\Delta X_{cur} > \Delta X_{next}$, it is "case end 3". However, when $\Delta X_{cur} = \Delta X_{next}$, it is determined as "case end 2".

The case where the current edge is downward (end 6~end 10) in a view of the end point is now described. In the case where the next edge is upward, if the start point of the next edge, that is, the end point of the current edge is a vertex of the convex pattern (case end 6), it is determined that the end point of the current edge is located at an actual point and packet data is generated based on this determination. If the end point is a vertex of the concave pattern (case end 7), it is determined that the end point of the current edge is located at a point shifted for one scanning line from the actual point to the start point along with the current edge and packet data is generated based on this determination. In the case where the next edge is downward (case end 8), it is determined that the end point of the current edge is located at an actual point and packet data is generated based on this determination. In the case where the next edge lies toward to the right (case end 10), it is determined that the end point of the current edge is located at a point shifted for one scanning line to the start point along with the current edge and packet data is generated based on this determination. Determination of either "case end 6" or "case end 7" is performed by comparing an inverse slop $\Delta x_{cur}$ of the current edge and that $\Delta x_{next}$ of the next edge. That is, when $\Delta x_{cur} < \Delta x_{next}$, it is "case end 6", while when $\Delta x_{cur} > \Delta x_{next}$, it is "case end 7". However, when $\Delta x_{cur} = \Delta x_{next}$ it is "case end 6".

According to the above-described rules, the packet data shown in FIG. 31 are generated for the current edge.

The process described above is performed at step S93 of FIG. 34. Since the CPU 111 performs the process according to the flowcharts shown in FIGS. 36 and 37, the flowcharts are now described.

At step S93, when a series of the processes starts, the process proceeds to step S931. Input data are previous edge data updated at step S90 of FIG. 34 (a direction of the previous edge and an inverse slope $\Delta X_{pre}$), current edge data updated at step S91 (coordinates of start point of the current edge ($x_{start}, y_{start}$), coordinates of end point ($x_{end}, y_{end}$), and a direction and inverse slope $\Delta X_{cur}$ of the current edge), and next edge data generated at step S92 (a direction of the next edge and an inverse slope $\Delta x_{next}$). At step 931, it is determined whether or not the direction of the current edge data is horizontal (whether the current edge lies toward to the right or the left). If the current edge is horizontal (parallel to the x axis), the process proceeds to step S944 where a series of processes ends and the process returns to the subroutine (step S94 of FIG. 34).

If the current edge is not horizontal, the process proceeds to step S932 where it is determined whether or not the current edge is upward. If it is upward, the process proceeds to step S933 where packet data for upward edge is generated. On the other hand, if the current edge is not upward (that is, downward), the process proceeds to step S945 where packet data for downward edge is generated.

When the current edge is determined as upward and the process proceeds to step S933, the edge packet shown in FIG. 31 is once generated as it is. That is, it is determined that $y_{max} = y_{start}, x_{min} = x_{end}$, and $\Delta X = \Delta X_{cur}$ and packet data is generated based on this determination. The pointer is added by a marker "λ" indicating that there is no connecting edge packet. At step S933, when the edge packet is registered with the edge table, a value $y_{min}$ indicating which pointer packet connects to the current edge packet is determined. In this embodiment, it is assumed that $y_{min}=y_{end}$. In both end points of the current edge (start point and end point), "$y_{max}$" is a y value of one of the end points which is larger than that of the other. "$x_{min}$" and "$y_{min}$" respectively mean x value and y value of the coordinates in which the y value is smaller than that of the other. An inverse slope $\Delta x$ means a change of the x coordinate per scanning line when a point on the current edge moves from a smaller value to a larger value of the y coordinate along with the current edge. In the embodiment, since it is determined that a positive direction of the x coordinate is a direction to the right, while a positive direction of the y coordinate is downward, $y_{max}$, $x_{min}$, $\Delta x$, and $y_{min}$ are determined as described above. When the process of step S933 ends, the process proceeds to step S934.

At step S934, it is determined whether or not the previous edge is downward. If it is downward, the process proceeds to step S935, while if it is not, the process proceeds to step S936. At step S935, whether the start point of the current edge is "case start 2" or "case start 3" is determined in the above-described method. If it is "case start 2", the process proceeds to step S937 where "1" is subtracted by $y_{max}$. If not, the process proceeds to step S938. Furthermore, at step S936, whether or not the start point of the current edge is "case 4" (that is, "case start 1" or "case start 5") is determined. If it is "case start 4", the process proceeds to step S938. If not, the process proceeds to step S937 where "1" is subtracted by $y_{max}$. That is, the start point of the upward edge is shifted for one scanning line toward the end point as described above. When the process of step S937 ends, the process proceeds to step S938. Accordingly, the process for the start point in the case where the current edge is upward ends.

At step S938, it is determined whether or not the next edge is downward. If it is downward, the process proceeds to step S939, while if it is not, the process proceeds to step S940. At step S939, whether the end point of the current edge is "case end 2" or "case end 3" is determined in the above-described method. If it is "case end 2", the process proceeds to step S943, while if not ("case end 3"), the process proceeds to step S941. At step S940, whether or not the next edge lies toward to the left, that is, whether or not the end point of the current edge is "case end 4" (either "case end 1" or "case end 5") is determined. If it is "case end 4", the process proceeds to step S941 where $x_{min}$ is increased by $\Delta x$. That is, the x coordinate value is corrected since the end point of the upward edge is shifted for one scanning line toward the start point. If not, the process proceeds from step S940 to step S943 where the packet data is registered with the ET. When the process of step S941 ends, the process proceeds to step S942 where $y_{min}$ is added by "1". That is, the y coordinate value of the end point is corrected since the end point of the upward edge is shifted for one scanning line toward the start point. When the process of step S942 ends, the process proceeds to step S943.

The case where it is determined at step S942 that the current edge is not upward (that is, it is downward) is described.

In this case, the process proceeds to step S945 of FIG. 37 and the edge packet of FIG. 31 is once generated as it is. That is, it is determined that $y_{max}=y_{end}$, $x_{min}=x_{start}$, and $\Delta X=\Delta X_{cur}$ and packet data is generated based on this determination. The pointer is added by a marker "$\lambda$" indicating that there is no connecting packet data. In addition, it is assumed $x_{min}=y_{start}$. At step S946, it is determined if the previous edge is upward. If so, the process proceeds to step S947, while if not, the process proceeds to step S948.

At step S947, whether the start point of the current edge is "case start 6" or "case start 7" is determined in the above-described method. If it is "case start 6" (a vertex of the convex pattern), the process proceeds to step S951. If it is "case start 7" (a vertex of the concave pattern), the process proceeds to step S949. At step S948, whether or not the start point of the current edge is "case start 9" (that is, either "case start 8" or "case start 10") is determined. If it is "case start 9" (the previous edge lies toward the left), the process proceeds to step S949. If not, the process proceeds to step S951. At step S949, $x_{min}$ is increased by $\Delta x$. That is, the x coordinate value is corrected since the start point of the downward edge is located at a point shifted for one scanning line toward the end point. When the process of step S949 ends, the process proceeds to step S950 where $y_{min}$ is added by "1". That is, the value is corrected since the start point of the downward edge is shifted for one scanning line toward the end point. Accordingly, the process for the start point of the current edge ends.

When the process of step S950 ends, the process proceeds to step S951 where whether or not the next edge is upward is determined. If it is upward, the process proceeds to step S952, while if not, the process proceeds to step S953. At step S952, whether the end point of the current edge is "case end 6" or "case end 7" is determined in the above-described method. If it is "case end 6", the process proceeds to step S943 of FIG. 36, while if it is "case end 7", the process proceeds to step S954. At step S953, whether or not the end point of the current edge is "case end 9" (that is, either "case end 8" or "case end 10") is determined. If it is "case end 9", the process proceeds to step S943, while if not, the process proceeds to step S954 where "1" is subtracted from $y_{max}$. That is, the end point of the downward edge is shifted for one scanning line toward the start point. When the process of step S954 ends, the process proceeds to step S943.

Accordingly, the edge packets for the current edge are generated in accordance with the rules of FIG. 30 in the cases where the current edge is upward and downward.

At step S943, the edge packets generated above are additionally registered with the edge table. That is, the edge packet of the current edge is added so as to connect to an edge packet connecting to the pointer packet $Ayy_{min}$ which corresponds to $y=y_{min}$ in the edge table. First, an area which holds the edge packet of the current edge is reserved on the RAM 113. Then, a value of the pointer packet $Ayy_{min}$ is examined and, if the value is "$\lambda$", an address is replaced by the address of the area holding the edge packet of the current edge and the edge packet data of the current edge is connected to the pointer packet. When the value of the pointer packet $Ayy_{min}$ is a value rather than "$\lambda$", since it indicates that there are some connected edge packets, these edge packets of the current edge are sorted to a string of the connected edge packets so that values $x_{min}$ of the edge packets are arranged in ascending order with respect to the pointer packet. This is executed when the pointer value of the previous packet which is immediately before the edge packet is copied on a pointer of the edge packet of the current edge and the pointer value of the previous packet is replaced by the address value of the edge packet of the current edge. Accordingly, when the process of step S943 ends, the process proceeds to step S944 where a series of processes for updating the edge table ends and the process returns to the subroutine.

<Description for outline generation process for a scanning line of interest>

The outline generation process for a scanning line of interest at step S76 in FIG. 29 is described. The process proceeds in accordance with the following procedure (1)–(5) by using an active edge table (AET).

The AET is preset at step S75 and a first state is a state where the marker λ indicating an empty state is written. After this, if the process once ends and proceeds to step S77, this state is retained until the process returns to step S76.

(1) While the sorting order in an x value ($x_{min}$) of the AET is retained, information of the ET and AET are combined, and a new AET connecting the edge packet according to a y value of a main scanning line is generated.

(2) The AET is accessed in the order from the smallest x value ($x_{min}$) and the process proceeds in the way described below. Each of notations is first defined to simplify the explanation.

$x_{size}$: The number of pixels in a main scanning direction of an input image.

n: The number of edge packets registered with the AET (where n=0 indicates that the AET is empty).

$x_{min}(i)$: The value of $x_{min}$ of the i-th edge packet registered with the AET (where "i" is counted from the smallest $x_{min}$ in ascending order), "i" can be 0 through n+1. However, when i=0, $x_{min(0)}$=−1. When i=n+1, $x_{min}(n+1)$=$x_{size}$.

Each run length (RL(i), i=0, . . . , n) is:

$RL(i)=x_{tmp}(i+1)-x_{tmp}(i)$ $x_{tmp}(i)=x_{min}(i)$ (where "i" is an odd number)

$x_{tmp}(i)=x_{min}(i)+1$ (where "i" is an even number)

Furthermore, RL(i) represents a white run length when "i" is an even number, while it represents a black run length when "i" is an odd number.

When each run length is obtained, the Huffman code corresponding to the run length is outputted. However, when RL(n)=0, an "EOL" (end of line) code is added to the code of the RL(n) and the output of that line ends. When the total number of bits of the coded length of the line is smaller than a predetermined number of bits, a fill bit "0" is inserted between the RL(n) code and EOL code until the total number of bits becomes a predetermined number. FIG. 38 shows the Huffman codes respectively corresponding to each of white run length and black rung length.

(3) The edge packet in which the y coordinate of the scanning line of interest is a y value ($y_{max}$) is eliminated from the AET for an operation in the next scanning line.

(4) X values ($x_{min}$) of the edge packets which remain in the AET are updated by using inverse slope data (Δ x) for an operation in the next scanning line. That is, $x_{min}=x_{min}+Δx$.

(5) After the x values ($x_{min}$) are updated, a sorting is performed based on the updated values.

After the sorting, the scanning line of interest is updated at step S78 and whether or not the processing for a page ends is determined at step S79. If it has not ended, the process returns to step S76. If it has ended, a code indicating "EOP" (end of page) is outputted and the process ends.

Figure 39:
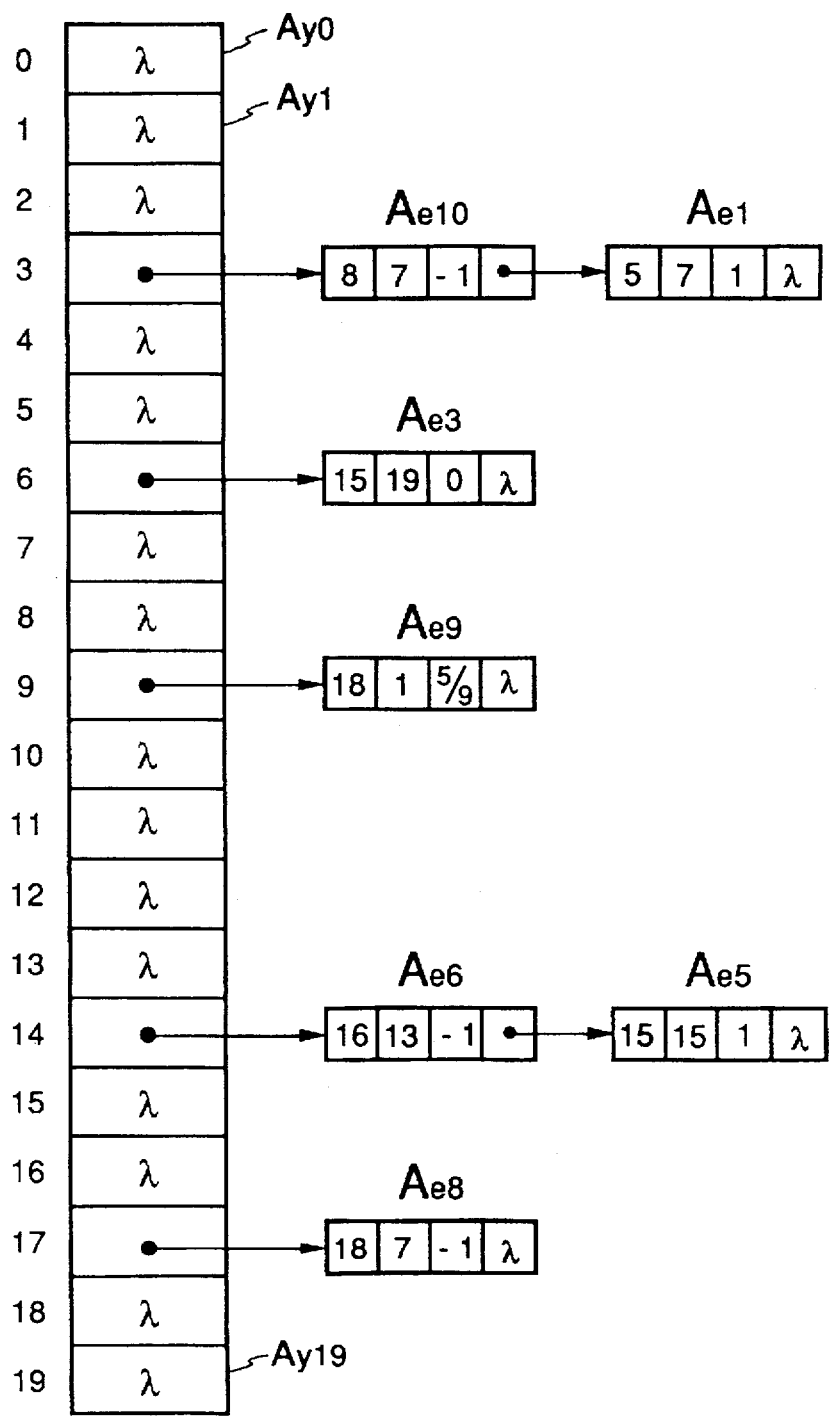
FIG. 39 is an explanatory diagram of the ET based on the outline data of FIG. 24.

The edge table for the image pattern F1 of FIG. 24 obtained in this embodiment is shown in FIG. 39. Since the edge e10 is upward in the pattern F1, the previous edge e9 is also upward, and the next edge e1 is downward, the start point (I) of the edge e10 corresponds to "case start 1" and the end point (J) corresponds to "case end 2" in FIG. 30. Therefore, e10: $y_{max}$=8, $x_{min}$=7, Δx=−1, and $y_{min}$=3.

In the same way, since the edge e1 is downward, the start point (J) corresponding to "case start 6" and the end point (A) corresponding to "case end 10", e1: $y_{max}$=5, $x_{min}$=7, Δx=1, $y_{min}$=3.

An edge packet is not generated since the edge e2 is horizontal.

Since the edge e3 is a downward edge, the start point (B) is "case start 10" and the end point (C) is "case end 9", e3: $y_{max}$=15, $x_{min}$=19, Δx=0, and $y_{min}$=6.

An edge packet is not generated since the next edge e4 is horizontal.

Since the edge e5 is an upward edge, the start point (D) is "case start 4", and the end point (E) is "case end 3", e5: $y_{max}$=15, $x_{min}$=15, Δx=1, and $y_{min}$=14.

Since the edge e6 is a downward edge, the start point (E) is "case start 7", and the end point (F) is "case end 9", e6: $y_{max}$=16, $x_{min}$=13, Δx=−1, and $y_{min}$=14.

An edge packet is not generated since the edge e7 is a horizontal edge.

Since the edge e8 is a downward, the start point (G) is "case start 9", and the end point (H) is "case end 6", e8: $y_{max}$=18, $x_{min}$=7, Δx=−1, and $y_{min}$=17.

Furthermore, since the edge e9 is an upward edge, the start point (H) is "case start 3", and the end point (I) is "case end 1", e9: $y_{max}$=18, $x_{min}$=1 Δx=⅝, and $y_{min}$=9.

Figure 40:
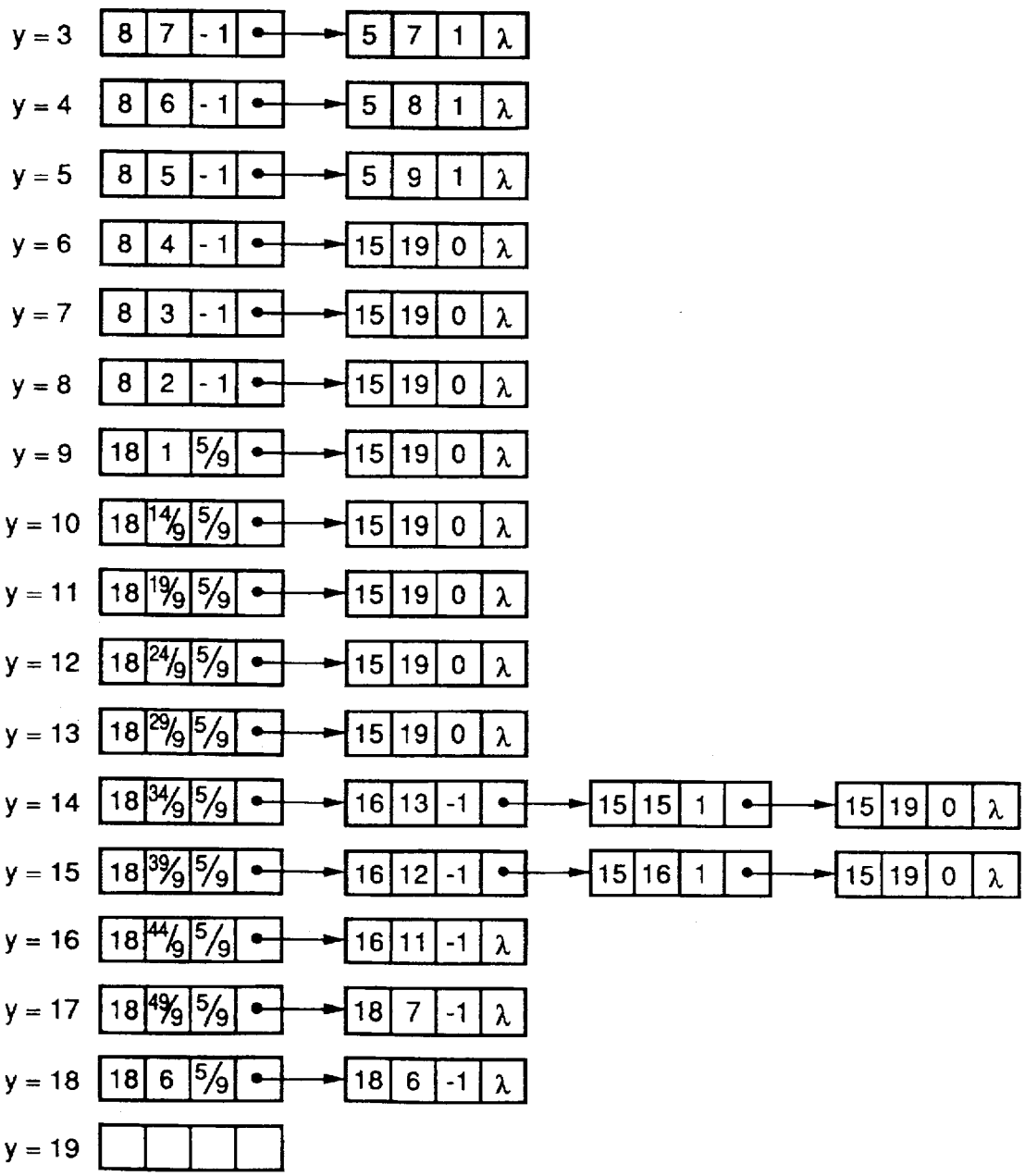
FIG. 40 is a diagram explaining changes of the active edge table (AET) of the outline data of FIG. 24.

The above data is transformed to an edge table shown in FIG. 39. The AET is generated based on the edge table of FIG. 39. Changes in the AET when a y-coordinate of the scanning line of interest is sequentially advanced one by one from y=0 are shown in FIG. 40.

In the above description, $y_{max}$ and $y_{min}$ are integers which are not negative. $X_{min}$ and Δx are actual-number data (that is, the data having information on decimal fraction) which are accurate enough for the operation. In calculation, an x coordinate when the scanning line is advanced to the next line is a value that the x coordinate value of the previous edge is added by a calculated x. However, the pixel on the memory can be located only at a position represented by an integer. Therefore, when Δx is added and there is a carried out from the decimal fraction, the x coordinate is modified and rounded off.

[Fourth Embodiment]

In the third embodiment, a method and apparatus generating the MH codes from the edge packet data are described. In the fourth embodiment, a method and apparatus generating MR codes from edge packet data is described. A conventional method for generating MR codes is described in lines 79–83 in *Image Signal Processing for Fax and OA* written by Tadahiko Fukimuke (published by Nikkan Kogyo Shinbun). In the conventional method, an image is scanned and a transition pixel is searched one by one. The method in this embodiment differs from the conventional method in that a transition pixel is searched from edge packet data. Since when a transition pixel has been searched, the following processes are the same as those of the conventional method, only the method for searching the transition pixel from the edge packet data is described below. A transition pixel means a pixel in which a color is changed from that of the previous pixel in a same scanning line.

In the MR method, coding is performed by using a correlation of two dimensions, two active edge table (AET), an AET (CUR) for a scanning line of interest and AET (PRE) for a previous scanning line (a reference scanning line) are needed. Five types of transition pixels are firstly defined prior to describing the MR coding process.

$a_0$: A reference transition pixel or transition-start pixel on a scanning line of interest. The position is determined by a coding mode. In the beginning of the scanning line of interest (on the left end), $a_0$ is a point which is hypothetically located immediately before the first pixel (on the left of the first pixel).

$a_1$: A transition pixel located on the right of $a_0$ of the scanning line of interest. This pixel has an opposite color from that of $a_0$ and is coded after $a_0$.

$a_2$: A transition pixel located on the right of $a_1$ of the scanning line of interest.

$b_1$: A transition pixel on a reference scanning line which has the same color as that of the transition pixel $a_1$ located on the right of the transition-start pixel $a_0$.

$b_2$: A transition pixel located on the right of $b_1$ on the reference scanning line.

When pixels $a_1, a_2, b_1, b_2$ except $a_0$ are not present, the pixel $a_0$ is a hypothetical point which is located immediately after the last pixel (on the right end) of the scanning line.

Three modes are defined with reference to FIG. 41.
(1) Pass mode: Case where $b_2$ is located on the left of $a_1$.
(2) Vertical mode: Coding is performed in accordance with a relative position of $a_1b_1$. $V_L(a_1b_1)$ or $V_R(a_1b_1)$ is defined according as pixel $a_1$ is on the left side or right side of the pixel $b_1$. "$a_1b_1$" can be 0, ±1, ±2, ±3. The cases rather than the above cases are expressed by a horizontal mode.
(3) Horizontal mode: In the above case with the case for starting cording, it is expressed by H+M ($a_0a_1$)+M ($a_1a_2$). "M ( )" is an MH code language indicating a color and run length. The code language of each mode is shown in FIG. 42. It is determined that T=1 when the next scanning line is one dimensional coding and T=0 when the line is a two dimensional coding.

The process is described with reference to the flowchart of FIG. 43.

Figure 43:
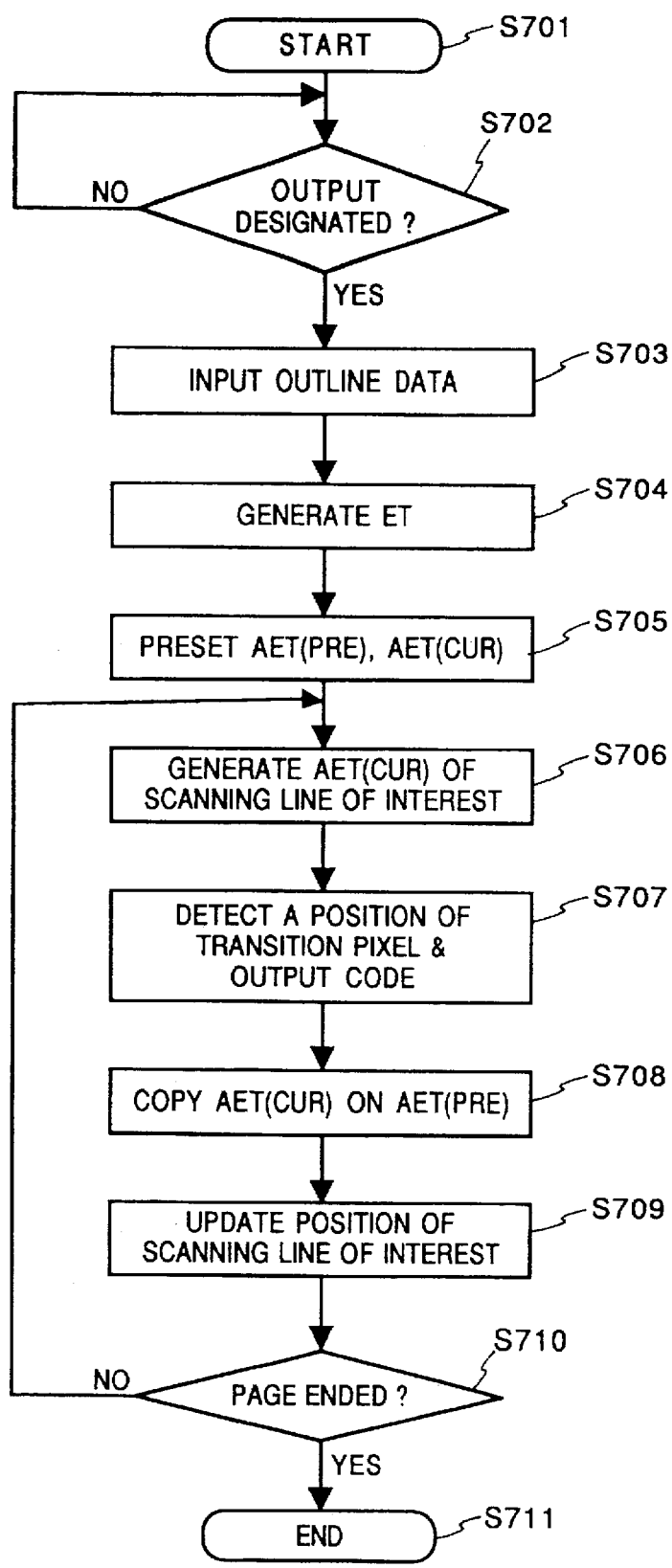
FIG. 43 is a flowchart illustrating a coding process in the facsimile apparatus of the third embodiment according to the present invention.

Since steps S701–704 of FIG. 43 are the same as step S71–74 of FIG. 29, a description for steps S701–704 is omitted.

At step S705, the AET(PRE) for a reference scanning line and AET(CUR) for a scanning line of interest are preset. A position of the scanning line of interest is set to the beginning of the scanning line in a page. At step S706, the AET in the scanning line of interest shown in FIG. 33 is generated. In the case where the AET(CUR) is not empty, an edge packet at the position of the scanning line of interest is added and the AET(CUR) is generated by sorting the edge packet in order from the smallest $x_{min}$.

At step S707, the position of the five types of transition pixels $a_0, a_1, a_2, b_1, b_2$ are determined by using the AET (PRE) and AET(CUR), a mode is determined based upon a positional relation, and a corresponding code shown in FIG. 42 is outputted. The detail of step S707 will be described later. When the process of step S707 ends, the process proceeds to step S708 where a content of the AET(CUR) is copied on the AET(PRE). Successively, an edge packet in which value $y_{max}$ is the same as a scanning line number is eliminated as described in the third embodiment. At step S709, the scanning line of interest is advanced to the next line. At step S710, it is determined if the above process has ended through the last scanning line in the page. If it has not ended, the process proceeds to step S706, while if it has ended, the process ends.

Figure 44:
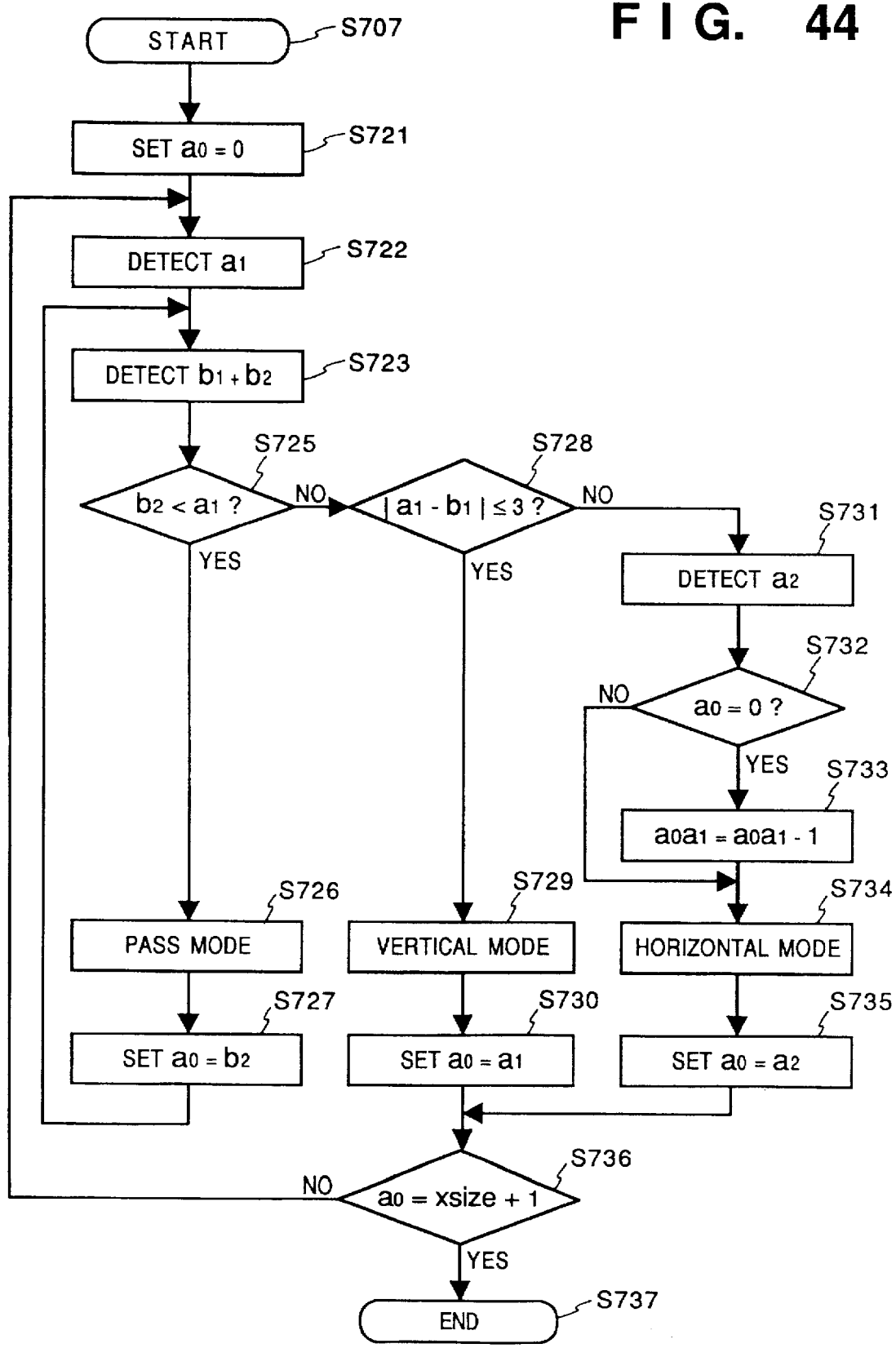
FIG. 44 is a flowchart of a code outputting process at step S707 of FIG. 43.

FIG. 44 is a flowchart illustrating the process of detecting the position of a transition pixel at step S707 and outputting coded outputs. For convenience's sake, the coordinate (0, 0) of the origin as defined in FIG. 24 is changed to (1, 1) in FIG. 44. In the edge table, values of $y_{max}$ and $x_{min}$ are respectively added by "1".

At step S721, the position is preset such as $a_0=(a_0p, a_0c)=(0, 0)$. At step S722, $a_1=(a_1p, a_1c)$ is detected. As described above, $a_1$ is a transition pixel which is located on the right of $a_0$ on the scanning line of interest. However, $x_{min}$cur(i), $x_{min}$pre(j) respectively indicate a value of $x_{min}$ of the i-th edge packet of the active edge table corresponding to the scanning line of interest and a value of $x_{min}$ of the j-th edge packet of the active edge table corresponding to the reference scanning line.

Figure 45:
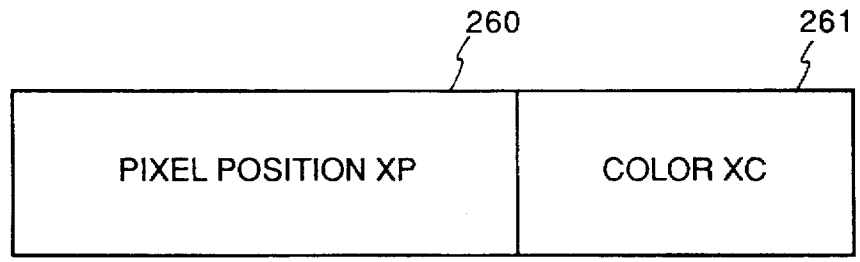
FIG. 45 is a diagram illustrating the data construction of the transition pixel in the third embodiment.

A data structure of $a_0, a_1, a_2, b_1, b_2$ is comprised of an area 260 (xp) indicating a pixel position and an area 261 (xc) indicating a color of the pixel at that position as shown in FIG. 45. In this case, the color of the pixel indicated by the j-th edge packet in the active edge table is black when "i" is an odd number, while it is white when "i" is an even number. Therefore, instead of the color of the pixel, a flag indicating whether "i" is an odd number or even number can be adopted. "$a_0$p" and "$a_0$c" respectively indicate a position of the pixel of $a_0$ and a flag indicating whether "i" is an odd number (P) or even number (C). Similarly, $a_1$p and $a_1$c, $a_2$p and $a_2$, $b_1$p and $b_1$c, $b_2$p and $b_2$c respectively indicate each of the above.

CP[x(i)], CC(i) are defined as follows:

| | | |
|---|---|---|
| CP[x(i)] = | x(i) | when "i" is an odd number |
| | x(i) + 1 | when "i" is an even number |
| CC(i) = | 1 | when "i" is an odd number |
| | 0 | when "i" is an even number |

If it is determined that $a_1=(a_1p, a_1c)$ for the minimum $i=i_0$ where $a_0p<CP[x_{min}cur(i)]$ and $a_0c \neq CC(i)$, $a_1p=CP[x_{min} cur(i_0)]$ $a_1c=CC(i_0)$ If $i_0$ does not exists, it is set to $a_1p=x_{size}+1$, $a_1c=0$.
At step S723, $b_1=(b_1p, b_1c)$, $b_2=(b_2p, b_2c)$ is detected.
On $b_1=(b_1p, b_1c)$,
for the minimum $i=i_1$ where $CP[x_{min}pre(i)]>a_0p$ and $CC(i)=a_1c$, $b_1p=CP[x_{min}pre(i_1)]$ $b_1c=CC(i)$ On $b_2=(b_2p, b_2c)$, for the minimum $i=i_2$ where $CP[x_{min}pre(i)]>b_1p$, $b_2p=CP[x_{min}pre(i_2)]$ $b_2c=CC(i)$ If $i_1, i_2$ do not exists, it is set to $b_1p=x_{size}+1$, $b_1c=b_2c=0$.
When $a_0, a_1, a_2, b_1, b_2$ are determined, the process proceeds to step S725 where whether or not $b_2p<a_1$ is determined. If $b_2p<a_1$, then the process proceeds to step S726 where the pass mode (See FIG. 42) is set. At step S727, $a_0p$ is set to $b_2p$. At this time, $i=i_3$ which satisfies $CP[x_{min}cur(i)] \leq b_2p<CP[x_{min}cur(i+1)]$ is detected and it is set to $a_0c=CC(i_3)$.
Successively, the process returns to step S723.

On the other hand, if the determination at step S725 is "NO", the process proceeds to step S728 where it is determined if $|a_1p-b_1p| \leq 3$. When this condition is satisfied, the process proceeds to step S729 where a code of the vertical mode is outputted. The value of $a_0$ is set to $a_0p=a_1p$, $a_0c=a_1c$ (step S730) and the process proceeds to step S736.

On the other hand, if the determination at step S728 is "NO", the process proceeds to step S731 where the operation for detecting $a_2$ is performed. At step S731, the value of $a_2$ is set for the minimum $i=i_4$ wherein $CP[x_{min}cur(i)]>a_1p$.

If $i_4$ does not exist, it is set to $a_2p=x_{size}+1$, $a_2c=0$. Successively, the process proceeds to step S732 where if $a_0p=0$ is determined. If it is $a_0p=0$, the process proceeds to step S733 where the values of alp, $a_0p$ are decremented by "1". On the other hand, if it is not $a_0p=0$ at step S732, the process proceeds to step S734 where a code of the horizontal mode is outputted. Successively, at step S735, it is set to $a_0p=a_2p$, $a_0c=a_2c$ and the process proceeds to step S736. At step S736, it is determined if $a_0p=x_{size}+1$. If so, the process proceeds to step S737 where the process ends. While if not, the process returns to step S722 where the above process is executed.

[Fifth Embodiment]

In the third embodiment, when the edge packet shown in FIG. 30 is generated, the rules for pairs of "case start 1" and "case end 1" and "case start 8" and "case end 8" can be modified as follows:

In "case start 1", the start point of the current edge can be determined as "as it is" and, in "case end 1", the end point of current edge as "shifted for one scanning line" ; and In "case start 8", the start point of the current edge can be determined as "shifted for one scanning line" and, in "case end 8", the end point of current edge as "as it is".

It can be easily understood that step S936 for "case start 1" and step S940 for "case end 1" shown in FIGS. 36 and 37 are modified in accordance with the modification of the above-described rules. It can be also understood that step S948 for "case start 8" and step S953 for "case end 8" are modified.

In the above-described modification, it is indicated that a vertex which is common in two contiguous edges which are both upward or downward can be processed as either a point of the edge in which the end point is the vertex or a point of the edge in which the start point is the vertex. If the cases where the vertex is processed as a point on the both edges or as a point which is not located on neither of the edges are avoided, the process can be processed in either of the above ways.

[Sixth Embodiment]

In the third embodiment, the outline is described as one expressed by the clockwise data. This does not impose a limitation upon the present invention, for example, it can be applied to the counterclockwise data. In the case of the counterclockwise data, the rules for generating the edge packets shown in FIG. 46 can be used. In this case, the way of dealing a start point of the current edge is determined by directions of slopes of the current edge and previous edge and the way of dealing an end point of the current edge is determined by directions of slopes of the current edge and next edge. The process for updating the edge table in accordance with the rules for generating the edge packet of the counterclockwise data is the same as that of FIGS. 36 and 37. The difference is that "Y" and "N" are replaced by each other at steps S936, S940, S948, and S953.

[Seventh Embodiment]

Similar to the modification in the fifth embodiment, the rules for pairs of "case start 11" and "case end 11" and "case start 18" and "case end 18" can be modified as follows:

In "case start 11", the start point of the current edge can be determined as "shifted for one scanning line" and, in "case end 11", the end point of current edge as "as it is" ; and In "case start 18", the start point of the current edge can be determined as "as it is" and, in "case end 18", the end point of current edge as "shifted for one scanning line".

[Eighth Embodiment]

In the above embodiment, the origin of the coordinates is located on the upper left of the image, however, this does not impose a limitation upon the invention. For example, if the method for determining a direction or processing $y_{max}$, $y_{min}$, $x_{max}$, and $\Delta x$ are modified so as to correspond to a position of the origin or direction of the coordinates, a similar process to the above embodiments is enabled.

[Ninth Embodiment]

In the above embodiment, in the case where the data shown in FIG. 17 is generated, an edge (a point edge) in which the start point is also the end point is eliminated in advance from a string of vertices of the edge comprising an outline. However, this does not impose a limitation upon the present invention. That is, when the edge data is examined, the above process can be continued while the data on the point edge is ignored. In the process of FIG. 34, in the procedure for generating the current edge data (step S87), the next edge data (step S88), and the next edge data (step S92), if the edge being processed is a point edge, then the point edge is skipped, and data for the next vertex is read and the process can be continued as the vertex is $(x_{end}, y_{end})$. In this case, updating a position of the vertex of interest and counting the number of vertices which have been already processed can be adjusted in accordance with the number of skipped vertices. Accordingly, the point edge can be eliminated during the edge table generation.

[Tenth Embodiment]

The structure of the edge table cannot be limited to the examples in the above embodiments. It can be arranged that the pointer packet can be a two dimensional structure as FIG. 47. The pointer packet is comprised of a term having the y coordinate ($y_{min}$) of an end point which is smaller than that of the other of the edge packet to be connected to the pointer packet (It should be noted that $y_{min}$ of a plurality of edges are all the same in the case where the plurality of edge packets are sequentially connected from the pointer packet), a term of a pointer for the next pointer packet in the pointer packet having an edge packet to be connected, and a term of the pointer for the edge packet to be connected to that pointer packet.

Figure 47:
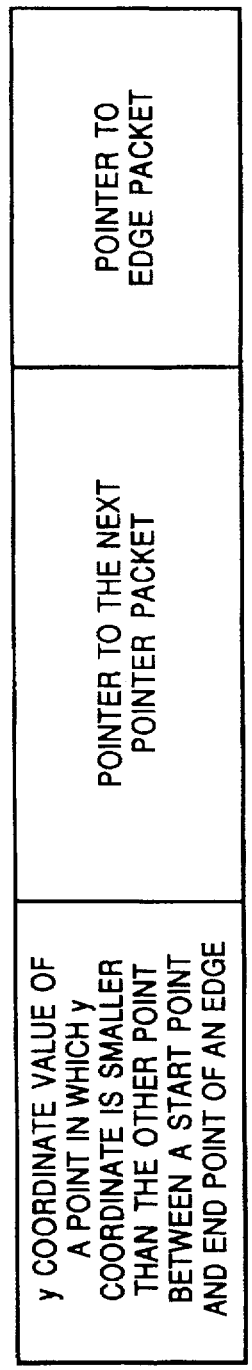
FIG. 47 is a diagram to explain the construction of pointer packet data in another embodiment.
Figure 48:
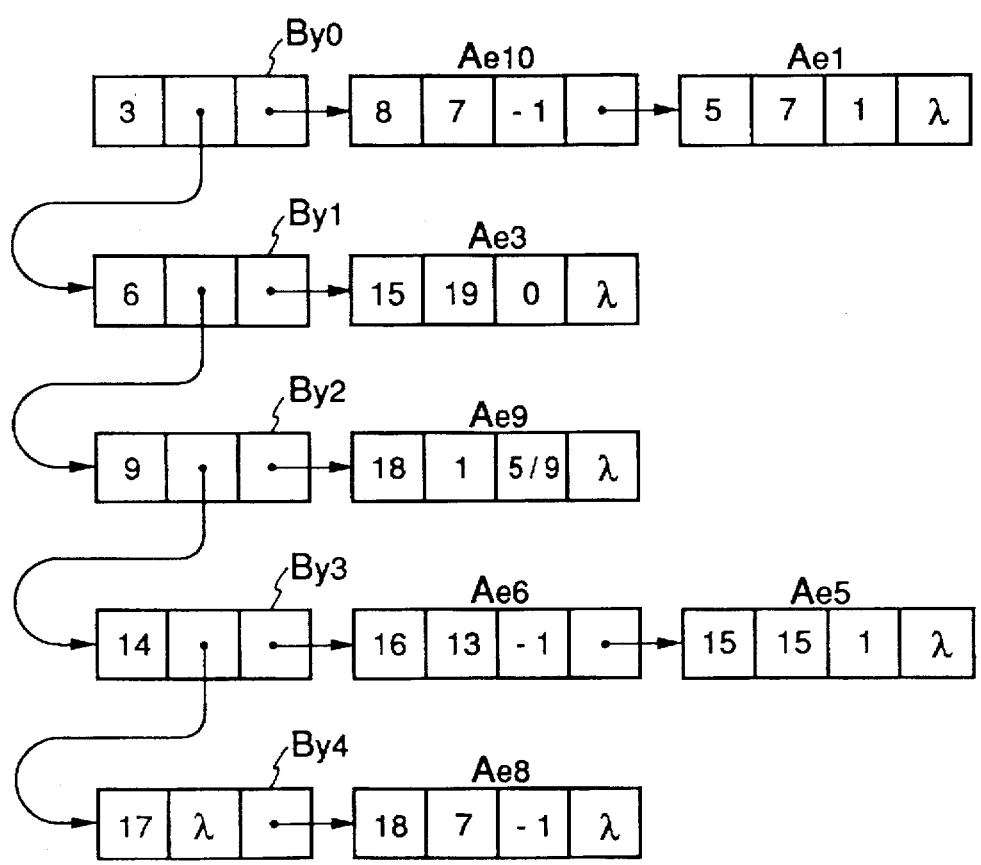
FIG. 48 is an explanatory diagram for the ET of the outline data of FIG. 3 in another embodiment.

FIG. 48 is an example of the edge table comprised of the pointer packet in a form of FIG. 47. FIG. 48 is the edge table for the outline pattern given in FIG. 24. The edge table having the two dimensional structure can be comprised in a similar way to that of the above embodiments. However, a pointer packet area is not reserved for the number of scanning lines of an image in advance. It is determined whether or not there is a pointer packet having $y_{min}$ indicating an edge packet of interest in the obtained pointer packets whenever an edge packet is generated. If there is, the edge packet is added to a string of the edge packets comprising the pointer packet. If not, a new pointer packet is generated and $y_{min}$ is stored in the new pointer packet. The edge packet is connected and the newly generated pointer packet is added and sorted in the string of the pointer packets in order of $y_{min}$.

The method for generating an active edge table by using the above edge table is the same as that of the third embodiment.

When the above-When the above-described two dimensional structure is used, it is not necessary to reserve an area for pointer packets for the number of scanning lines of the image. The advantage of the invention is that even if the image becomes larger, a random memory area for the edge table can be small.

The present invention can be applied to a system constituted by a plurality of devices, or to an apparatus comprising a single device. Furthermore, it goes without saying that the invention is applicable also to a case where the object of the invention is attained by supplying a program to a system or apparatus.

According to the present invention, high speed processing can be performed and the process can be simplified by generating outline data with respect to the main scanning line based upon a relation in connection between a line element of interest and the previous and next line elements in the connected line elements which are located in a same direction, and also generating codes to be transmitted from the outline data.

As described above, according to the present invention, in the case where coded data is generated from vector data indicating a closed outline, high speed processing can be performed by the simple setup.

As many apparently widely different embodiments of the present invention can be made without departing from the spirit and scope thereof, it is to be understood that the invention is not limited to the specific embodiments thereof except as defined in the appended claims.

What is claimed is:

1. An outline data extraction apparatus for processing a raster-scan signal representing an image, and producing a signal representative of an outline of the image, said apparatus comprising:

input means for inputting image data including black and white pixels in a raster scanning form, in units of one scan line of image data;

a processor comprising extraction means for extracting vector data surrounding each black pixel in each scan line of the image data input by said input means, wherein said extracted vector data for each black pixel comprises a plurality of outline vectors surrounding each black pixel and incoming and outgoing vectors for each of said outline vectors, wherein an incoming vector of one of said outline vectors has an end point which is a start point of said one of said outline vectors, and wherein an outgoing vector of one of said outline vectors has a start point which is an end point of said one of said outline vectors storage means for storing the vector data extracted by said extraction means into an outline vector table;

wherein said processor further comprises updating means for updating the incoming and outdoing vectors in the outline vector table for each of said outline vectors, both in the case when two incoming and outgoing vectors are present in the outline vector table for one of the outline vectors, and in the case when a vector in the outline vector table overlaps one of the outline vectors; and a memory for registering the updated incoming and outgoing vectors stored in the outline vector table and outputting the updated outline vector table.

2. The apparatus according to claim 1, wherein said input means inputs the image data as coded image data, and wherein said apparatus further comprises decoding means for decoding said coded image data into decoded image data, wherein said extraction means extracts the vector data of a black pixel in the decoded image data for one scan line.

3. The apparatus according to claim 2, wherein the coded image data indicates white run length and black run length for every line.

4. The apparatus according to claim 2, wherein the coded image data is data indicating a transition point either from a white pixel to a black pixel from a black pixel to a white pixel on the scan line and the difference of the positions of the transition points between the scan lines.

5. The apparatus according to claim 2, wherein the coded image data are codes which are sequentially generated for every pixel.

6. An outline data extraction method for processing a raster-scan signal representing an image, and producing a signal representative of an outline, said method comprising the steps of:

inputting image data including black and white pixels in a raster scanning form, in units of one scan line of image data;

extracting vector data surrounding each black pixel in each scan line of the image data input in said inputting step, wherein the extracted vector data for each black pixel comprises a plurality of outline vectors surrounding each black pixel and incoming and outgoing vectors for each of said outline vectors, wherein an incoming vector of one of said outline vectors has an end point which is a start point of said one of said outline vectors, and wherein an outgoing vector of one of said outline vectors has a start point which is an end point of said one of said outline vectors;

storing the vector data extracted in said extraction step into an outline vector table;

updating the incoming and outgoing vectors in the outline vector table for each of said outline vectors, both in the case when two incoming and outgoing vectors are present in the outline vector table for one of the outline vectors, and in the case when a vector in the outline vector table overlaps one of the outline vectors; and registering the updated incoming and outgoing vectors stored in the outline vector table and outputting the updated outline vector table.

7. The method according to claim 6, wherein, in said inputting step, the image data is input as coded image data; and further comprising:

a decoding step for decoding the coded image data into decoded image data, wherein, in said extracting step, the vector data of a black pixel is extracted in the decoded image data for one scan line.

8. An apparatus according to claim 1, wherein said vector data of each black pixel are determined by a perimeter of each black pixel.

9. An apparatus according to claim 1, further comprising:

outline forming means for forming an outline of the image data based upon the vector data and the incoming and outgoing vectors registered by said register means; and memory means for storing the outline of the image data formed by said outline forming means, wherein an image pattern is obtained by filling dots in said outline stored in said memory means.

10. An method according to claim 6, wherein said vector data of each black pixel are determined by a perimeter of each black pixel.

11. An method according to claim 6, further comprising the steps of:

forming an outline of the image data based upon the vector data and the incoming and outgoing vectors registered in said registering step; and storing the outline of the image data formed in said forming step, wherein an image pattern is obtained by filling dots in the outline.

12. An apparatus for processing a raster-scan signal representing image data including black pixels, identifying and extracting outline data from the image data, and producing a signal representative of the outline, said apparatus comprising:

input means for inputting image data including black and white pixels in a raster scanning form, in units of one scan line of image data;

a processor comprising extraction means for extracting vector data surrounding each black pixel in each scan line of the image data input by said input means, wherein the extracted vector data for each black pixel comprises a plurality of outline vectors surrounding each black pixel and incoming and outgoing vectors for said plurality of outline vector, wherein an incoming vector of one of said outline vectors has an end point which is a start point of said one of said outline vectors, and wherein an outgoing vector of one of said outline vectors has a start point which is an end point of said one of said outline vectors;

storage means for storing the vector data into an outline vector table;

wherein said processor further comprises deleting means for deleting vector data stored in the outline vector table, which has an opposite direction to the direction of outline vector data to be registered, and for updating the incoming and outgoing vectors related to deleted vector data; and a memory for registering the vector data and the incoming and outgoing vectors stored in the outline vector table and outputting the updated outline vector table.

13. An apparatus according to claim 12, wherein said extraction means comprises:

means for converting the image data of the black pixels in each scan line into outline vectors, and for storing the outline vectors into a memory;

detecting means for detecting each outline vector in a scan line of outline vectors stored in said memory that is connected to an outline vector in a next following scan line; and combining means for combining each detected outline vector in the scan line with the connected outline vector in the next following scan line.

14. A method for processing a raster-scan signal representing image data including black pixels, identifying and extracting outline data from the image data, and producing a signal representative of the outline, said method comprising the steps of:

inputting image data including black and white pixels in a raster scanning form, in units of one scan line of image data;

extracting vector data surrounding each black pixel in each scan line of the image data, wherein the vector data for each black pixel comprises a plurality of outline vectors surrounding each black pixel and incoming and outgoing vectors for said plurality of outline vector, wherein an incoming vector of one of said outline vectors has an end point which is a start point of said one of said outline vectors, and wherein an outgoing vector of one of said outline vectors has a start point which is an end point of said one of said outline vectors;

storing the vector data and the incoming and outgoing vectors into an outline vector table;

deleting vector data stored in the outline vector table, which has an opposite direction to the direction of outline vector data to be registered;

updating the incoming and outgoing vectors related to deleted vector data in said deleting step; and registering the updated vector data and the incoming and outgoing vector data in the outline vector table and outputting the updated outline vector table.

15. A method according to claim 14, further comprising the steps of:

detecting each of the vector data in a scan line stored in said outline vector table, that is connected to vector data in a next following scan line; and combining each of the detected vector data in the scan line with the vector data in the next following scan line.

16. An apparatus according to claim 1, wherein the vector data has four vectors representing a rectangle for a black pixel.

17. An apparatus according to claim 16, wherein the four vectors are formed by mutually combining horizontal vectors and vertical vectors.

18. An apparatus according to claim 16, wherein the four vectors are defined between pixels.

19. The method according to claim 6, wherein, in said inputting step, the image data is input as coded image data, and further comprising the step of decoding the coded image data into decoded image data, wherein the vector data of black pixels are extracted in the decoded image data for one scan line.

20. The method according to claim 19, wherein the coded image data indicates white run length and black run length for every line.

21. The method according to claim 19, wherein the coded image data is data indicating a transition point either from a white pixel or black pixel to a black pixel or white pixel on the scan line and the difference of the positions of the transition points between the scan lines.

22. The method according to claim 19, wherein the coded image data are codes which are sequentially generated for every pixel.

23. The method according to claim 6, wherein the vector data has four vectors representing a rectangle for a black pixel.

24. The method according to claim 23, wherein the four vectors are formed by mutually combining horizontal vectors and vertical vectors.

25. The method according to claim 23, wherein the four vectors are defined between pixels.

26. The apparatus according to claim 12, wherein said input means inputs the image data as coded image data, and wherein said apparatus further comprises decoding means for decoding the coded image data into decoded image data, and wherein said extraction means extracts the vector data of black pixels in the decoded image data for one scan line.

27. The apparatus according to claim 26, wherein the coded image data indicates white run length and black run length for every line.

28. The apparatus according to claim 26, wherein the coded image data is data indicating a transition point either from a white pixel or black pixel to a black pixel or white pixel on the scan line and the difference of the positions of the transition points between the scan lines.

29. An apparatus according to claim 26, wherein the coded image data are codes which are sequentially generated for every pixel.

30. An apparatus according to claim 12, wherein the vector data has four vectors representing a rectangle for a black pixel.

31. An apparatus according to claim 30, wherein the four vectors are formed by mutually combining horizontal vectors and vertical vectors.

32. An apparatus according to claim 30, wherein the four vectors are defined between pixels.

33. The method according to claim 14, wherein, in said inputting step, the image data is input as coded image data, and further comprising the step of decoding the coded image data into decoded image data, wherein the vector data of black pixels are extracted in the decoded image data for one scan line.

34. The method according to claim 33, wherein the coded image data indicates white run length and black run length for every line.

35. The method according to claim 33, wherein the coded image data is data indicating a transition point either from a white pixel or black pixel to a black pixel or white pixel on the scan line and the difference of the positions of the transition points between the scan lines.

36. The method according to claim 33, wherein the coded image data are codes which are sequentially generated for every pixel.

37. The method according to claim 14, wherein the vector data has four vectors representing a rectangle for a black pixel.

38. The method according to claim 37, wherein the four vectors are formed by mutually combining horizontal vectors and vertical vectors.

39. The method according to claim 37, wherein the four vectors are defined between pixels.

40. The apparatus according to claim 7, further comprising:

outline forming means for forming an outline of the image data based upon said vector data and the connection information of the vector data; and memory means for storing the outline of the image data formed by said outline forming means, wherein an image pattern is obtained by filing dots in the outline stored in said memory means.

* * * * *

UNITED STATES PATENT AND TRADEMARK OFFICE
CERTIFICATE OF CORRECTION

PATENT NO. : 5,748,777

DATED : May 5, 1998

INVENTOR(S): AKIHIRO KATAYAMA, ET AL.　　　　　　Page 1 of 9

It is certified that error appears in the above-identified patent and that said Letters Patent is hereby corrected as shown below:

Drawings:

<u>SHEET 27</u>

FIG. 29, "INTERST" should read --INTEREST--.

<u>SHEET 29</u>

FIG. 31, "WHICH y" should read --WHICH x--.

<u>COLUMN 1</u>

Line 45, "the all directions" should read --all the directions--.

<u>COLUMN 2</u>

Line 9, "next" should read --the next--.
    Line 63, "a continuing" should read --continuous--.

<u>COLUMN 5</u>

Line 49, "3.5). Each" should read --3.5), each--.
    Line 58, "are" should read --is--.

UNITED STATES PATENT AND TRADEMARK OFFICE
CERTIFICATE OF CORRECTION

PATENT NO. : 5,748,777

DATED : May 5, 1998

INVENTOR(S): AKIHIRO KATAYAMA, ET AL.

It is certified that error appears in the above-identified patent and that said Letters Patent is hereby corrected as shown below:

COLUMN 6

Line 6, "(i<m,j<n," should read --$i \leq m, j \leq n,$--.
    Line 13, "where" should read --where it is determined.--
    Line 62, "examined if" should read --determined whether--.
    Line 64, "table," should read --table;--.

COLUMN 7

Line 6, "is an" should read --is a--.
    Line 7, "as an" should read --an--.
    Line 47, "where" should read --which--.
    Line 50, "where" should read --which--.

COLUMN 8

Line 3, "there is" should read --there are--, and "it is" should read --they are--.
    Line 16, "each of" should read --each of the--.
    Line 26, "direction" should read --direction;--.
    Line 28, "direction" shoudl read --direction;--.
    Line 44, "side," should read --side;--.

UNITED STATES PATENT AND TRADEMARK OFFICE
CERTIFICATE OF CORRECTION

PATENT NO. : 5,748,777

DATED : May 5, 1998

INVENTOR(S): AKIHIRO KATAYAMA, ET AL.

It is certified that error appears in the above-identified patent and that said Letters Patent is hereby corrected as shown below:

COLUMN 9

Line 31, "the only" should read --only the--.
    Line 48, "not" should read --not been--.
    Line 51, "not" should read --not been--.
    Line 54, "loop" should read --loops--.
    Line 67, "has" should read --has been--.

COLUMN 10

Line 2, "direction" should read --directions--.
    Line 4, ""1"because" should read --"1" because--.
    Line 8, "end." should read --ends.--.
    Line 14, "where" should be deleted.
    Line 15, "already" should read --already been--.
    Line 16, "has" should read --has been--.
    Line 18, "not" should read --not been--.
    Line 19, "has" should read --has been--.
    Line 21, "is" should read --are--.
    Line 22, "loop" should read --loops--, and "vertex" should read --vertices--.
    Line 33, "pixel)" should read --pixels)--.
    Line 41, "pixel)" should read --pixels)--.

COLUMN 11

Line 2, "embodiment," should read --embodiment;--.
    Line 20, "pixel" should read --pixels--.
    Line 25, "while" should read --while if--.

UNITED STATES PATENT AND TRADEMARK OFFICE
CERTIFICATE OF CORRECTION

PATENT NO. : 5,748,777

DATED : May 5, 1998

INVENTOR(S): AKIHIRO KATAYAMA, ET AL.

It is certified that error appears in the above-identified patent and that said Letters Patent is hereby corrected as shown below:

COLUMN 11

Line 45, "overlappying" should read --overlapping--.
    Line 60, "detail" should read --details--, and "is" should read --are--.

COLUMN 12

Lines 50-51, "obtained. ¶ The" should read --Obtained. The-- (no paragraph break).
    Line 54, "is present" should be deleted.

COLUMN 13

Line 7, "that is" should read --as is--.
    Line 37, "that is" should read --as are--.
    Line 42, "two" should read --two sets--, and "that "should read --as--.
    Line 58, "25" should be deleted.

COLUMN 14

Line 15, "has" should read --has been--.
    Line 17, "not" should read --not been--.
    Line 21, "has" should read --has been--.
    Line 27, "vertex" should read --vertices--, and "(L)," should read --(L), and--.

UNITED STATES PATENT AND TRADEMARK OFFICE
CERTIFICATE OF CORRECTION

PATENT NO.   : 5,748,777

DATED        : May 5, 1998

INVENTOR(S): AKIHIRO KATAYAMA, ET AL.

It is certified that error appears in the above-identified patent and that said Letters Patent is hereby corrected as shown below:

COLUMN 14

```
Line 31, "that" should read --as that--.
Line 40, "the all" should --all the--.
Line 42, "is" should read --are--.
Line 65, "an" should read --when an--.
```

COLUMN 15

```
Line 3,  "rather" should read --other--.
Line 21, "message" should read --messages--.
Line 30, "all over the" should read --the overall--.
Line 31, "ROM" should read --a ROM--.
Line 49, "loop" should read --loops--.
```

COLUMN 16

```
Line 43, "wether" should read --whether--.
```

COLUMN 17

```
Line 10, "rather" should read --other--.
Line 18, "is" should read --are--.
Line 19, "is" should read --are--.
Line 22, "to" should be deleted.
Line 23, "to" should be deleted.
Line 51, "A next" should read --Next--.
```

UNITED STATES PATENT AND TRADEMARK OFFICE
CERTIFICATE OF CORRECTION

PATENT NO. : 5,748,777

DATED : May 5, 1998

INVENTOR(S): AKIHIRO KATAYAMA, ET AL.

It is certified that error appears in the above-identified patent and that said Letters Patent is hereby corrected as shown below:

COLUMN 18

Line 13, "the all" should read --all the--.
Line 14, "be" should read --been--.
Line 15, "if the" should read --whether or not the--.
Line 16, "vertex" should read --vertices--.
Line 20, "the all" should read --all the--.
Line 24, "the all" should read --all the--.
Line 26, "be" should read --been--, and "if" should read --whether or not--.
Line 27, "vertex" should read --vertices--.
Line 32, "prior" should read --Prior--.
Line 33, "describe" should read --describing--.
Line 35, "proceeded" should read --enacted--.
Line 37, "is" should read --are--.
Line 40, "to" should be deleted.
Line 54, "an" should read --a--.

COLUMN 19

Line 12, "to" should be deleted.
Line 16, "to" should be deleted.
Line 29, "located" should read --located at--.
Line 33, "to" should be deleted.
Line 36, "to" should be deleted.
Line 41, "that" should be deleted.
Line 43, "$\Delta X_{pre} < \Delta X_{cur}$" should read --$\Delta X_{pre} > \Delta X_{cur}$--.

UNITED STATES PATENT AND TRADEMARK OFFICE
CERTIFICATE OF CORRECTION

PATENT NO. : 5,748,777

DATED : May 5, 1998

INVENTOR(S): AKIHIRO KATAYAMA, ET AL.

It is certified that error appears in the above-identified patent and that said Letters Patent is hereby corrected as shown below:

COLUMN 20

Line 3, "that" should be deleted.
    Line 22, "to" should be deleted.
    Line 25, "with" should be deleted.
    Line 28, "slop" should read --slope--, and "that" should be deleted.
    Line 38, "processes" should read --process--.
    Line 48, "to" should be deleted.

COLUMN 21

Line 5, ""$Y_{min}$."" should read --"$Y_{min}$"--.

COLUMN 23

Line 8, "of the" should read --on the--.
    Line 43, "rung" should read --run--.

COLUMN 24

Line 16, "downward," should read --downward edge,--.
    Line 21, $X^{min}=1$" should read --$X_{min}=1$,--.
    Lines 35-36, "a carried out" should read --a value carried out--.
    Line 50, "when" should be deleted.

UNITED STATES PATENT AND TRADEMARK OFFICE
CERTIFICATE OF CORRECTION

PATENT NO. : 5,748,777

DATED : May 5, 1998

INVENTOR(S): AKIHIRO KATAYAMA, ET AL.

It is certified that error appears in the above-identified patent and that said Letters Patent is hereby corrected as shown below:

COLUMN 25

Line 18, "as pixel $a_1$" should read --to pixel $a_1$,--.

COLUMN 26

Line 16, "$a_2$," should read --$a_2c$,--.
    Line 32, "exists," should read --exist,--.
    Line 41, "$b_2c$)," for" should read --$b_2c$), ¶ for--. (Insert paragraph break.)
    Line 47, "exists," should read --exist,--.

COLUMN 27

Line 2, "if" should read --whether--.
    Line 4, "alp," should read --$a_1p$,--.
    Line 36, "neither" should read --either--.
    Line 42, "invention" should read --invention;--.
    Line 67, "image" should read --image;--.

COLUMN 28

Line 56, " When the above-" (first occurrence) should be deleted.

COLUMN 29

Line 63, "from" should read --or from--.

UNITED STATES PATENT AND TRADEMARK OFFICE
CERTIFICATE OF CORRECTION

PATENT NO. : 5,748,777
DATED : May 5, 1998
INVENTOR(S) : AKIHIRO KATAYAMA, ET AL.

It is certified that error appears in the above-identified patent and that said Letters Patent is hereby corrected as shown below:

COLUMN 30

Line 48, "An method" should read --A method--.
    Line 51, "An method" should read --A method--.

COLUMN 34

Line 14, "filing" should read --filling--.

Signed and Sealed this

Ninth Day of March, 1999

Attest:

Q. TODD DICKINSON

Attesting Officer      Acting Commissioner of Patents and Trademarks